(12) United States Patent
Ogikubo

(10) Patent No.: US 8,620,143 B2
(45) Date of Patent: Dec. 31, 2013

(54) IMAGE PROCESSING APPARATUS, METHOD, AND PROGRAM, AND PROGRAM STORAGE MEDIUM

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 12/756,810

(22) Filed: Apr. 8, 2010

(65) Prior Publication Data

US 2010/0189411 A1    Jul. 29, 2010

Related U.S. Application Data

(63) Continuation of application No. 11/223,940, filed on Sep. 13, 2005, now Pat. No. 7,720,349.

(30) Foreign Application Priority Data

Sep. 15, 2004 (JP) ................................. 2004-268939
Aug. 5, 2005 (JP) ................................. 2005-228656

(51) Int. Cl.
*H04N 5/94* (2006.01)
*H04N 5/85* (2006.01)

(52) U.S. Cl.
CPC ...................................... *H04N 5/85* (2013.01)
USPC ........... 386/248; 386/241; 386/280; 386/343; 715/723; 715/726; 345/474; 345/475; 345/619

(58) Field of Classification Search
CPC ....................................................... H04N 5/85
USPC ......... 386/230, 265, 288, 343, 241, 248, 280; 345/156, 474, 475, 619; 715/712, 719, 715/723, 763, 861, 726
See application file for complete search history.

(56) References Cited

U.S. PATENT DOCUMENTS

| | | | |
|---|---|---|---|
| 5,262,760 A | 11/1993 | Iwamura et al. | |
| 6,323,877 B1 * | 11/2001 | Katoh et al. | 345/638 |
| 6,414,686 B1 | 7/2002 | Protheroe et al. | |
| 7,334,190 B2 | 2/2008 | Wierowski | |
| 2002/0041752 A1 | 4/2002 | Abiko et al. | |
| 2002/0181741 A1 * | 12/2002 | Masukura et al. | 382/103 |
| 2003/0142955 A1 | 7/2003 | Hashizume et al. | |
| 2003/0156824 A1 | 8/2003 | Lu | |
| 2003/0189588 A1 * | 10/2003 | Girgensohn et al. | 345/723 |
| 2004/0047596 A1 | 3/2004 | Chevallier et al. | |
| 2004/0150657 A1 | 8/2004 | Wittenburg et al. | |
| 2010/0013757 A1 | 1/2010 | Ogikubo | |

FOREIGN PATENT DOCUMENTS

| | | |
|---|---|---|
| EP | 0 843 311 A2 | 5/1998 |
| JP | 8-329281 | 12/1996 |
| JP | 10-271426 | 10/1998 |
| JP | 11-069281 | 3/1999 |

(Continued)

OTHER PUBLICATIONS

Extended European Search Report issued Oct. 26, 2010, in Patent Application No. 10171781.7.

*Primary Examiner* — Hung Dang
*Assistant Examiner* — Mishawn Dunn
(74) *Attorney, Agent, or Firm* — Oblon, Spivak, McClelland, Maier & Neustadt, L.L.P.

(57) ABSTRACT

An image processing apparatus, method, and program and program storage medium that enable easy search for a desired part. A plurality of video data are created from video data and are displayed, each as a motion picture, at time intervals in a display order on a plurality of display areas on a display screen.

20 Claims, 40 Drawing Sheets

(56) References Cited

FOREIGN PATENT DOCUMENTS

| JP | 2002-74322 | 3/2002 |
| JP | 2002-118802 | 4/2002 |
| JP | 2003-263148 | 9/2003 |
| JP | 2004-072132 | 3/2004 |

* cited by examiner

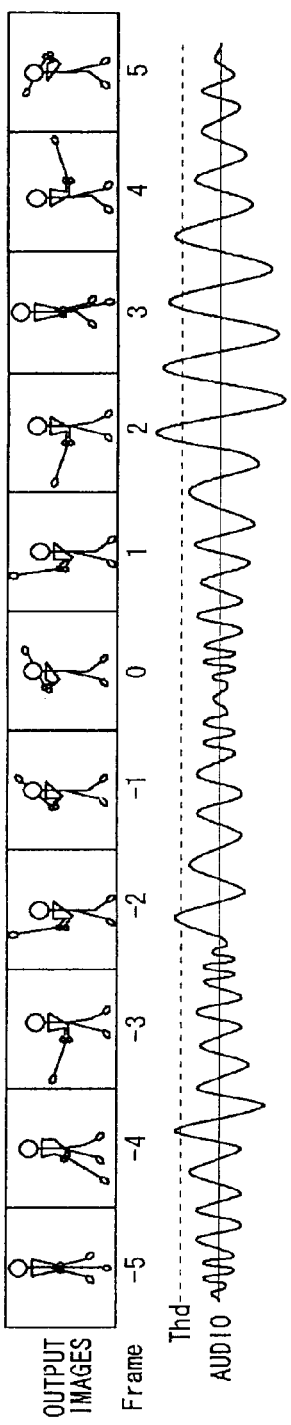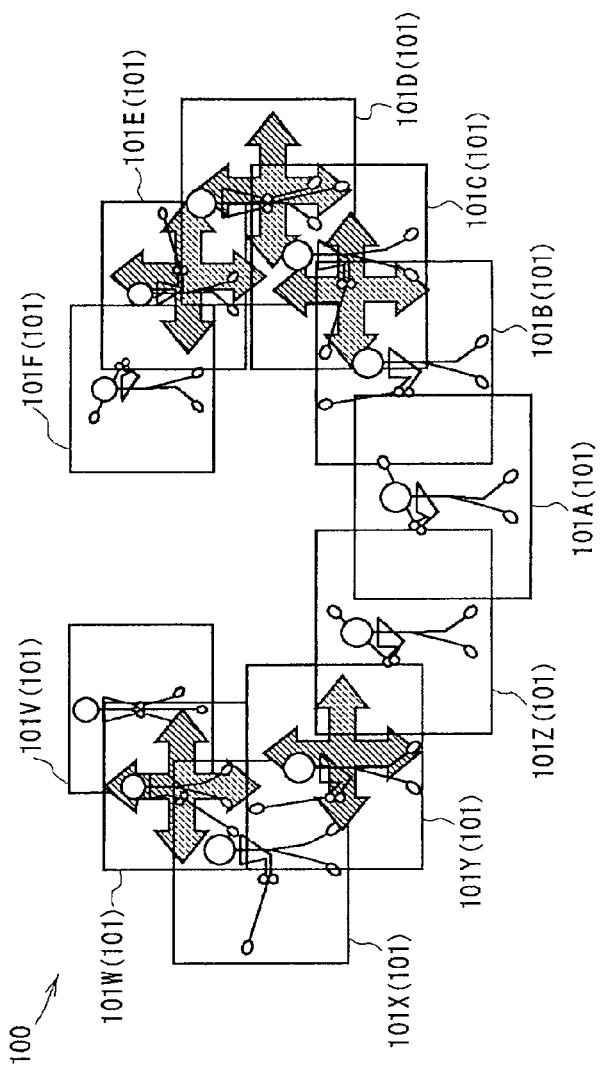
FIG. 30A
FIG. 30B
FIG. 30C

IMAGE PROCESSING APPARATUS, METHOD, AND PROGRAM, AND PROGRAM STORAGE MEDIUM

CROSS REFERENCE TO RELATED APPLICATIONS

This application is a continuation of U.S. application Ser. No. 11/223,940, filed Sep. 13, 2005, and is based upon and claims the benefit of priority from prior Japanese Patent Applications JP2004-268939 and JP2005-228656 filed in the Japanese Patent Office on Sep. 15, 2004 and Aug. 5, 2005, respectively, the entire contents of both of which are incorporated herein by reference.

BACKGROUND OF THE INVENTION

1. Field of the Invention

This invention relates to an image processing apparatus, method, and program and a program storage medium, and more particularly to a nonlinear editing apparatus.

2. Description of the Related Art

In workplaces for creating content, such as television broadcasting stations, a single content is created by extracting some parts from video/audio materials (hereinafter, referred to as clips) produced by video cameras, as new clips, and combining them (for example, refer to Japanese Patent Laid-open No. 11-95332).

FIG. 1 shows an example of a graphical User Interface (GUI) screen (hereinafter, referred to as edit screen) which is used for editing work and is displayed on a display of an editing apparatus. As can be seen from this figure, this edit screen 1 has a collections area 2, a monitor window 3, a Storyboard view 4, a Timeline view 5, and an effects views 6A to 6C.

The collections area 2 shows various bins and files being registered in the editing apparatus. When a user selects a desired bin or file, this collections area 2 shows a list of clips being contained in the bin or file. Then the user drags and drops a desired clip onto the monitor window 3 from the collections area 2, resulting in displaying the first image of the clip on the monitor window 3.

The user can play back, fast forward, or fast rewind the desired clip on the monitor window 3 by operating a group of buttons 7 placed at a lower part of the monitor window 3. The user can display a desired image of the clip on the monitor window 3 by dragging a scrub cursor 8 to the right or left, the scrub cursor 8 locating above the button group 7 and indicating the position of a current image in the entire clip.

The user searches for a desired frame by operating the button group 7 and the scrub cursor 8 while visually confirming the clip on the monitor window 3, and specifies a start point (hereinafter, referred to as IN-point) and an end point (hereinafter, referred to as OUT-point) of a desired video/audio part out of the clip by clicking on an IN button $9_{IN}$ and an OUT button $9_{OUT}$ when the IN-point frame and the OUT-point frame are displayed on the monitor window 3.

The user drags and drops thus specified desired video/audio part onto the Storyboard view 4, resulting in pasting it in the Storyboard view 4 as a new clip. The edit screen 1 arranges editing-targeted clips in the Storyboard view 4, which allows the user to easily imagine an edited video. The Storyboard view 4 shows the thumbnail and detailed information of the main image of each clip.

Then the user sequentially arranges clips on a video track $10_V$ of the Timeline view 5 by dragging and dropping the clips from the Storyboard view 4. At this time, a band $12_V$ corresponding to a length of each pasted clip appears on the video track $10_V$ with a time scale 11 as an index. When audio is accompanying the pasted video, a band $12_A$ having the same length appears on an audio track $10_A$ at the same position indicated by the time scale 11.

Since the bands $12_V$ and $12_A$ exist on the video track $10_V$ and the audio track $10_A$ in the Timeline view 5, the video and sound of the clip corresponding to the bands $12_V$ and $12_A$ are displayed and output at times specified by the time scale 11. Therefore, such an edit list can be created that specifies a series of clips to be played back as an edited video/audio.

To apply a video effect to a switching part from a first clip to a second clip during creating the edit list, an icon (hereinafter, referred to as an effect icon) corresponding to a desired video effect out of executable video effects is dragged and dropped at a position corresponding to the switching part on a transition track $10_T$ in the Timeline view 5, the executable video effects being displayed on the effect list view 6C of the effects views 6A to 6C. Thus the video effect corresponding to the effect icon pasted on the transition track $10_T$ can be applied to the switching part from the first clip to the second clip in the edited video.

SUMMARY OF THE INVENTION

In the editing work on such an edit screen 1, a user can find desired IN-point and OUT-point frames while playing back a clip at a high speed by scrubbing the scrub cursor 8 to the right or left.

However, searching for a desired frame (hereinafter, referred to as image searching work) by scrubbing is not easy for unskilled users. In addition, in a case of long-GOP MPEG clips, in which one Group of Pictures (GOP) has a plurality of frames because of improvement of compression efficiency, or open-GOP clips, in which a frame has been compressed by using frames before and after the frame, some neighboring frames or GOPs need to be decoded to decode a frame, which may not realize fast random playback with ease. Thus, response property for displaying degrades and the image searching work by scrubbing is not user-friendly.

Further, in cut editing to combine clips as described above, the clips are pasted on the video track $10_V$ and the audio track $10_A$ of the Timeline view 5 on the edit screen 1. To confirm images around IN-points and OUT-points, the user needs to play back the edited video by scrubbing after pasting the clips. This means that this cut editing takes some steps, which is not user friendly.

Furthermore, the editing work is generally done by adjusting video and audio. As to audio, especially, the user needs to hear sound output from a loudspeaker or to check an audio level waveform being shown on the audio track $10_A$ (an "audio 3", for example) of the Timeline view 5 on the edit screen 1, while viewing the video. Therefore, video/audio synchronization editing may not be done with ease.

This invention has been made in view of foregoing and intends to provide an image processing apparatus, method and program, and a program storage medium, which enable easy editing work.

In a preferred embodiment of this invention, a plurality of video data are created from video data, and are displayed, each as a motion picture, at time intervals in a display order on the plurality of display areas linking up, on the display screen. Therefore, plural images are displayed in time series in the display order on the display screen. On this display screen, a desired image can be easily searched for in a video based on the video data. Thus this invention can realize an image processing apparatus, method, and program, and a program storage medium, which enable easy editing work.

This invention can be widely applied to not only nonlinear editing apparatus but also other kinds of editing apparatuses and other various video display control apparatuses capable of displaying videos.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 30A to 30C are schematic views for explaining how to display images according to the second embodiment;

DETAILED DESCRIPTION OF THE EMBODIMENT

Figure 2:
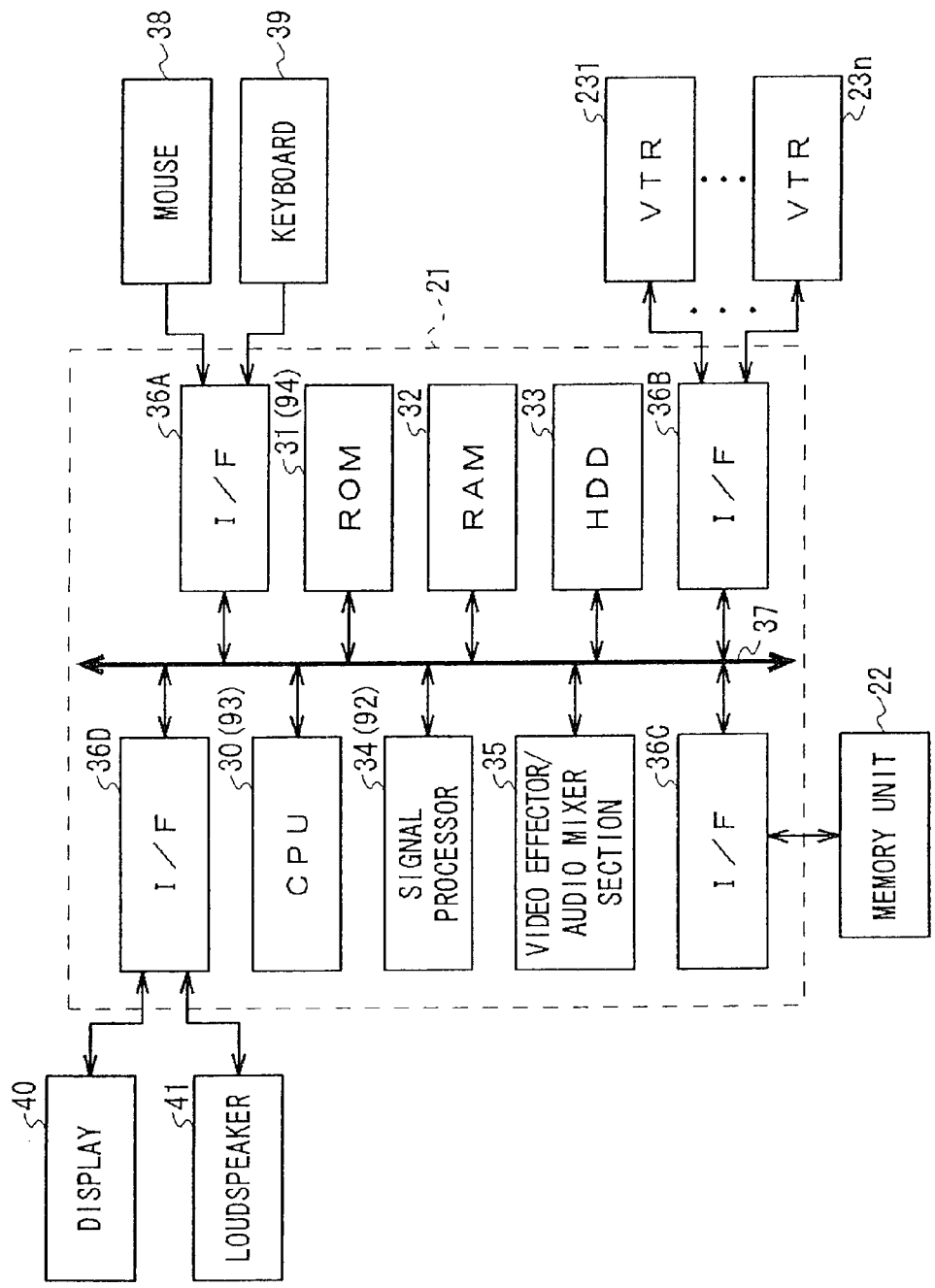
FIG. 2 is a block diagram of an editing system according to one embodiment.

Preferred embodiments of this invention will be described with reference to the accompanying drawings:

(1) First Embodiment (1-1) Configuration of Editing System 20 According to the First Embodiment Referring to FIG. 2, reference numeral 20 shows an editing system according to one embodiment of this invention, and is designed to be capable of importing all or part of video and audio recorded on a video tape as a clip into a large-capacity memory unit 22 which is a redundant-arrays-of-independent-disk (RAID) unit, via an editing apparatus 21.

This editing system 20 is also designed to be capable of creating an edit list that specifies how to create desired edited video/audio from clips being stored in the memory unit 22, execute an editing process according to the created edit list, and save the edited video/audio in the memory unit 22 or record it on a video tape.

This editing system 20 has the editing apparatus 21, the memory unit 22, and plural videotape recorders $23_1$ to $23_n$.

The editing apparatus 21 has a Central Processing Unit (CPU) 30, a Read Only Memory (ROM) 31, a Random Access Memory (RAM) 32, a hard disk drive 33, a signal processor 34, and a video effector/audio mixer section 35, and first to fourth interfaces 36A to 36D, which are connected to each other via a bus 37. The first interface 36A is connected to a mouse 38 and a keyboard 39, the second interface 36B is connected to the videotape recorders $23_1$ to $23_n$, the third interface 36C is connected to the memory unit 22, and the fourth interface 36D is connected to a display 40 and a loudspeaker 41.

When the editing apparatus 21 starts, the CPU 30 takes and puts necessary software from the hard disk drive 33 into the RAM 32 based on a control program being stored in the ROM 31, and then executes appropriate control based on this software and in response to user operations.

When a command for displaying a prescribed window (hereinafter, referred to as a clip capture window) to import video and audio into the memory unit 22 from a video tape is entered by operating the mouse 38 or the keyboard 39, the CPU 30 controls the hard disk drive 33 so as to read corresponding video data and controls the signal processor 34 so as to display the clip capture window based on the video data on the display 40.

In this situation, when a command for playing a videotape recorder $23_1$ to $23_n$ is entered by operating the mouse 38, the CPU 30 controls the videotape recorder $23_1$ to $23_n$ via the second interface 36B so as to play the video tape inserted therein. At this time, a video/audio signal S1 is reproduced from the video tape and output from the videotape recorder $23_1$ to $23_n$, and then this signal S1 is given to the signal processor 34 via the second interface 36B, the bus 37, and the video effector/audio mixer section 35.

The signal processor 34 applies a prescribed signal process to the received video/audio signal S1, and sends the obtained video signal S2 to the display 40 via the bus 37 and the fourth interface 36D to display a video based on the video signal S2 at a prescribed position on the clip capture window, and also sends the obtained audio signal S3 to the loudspeaker 41 via the bus 37 and the fourth interface 36D to output sound based on the audio signal S3 from the loudspeaker 41.

Therefore, a user can specify a desired video/audio part as a clip while viewing the video on the display 40 and hearing the sound from the loudspeaker 41, with the mouse 38 and the keyboard 39, and can save clip management information including the time codes of the IN-point and OUT-point, the clip length, the clip ID, the clip name, the shooting time of the video/audio part, and the creation time of the clip. This clip management information is registered in a clip management database in the hard disk drive 33 under the control of the CPU 30.

After that, when a command for importing the clip is entered by operating the mouse 38 or the keyboard 39, the CPU 30 controls the videotape recorder $23_1$ to $23_n$ via the second interface 36B so as to reproduce the clip. At this time, the video/audio signal S1 of the clip reproduced from the videotape is output from the videotape recorder $23_1$ to $23_n$, and is given to the video effector/audio mixer section 35 via the second interface 36B and the bus 37. Then, the CPU 30 controls the video effector/audio mixer section 35 and the memory unit 22 so as to store the video/audio signal S1 in the memory unit 22 via the video effector/audio mixer section 35.

As described above, this editing system 1 is capable of importing the specified clip into the memory unit 22 from the video tape.

The user, on the other hand, can display an edit screen 50 (FIG. 3), which is described later, on the display 40 for editing work by operating the mouse 38 and the keyboard 39. On this edit screen 50, the user can create an edit list that specifies how to create desired edited video/audio from which clips. The user can also confirm the edited video/audio based on the edit list after or in the middle of creating the edit list.

When a command for saving the edit list is entered by operating the mouse 38 after the edit list is created, the CPU 30 converts edit data into a file and registers this file in an edit list database in the hard disk drive 33, the edit data created by all user programs specified in the edit list.

Further, when a command for playing back the edited video/audio based on the edit list is entered by operating the mouse 38 or the keyboard 39 after or in the middle of creating the edit list, the CPU 30 controls the memory unit 22 so as to read the video/audio signal S1 of each necessary clip therefrom. Thus read video/audio signal S4 is given to the video effector/audio mixer section 35 via the third interface 36C and the bus 37, to be subjected to necessary video effects and audio mixing under the control of the CPU 30. The obtained edited video/audio signal S5 is given to the signal processor 34.

The signal processor 34 processes the received edited video/audio signal S5 under the control of the CPU 30, and gives the obtained video signal S2 and audio signal S3 to the display 40 and the loudspeaker 41, respectively, via the bus 37 and the fourth interface 36D. As a result, the edited video based on the edited video/audio signal S5 is displayed at a prescribed position on the edit screen 50 based on the video signal S2 while the edited sound based on the signal S5 is output from the loudspeaker 41 based on the audio signal S3.

Therefore, this editing system 1 allows the user to do editing work while confirming the edited video/audio based on the edit list.

When a command for recording the edited video/audio based on the edit list is entered by operating the mouse 38 or the keyboard 39 after the edit list is created, the CPU 30 controls the memory unit 22 so as to read therefrom the video/audio signal S4 of each clip to be used for the edited video/audio and sends this to the video effector/audio mixer section 35.

Under the control of the CPU 30, the video effector/audio mixer section 35 applies necessary video effects and audio mixing to the received video/audio signal S4 of the clip, as in the case of the above-described playback mode, and sends the obtained edited video/audio signal S5 to the memory unit 22 or a corresponding videotape recorder $23_1$ to $23_n$ via the bus 37 and the fourth or second interface 36C, 36B.

The memory unit 22 stores therein the received edited video/audio signal S5 at a specified address, under the control of the CPU 30. The videotape recorder $23_1$ to $23_n$ records the edited video/audio signal S5 at a specified position on a video tape under the control of the CPU 30.

As described above, this editing system 1 is capable of saving or recording edited video/audio in the memory unit 22 or on a video tape, the edited video/audio created by editing according to created edit data. This embodiment uses the memory unit 22 for store clips, but the hard disk drive 33 can be used for this purpose.

(1-2) Operations on Edit Screen 50

(1-2-1) Method for Playing Back Clip on Edit Screen 50

(1-2-1-1) How to Play Back Clip on Edit Screen 50

Figure 3:
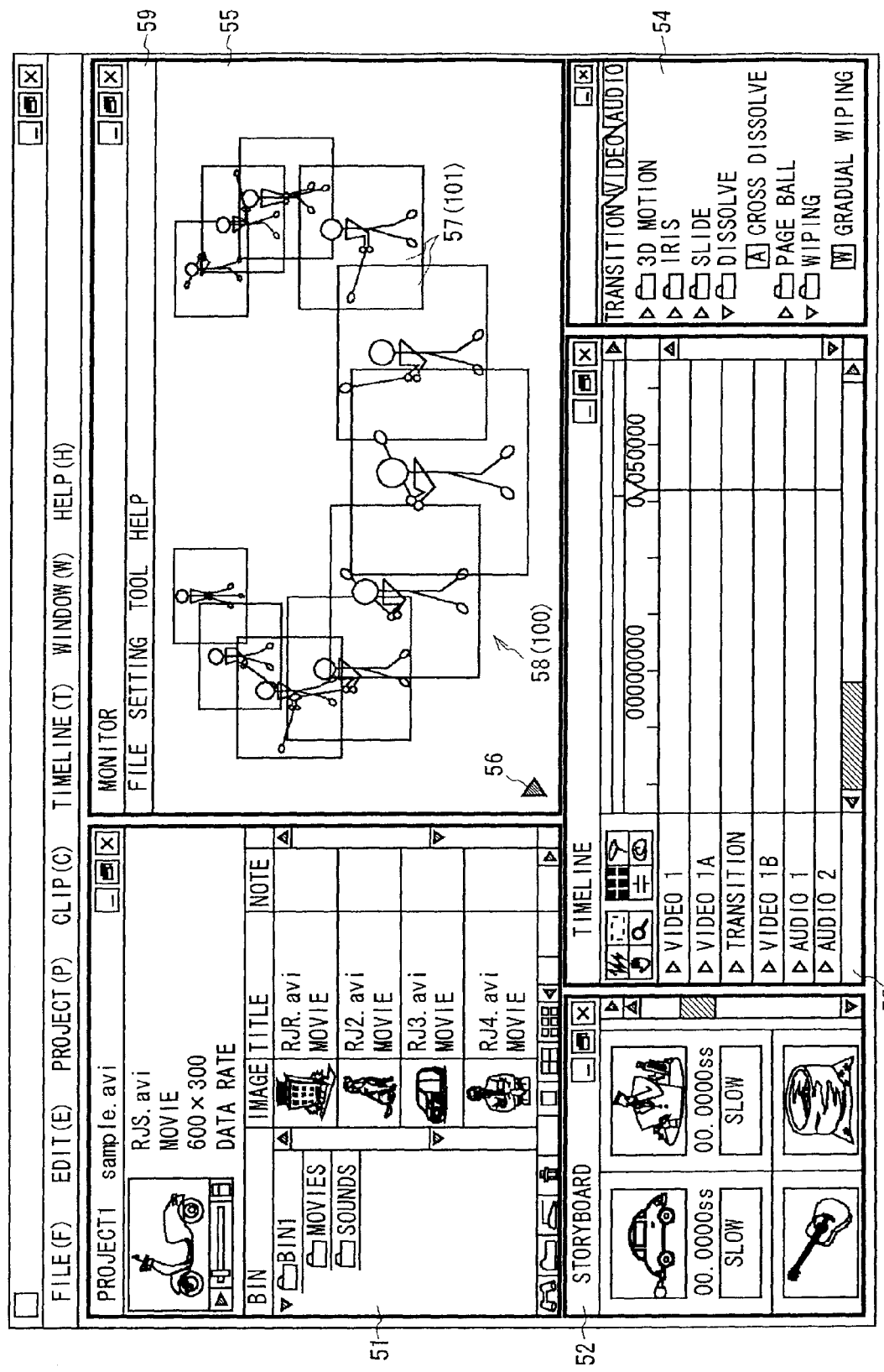
FIG. 3 schematically shows a configuration of an edit screen according to the embodiment.

When a command for displaying an edit screen is entered by operating the mouse 38 or the keyboard 39, the CPU 30 controls the hard disk drive 33 and the signal processor 34 so as to display the edit screen 50 of FIG. 3 on the display 40.

Figure 1:
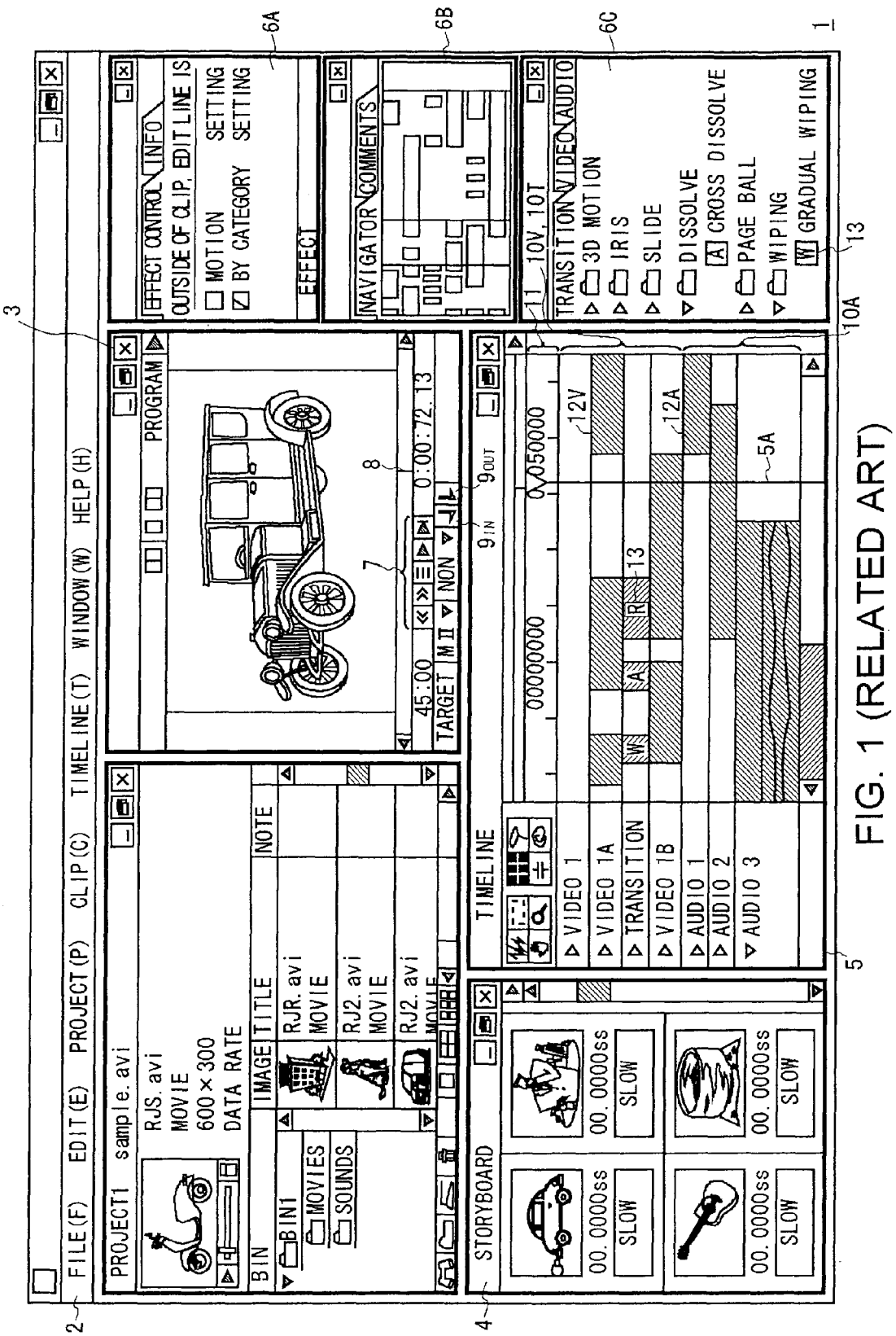
FIG. 1 schematically shows an example of an edit screen in related art.

This edit screen 50 has a collections area 51, a Storyboard view 52, a Timeline view 53, an effects view 54, which are similar to the Collections area 2, the Storyboard view 4, the Timeline view 5, and the effects views 6A to 6C of the above-described edit screen 1 of FIG. 1, and a Workspace window 55 that is unique to this edit screen 50. On this edit screen 50, editing work is mainly done on the Workspace window 55, and the Storyboard view 52 and the Timeline view 53 are just supplemental views.

Figure 4:
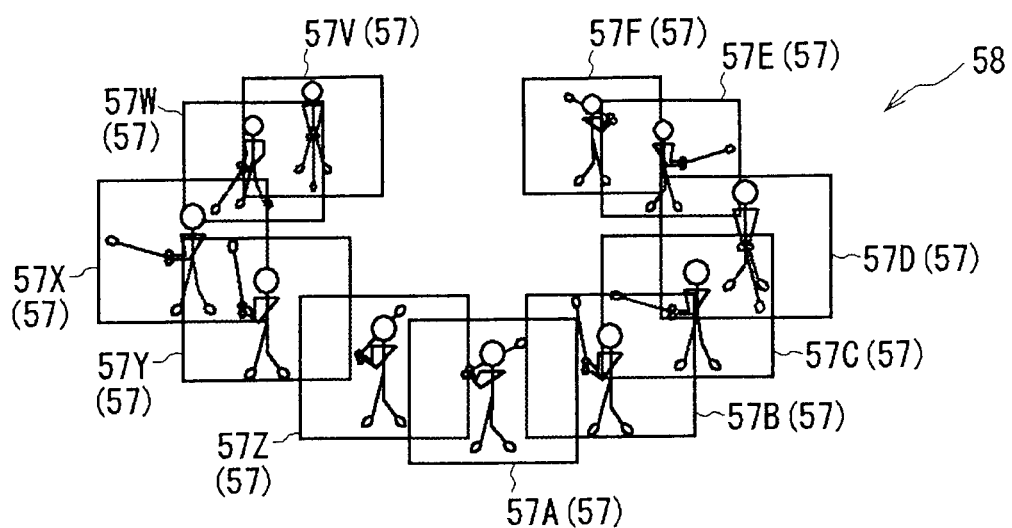
FIG. 4 schematically shows arrangement of display areas.

Referring to FIG. 4, for showing a series of actions, such as a golf swing, the Workspace window 55 has a display area group 58 including plural continuous display areas 57 (57F-57A-57V) which are first three-dimensionally curved in an elliptic form with the same number of display areas 57 arranged on the right side and the left side of the front central display area (hereinafter, referred to as main display area) 57A.

In this case, in the display areas 57 (57F-57A-57V) of the display area group 58, the main display area 57A is the largest and the other display areas 57 are smaller as they are away from the main display area 57A. In overlapped parts of the display areas 57 (57F-57A-57V), front display areas overlie back display areas.

Since the images on the display areas 57 (57F-57A-57V) are transparent, the images on parts of the display areas 57B and 57Z underlying the display areas 57A, the images on parts of the display areas 57C and 57Y underlying the display areas 57B and 57Z, the images on parts of the display areas 57D and 57X underlying the display areas 57C and 57Y, the images on parts of the display areas 57E and 57W underlying the display areas 57D and 57X, and the images on parts of the display areas 57F and 57V underlying the display areas 57E and 57W are also viewable.

To display a clip on the plural display areas 57 (57F-57A-57V), the CPU 30 obtains display information from the hard disk drive 33 and creates corresponding video data to be displayed on the display areas 57 (57F-57A-57V) by performing an image process based on the display information, the display information including the display size of each display area 57 (57F-57A-57V) and its display position on the Workspace window 55.

Figure 6:
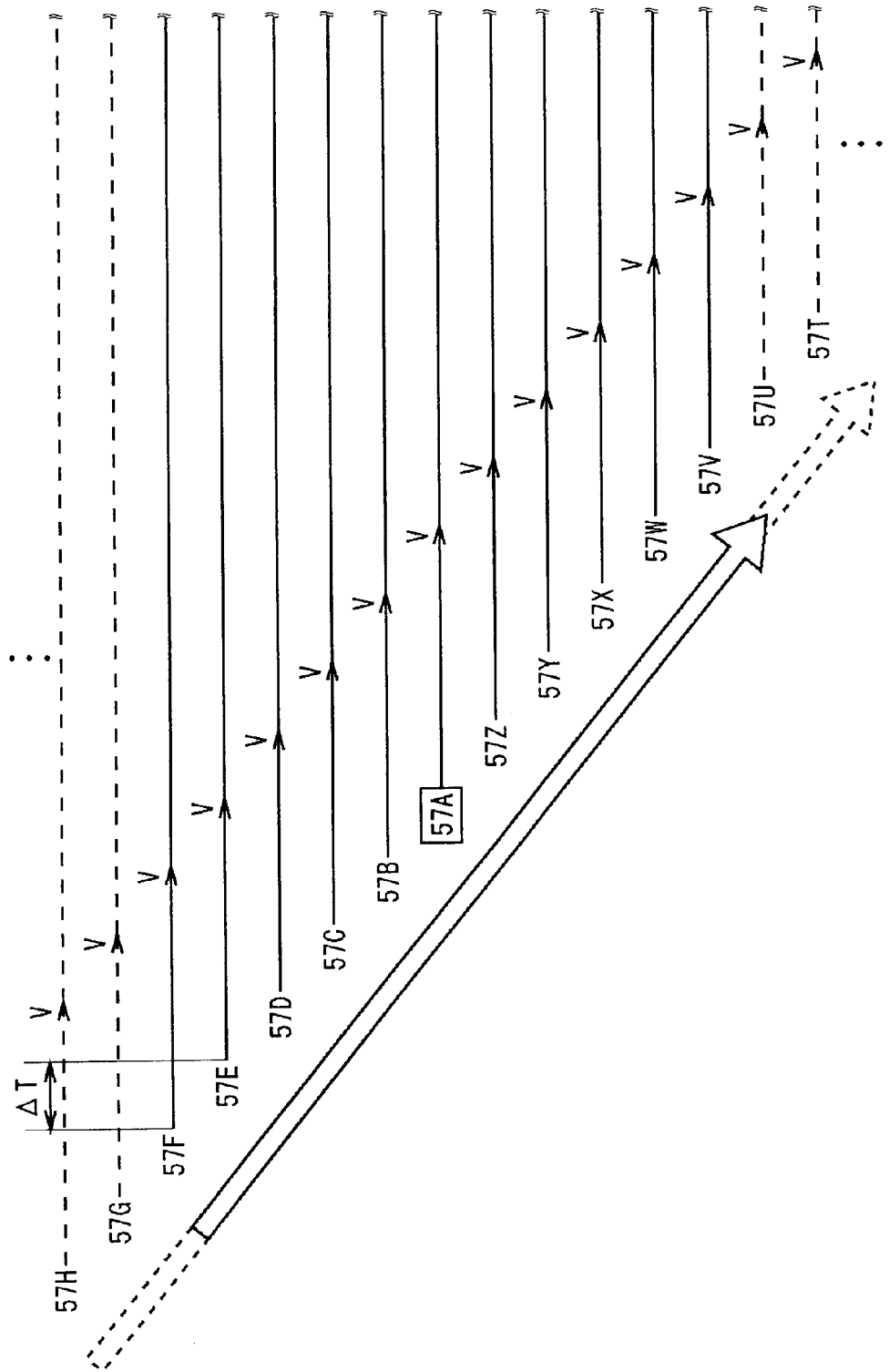
FIG. 6 is a timing chart for explaining playback intervals at which the clip is played back on the display areas.

For example, on the edit screen 50, when a desired clip out of a list of clips is dragged and dropped onto the Workspace window 55 from the Collections area 51 and then a play button 56 on the left-bottom corner of the Workspace window 55 is clicked, the clip is sequentially played back on the display areas 57 (57F-57A-57V) of the display area group 58 from the most-right display area 57F at preset time intervals (hereinafter, referred to as playback intervals) ΔT (FIG. 6). The playback interval is a time span after which next playback starts on a next display area, and is previously set.

Figure 5:
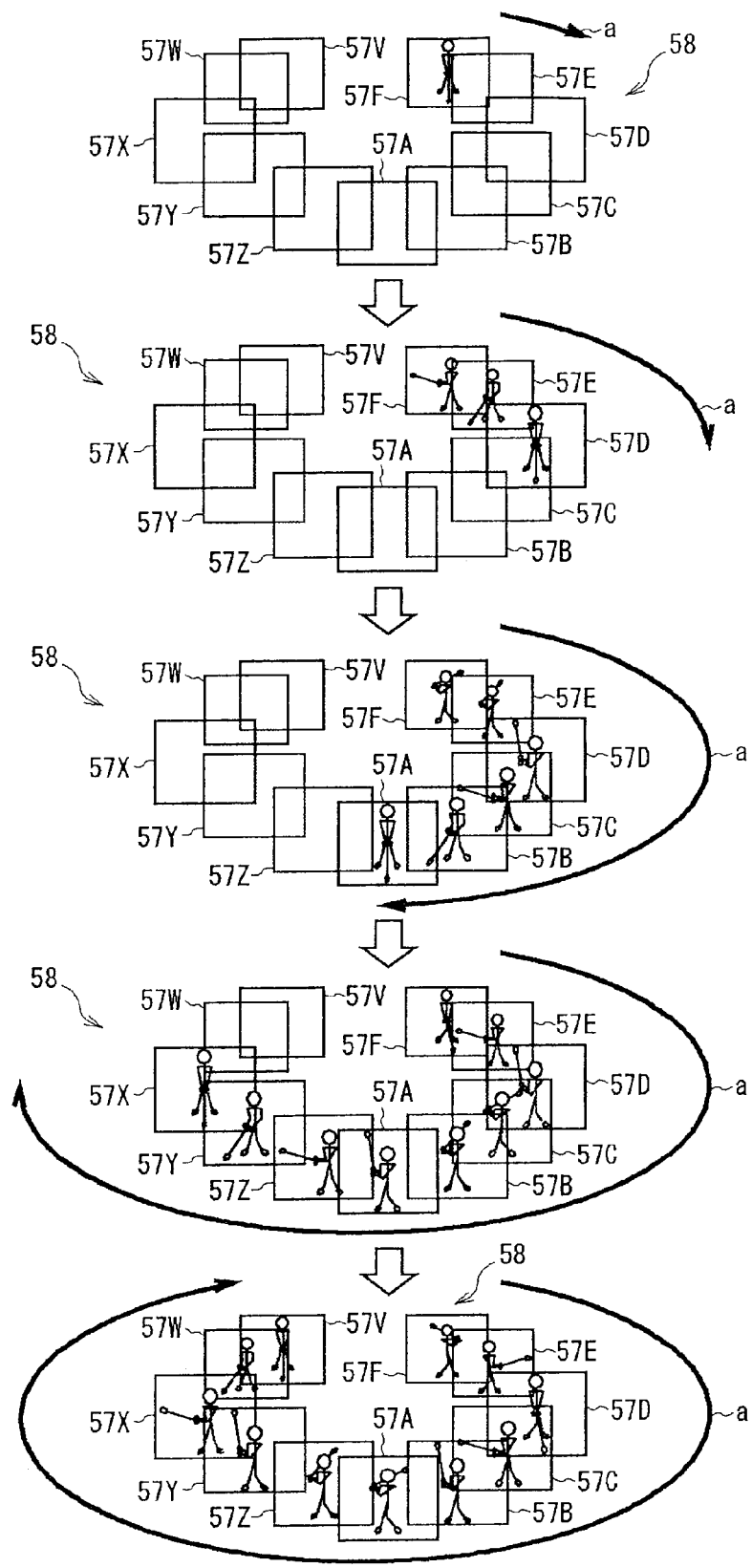
FIG. 5 is a conceptual view for explaining how to display images on a Workspace window.

Specifically, as shown in FIG. 6, the clip is first played back from the beginning on the right-back display area 57F, then the clip is played back from the beginning on the display area 57E next to the display area 57F when the playback interval ΔT has elapsed, and then the clip is played back from the beginning on the display area 57D next to the display area 57E when the playback interval ΔT has elapsed, . . . . In short, the clip is sequentially played back from the beginning on the display areas 57 at the prescribed playback intervals ΔT in an order specified by an arrow "a" of FIG. 5 that is an order in time series. It is noted that the dotted lines of FIG. 6 show clip playback timing for the display areas 57G, 57H, . . . , 57U, 57T which similarly show the clip in the background although they are not initially displayed on the edit screen 50 and will be described later.

As described above, the CPU 30 plays back the clip as a motion picture on the display areas 57 (57F-57A-57V) at the prescribed playback intervals ΔT as the display area group 58 having the display areas 57 (57F-57A-57V) linking up in a display order.

Figure 7:
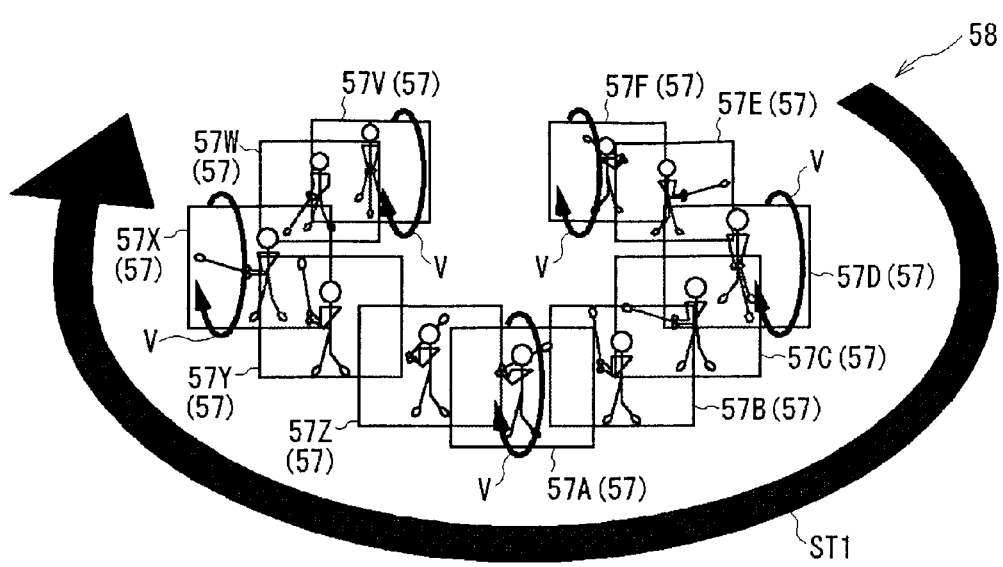
FIG. 7 schematically shows flowing display of images in a forward direction.

Further, as shown in FIG. 7, a clip is played back on each display area 57 (57F-57A-57F) at a preset image update speed, or at a preset playback speed v. When a high value is set as a playback speed v, the clip is played back on each display area 57 (57F-57A-57F) at a high speed accordingly. When a low value is set as a playback speed v, on the contrary, the clip is played back on each display area 57 (57F-57A-57F) at a slow speed accordingly.

Figure 8:
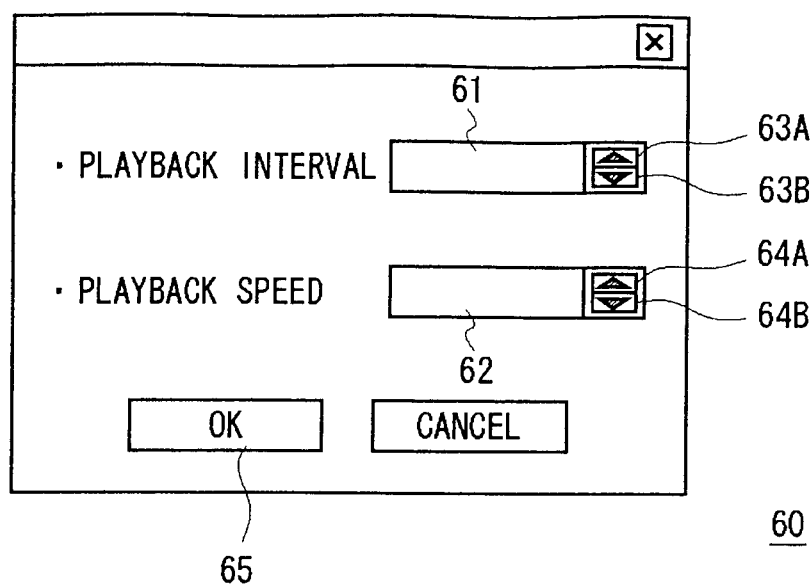
FIG. 8 schematically shows a playback interval/speed setting dialog.
Figure 9:
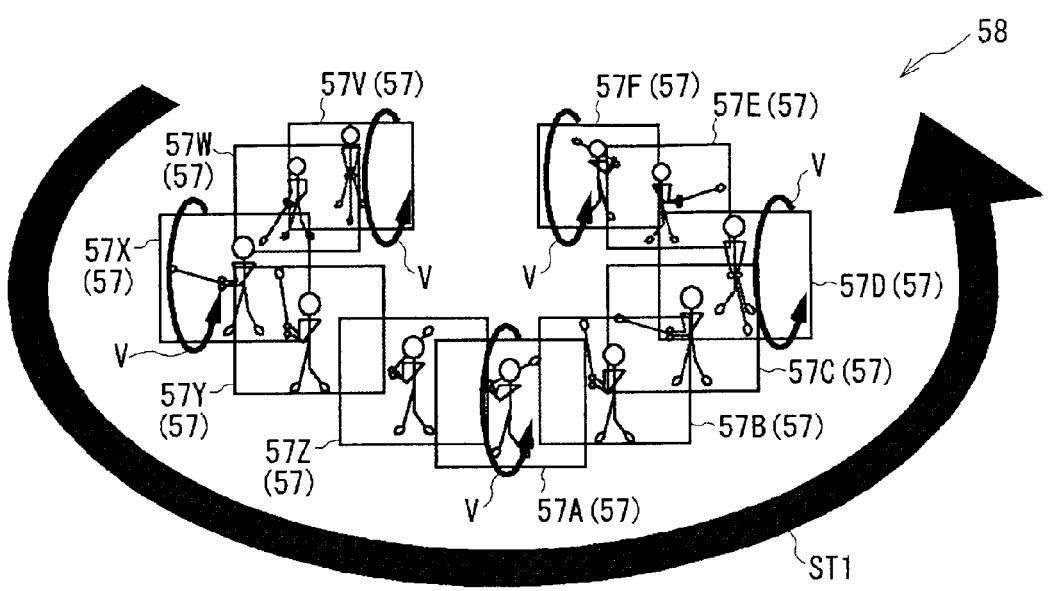
FIG. 9 schematically shows flowing display of images in a reverse direction.

The initial values of the playback interval ΔT and the playback speed v can be set on a playback interval/speed setting dialog 60 as shown in FIG. 8 which appears by clicking on "setting" on a Toolbar 59 locating at the top of the Workspace window 55 and then choosing "playback interval/speed" in an appearing context menu not shown.

Actually, desired values are entered in the text boxes 61 and 62 on the playback interval/speed setting dialog 60 by using up/down keys 63A, 63B, 64A, and 64B or can be directly entered with the keyboard 39. It should be noted that the values in the text boxes 61 and 62 are set as the initial values of the playback interval ΔT and playback speed V.

With the editing apparatus 51, by setting short playback intervals ΔT and a slow playback speed v, the display area group 58 shows a short part of a clip. By setting long playback intervals ΔT and a slow playback speed v, the display area group 58 shows a long part of the clip.

The display areas 57 (57F-57A-57V) as shown in FIG. 7 display a clip at a variable playback speed according to change of the playback speed v, and also sequentially start to display the clip at certain time intervals according to change of the playback intervals ΔT. As a whole, the displayed images are like flowing in a forward direction shown by a thick arrow ST1 at a variable playback speed.

In this case, out of the display areas 57 (57F-57A-57V) displaying the clip, the display area 57F displays the latest image while the display area 57V displays the earliest image. This allows the user to intuitively feel that the images are like flowing in time series.

When −v is set as a playback speed, a clip on each display area 57 (57F-57A-57V) is played back in a rewind mode at a variable playback speed. In addition, as described above, the time intervals for starting playback vary depending on setting of the playback interval ΔT. As a whole, the displayed images are like flowing in a reverse direction shown by a thick arrow ST2 in a rewind mode at a variable playback speed.

Furthermore, on the edit screen 50, when a clip is dragged and dropped from the Collections area onto the Workspace window 55 showing at least one display area group 58 for another clip, a new display area group 58 for the dropped clip appears in the Workspace window 55 in addition to the existing display area group 58.

On the other hand, when one or some display area groups 58 are selected, and dragged and dropped onto the Collections area 51 from the Workspace window 55 showing plural display area groups 58, the selected display area groups 58 are erased from the Workspace window 55. Alternatively, display area groups 58 can be erased by selecting one or some display area groups 58 and pressing the "Delete" key.

In a situation where some display area groups 58 exist in the Workspace window 55, a desired clip can be played back by selecting the corresponding display area group 58 and clicking on the play button 56. In this connection, playback intervals ΔT and a playback speed v for this playback are ones set in the above-described playback interval/speed setting dialog 60.

On the other hand, by clicking on "setting" on the Toolbar 59 of the Workspace window 55 and choosing "sound output mode" in the appearing context menu, not shown, a sound output mode is selected from, for example, "main sound output mode" and "all sound output mode", for a clip being selected on the Workspace window 55.

In a case of the "main sound output mode", only sound for the main display area 57A of the active display area group 58 is output from the loudspeaker 41. In a case of the "all sound output mode", sounds for the display areas 57 (57F-57A-57V) of the active display area group 58 are adjusted and output from the loudspeaker 41 so that smaller sounds are output as the display areas are away from the main display area 57A.

In the "all sound output mode", if prescribed sound mixing, which may produce harsh sound, is predicted, for example, when long playback intervals ΔT are set or when a scene change is displayed, output sounds are automatically adjusted so that only sounds for the main display area 57A and some neighboring display areas 57 (57F-57A-57V) are output from the loudspeaker 41. Thereby good sounds are output even in the "all sound output mode".

(1-2-1-2) CPU Processing for Playback on Edit Screen 50

Figure 10:
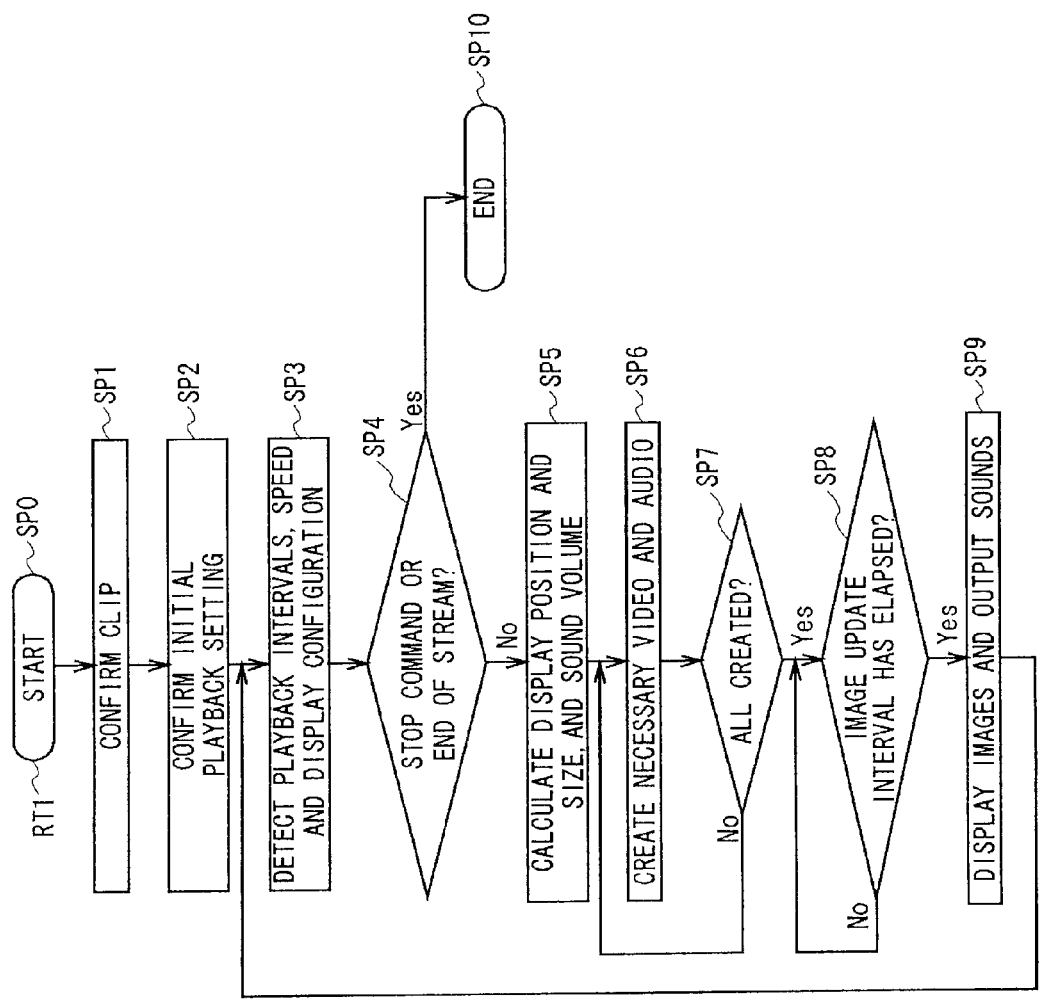
FIG. 10 is a flowchart of a playback procedure.

To play back a clip, the CPU 30 executes a playback procedure RT1 of FIG. 10 based on the control program being stored in the ROM 31 (FIG. 2).

When one clip is dragged and dropped onto the Workspace window 55 from the Collections area 51 of the edit screen 50 and then the play button 56 is clicked (in a case where plural display area groups 58 exit on the Workspace window 55, when one display area group 58 is selected and the play button

56 is clicked), the CPU 30 starts this playback procedure RT1 at step SP0 and then confirms the clip ID of the selected clip at step SP1.

At step SP2, the CPU 30 confirms the initial values of a playback speed v (or –v) and playback intervals ΔT, and a sound output mode. At step SP3, the CPU 30 detects a playback speed v (or –v), playback intervals ΔT, and a display configuration, if they have been set with the mouse 38 or the keyboard 39.

At step SP4, the CPU 30 determines whether a stop command has been entered or whether a stream has ended. When the determination is YES, the process goes on to step SP10 to stop updating images. When the determination is NO, on the contrary, the process goes on to step SP5.

At step SP5, the CPU 30 calculates the display position and display size of an image to be displayed on each display area 57 (57F-57A-57V) of the display area group 58, and also calculates a volume of sound accompanying the image.

At step SP6, the CPU 30 controls the memory unit 22 based on the clip ID confirmed at step SP1 so as to read the corresponding video/audio signal S4 at the playback speed confirmed at step SP2, decodes the compressed video/audio signal S4, when necessary. Then the CPU 30 creates video signals S2 so that the images of the calculated sizes are displayed at the calculated positions, and at the same time creates corresponding audio signals S3 with the calculated signal level, and then temporarily stores the video signals S2 and the audio signals S3 in the RAM 32 or the memory of the signal processor 34.

At step SP7, the CPU 30 determines whether images and sounds for all of the display areas 57 (57F-57A-57V) have been all prepared. When the determination is NO, the process returns back to step SP6. When the determination is YES, the process goes on to step SP8.

At step SP8, the CPU 30 watches the passage of an image update interval. When the image update interval has expired, the CPU 30 displays the images on the display areas 57 as the display area group 58 and outputs accompanying sounds from the loudspeaker 41 at the corresponding volumes at step SP9. Then the process returns back to step SP3 to prepare next images and sounds.

In this process, the CPU 30 uses video data which was used before and still exists in the RAM 32 or the memory of the signal processor 34, if the data is still usable, and creates only missing data and overwrites the oldest video data with the newly created video data in the RAM 32 or the memory of the signal processor 34.

(1-2-2) Various Operations on the Workspace Window 55 of the Edit Screen 50

Various operations that can be made on the Workspace window 55 of the edit screen 50 will be now described.

(1-2-2-1) Basic Operations

Figure 11:
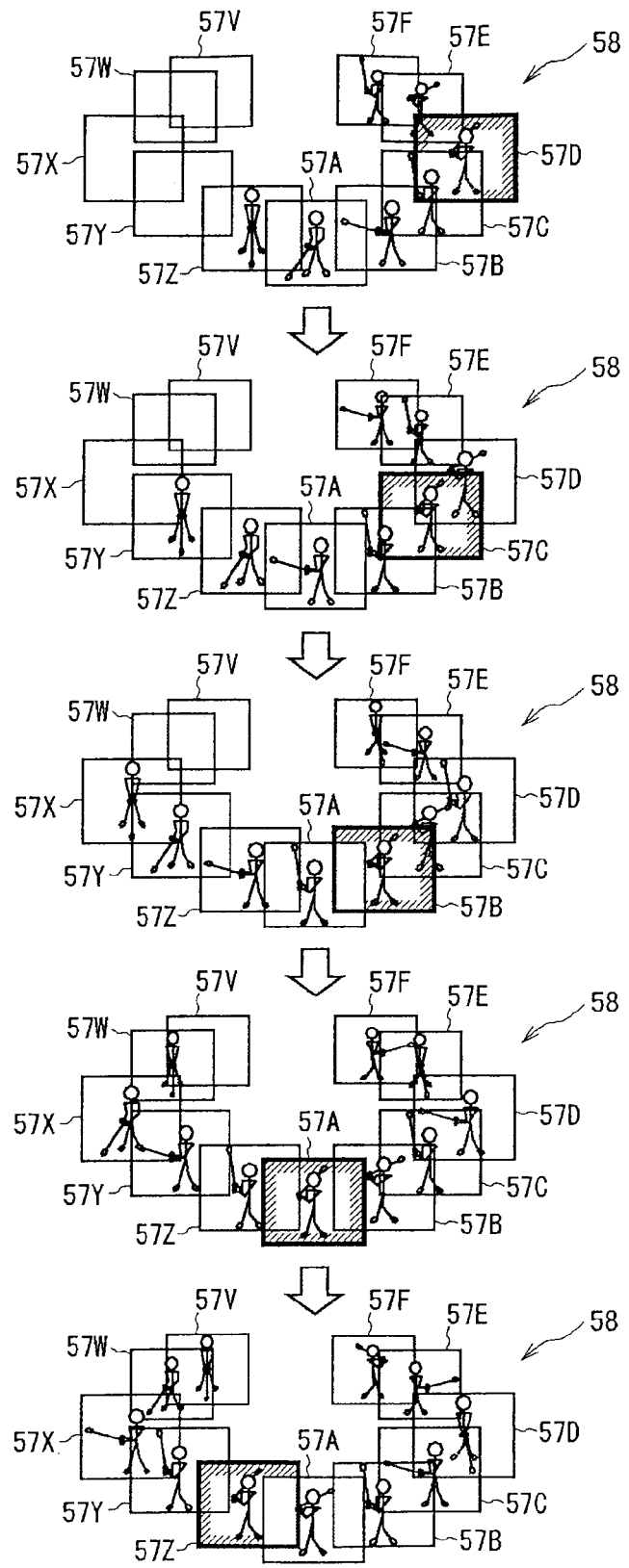
FIG. 11 is a schematic view for explaining a basic operation on the Workspace window.

As shown in FIG. 11, by clicking on a display area 57 (57F-57A-57V) displaying a desired image considered as an edit point (by clicking on a display area 57D, in this case) out of the display areas 57 (57F-57A-57V) of the display area group 58, the display area 57D can highlight the image as the edit position in a prescribed color.

Figure 12:
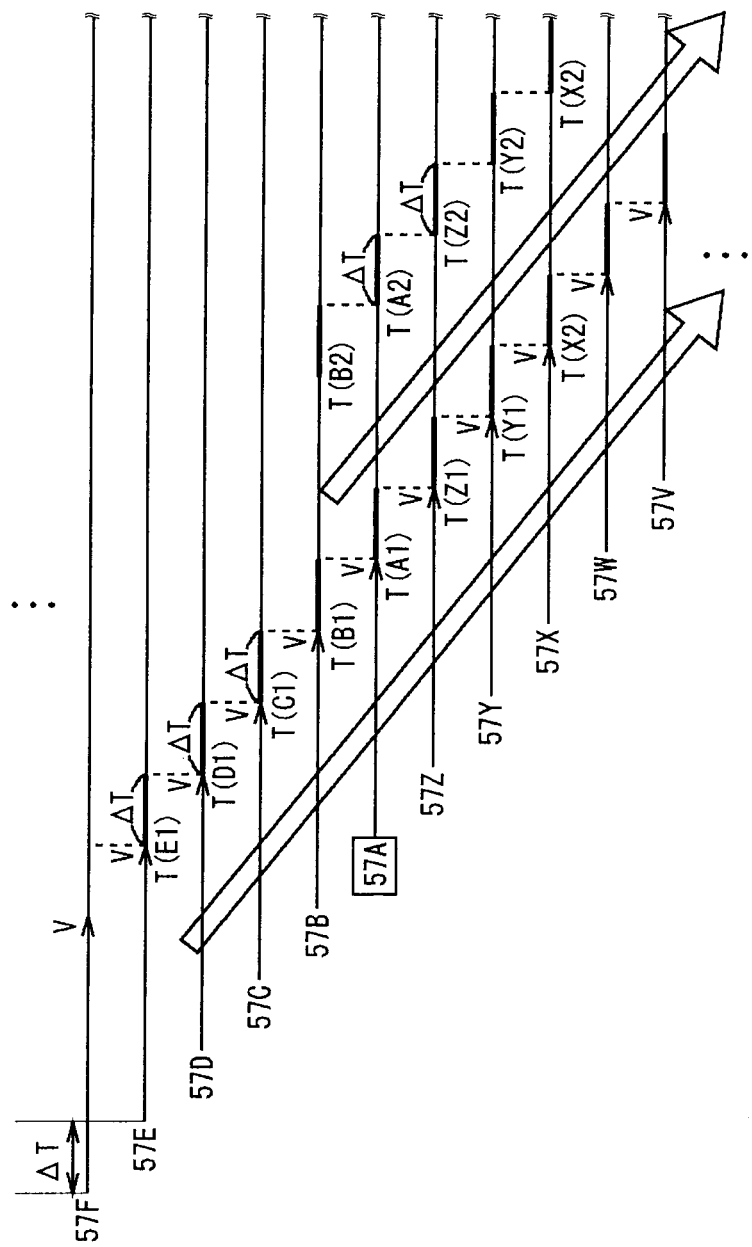
FIG. 12 is a timing chart for explaining how coloring shifts on the display areas.

This coloring shifts one after another at playback intervals ΔT following the flow of the image corresponding to the edit point in the display area group 58 so that a display area 57 (57F-57A-57V) displaying the desired image is colored, as shown in FIGS. 11 and 12. This allows the user to confirm which display area 57 is now displaying the desired image.

That is, the first colored display area 57 (57D) displays the image which the user first takes as the edit point. Since the coloring shifts one after another, this image can continue to be highlighted on the display areas 57 (57F-57A-57V). Thereby the user can immediately and intuitively recognize the first noticed image while the images flow on the display areas 57 (57F-57A-57V) as shown by a long thick arrow of FIG. 12.

When an image that a user first takes as an edit point is displayed on the display area 57B, as shown by a short thick arrow of FIG. 12, this image continues to be highlighted, which allows the user to feel as if the clip starts with the image.

Figures 13A, 13B:
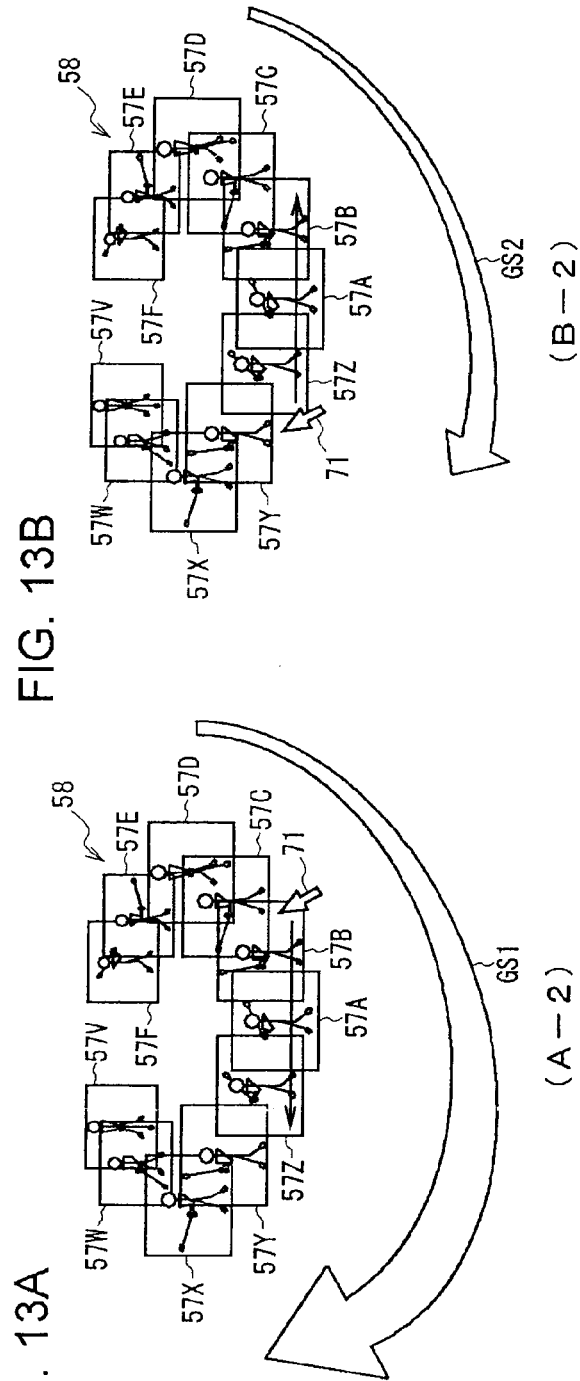
FIGS. 13A and 13B are schematic views for explaining basic operations on the Workspace window.

To increase a display speed of a clip on the Workspace window 55, the user presses an "up (↑)" key 70U of directional keys 70 of the keyboard 39 (FIG. 13A (A-1)) or performs a display control input by placing the cursor 71 somewhere on the display area group 58 and dragging the cursor 71 to the left on the display area group 58 while pressing the right button of the mouse 38 (FIG. 13A (A-2)).

At this time, the CPU 30 obtains display condition changing information corresponding to the display control input made with the mouse 38, via the first interface 36A, and increases the display speed of the clip based on the obtained information.

The "increase display speed of clip" means that the playback speed v and the playback intervals ΔT are both increased for the clip being played back on the display areas (57F-57A-57V) of the display area group 58.

The longer the user presses the "up (↑)" key 70U of the keyboard 39 or drags the cursor 71 on the display area group 58 with the mouse, the greater "the display speed of the clip" changes. That is, the longer such a pressing or dragging time is, the more the playback speed v and playback intervals ΔT are increased. Thereby the overall apparent speed of the clip (a speed of flowing an image) becomes faster.

In other words, the longer the user presses the "up (↑)" key 70U of the keyboard 39 or drags the cursor 71 to the left on the display area group 58 with the mouse, the more a playback acceleration speed GS1 of the clip being played back on the display areas 57 (57F-57A-57V) of the display area group 58 is increased. Alternatively, based on how many times the "up (↑)" key 70U of the keyboard 39 is pressed, the playback acceleration speed GS1 can be increased.

Further, to decrease the display speed of a clip, the user presses the "down (↓)" key 70D of the directional keys 70 of the keyboard 39 (FIG. 13B (B-1)) or performs a display control input by placing the cursor 71 somewhere on the display area group 58 and dragging the cursor 71 to the right on the display area group 58 while pressing the right button of the mouse 38 (FIG. 13B (B-2)).

At this time, the CPU 30 obtains display condition changing information corresponding to the display control input made with the mouse 38, via the first interface 36A, and decreases the display speed of the clip based on the obtained information.

The "decrease display speed of clip" means that the playback speed v and the playback intervals ΔT are both decreased for the clip being played back on the display areas 57 (57F-57A-57V) of the display area group 58.

The longer the user presses the "down (↓)" key 70D of the keyboard 39 or drags the cursor 71 with the mouse, the greater "the display speed of the clip" changes. That is, the longer such a pressing or dragging time is, the more the playback speed v and longer playback intervals ΔT are decreased. Thereby the overall apparent speed of the clip becomes slower.

In other words, the longer the user presses the "down (↓)" key 70D of the keyboard 39 or drags the cursor 71 to the right on the display area group 58 with the mouse, the more a playback acceleration speed GS2 of the clip being played back on the display areas 57 (57F-57A-57V) of the display area group 58 is decreased. Alternatively, based on how many times the "down (↓)" key 70D of the keyboard 39 is pressed, the playback acceleration speed GS2 can be decreased.

After a playback speed v or playback intervals ΔT decrease to "0", their values further decrease to negative values. In this case, images flowing in the forward direction in the display area group 58 gradually slow down and then stop, and the images start to flow in a reverse direction in a rewind mode and the flow accelerates.

Furthermore, to pause the playback, the user places the cursor 71 somewhere on the display area group 58, and presses down and holds the left button of the mouse 50 for more than one second. The "pause playback" means keeping still images on the display areas 57 (57F-57A-57V) of the display area group 58, the still images having a time difference of the playback interval ΔT between them.

(1-2-2-2) Special Operations
(1-2-2-2-1) How to Change Playback Intervals ΔT and Playback Speed v To only increase playback intervals ΔT of a clip with remaining a playback speed v the same, the user performs the "increase display speed of clip" operation while pressing the "shift" key of the keyboard 39, the "increase display speed of clip" operation made by pressing the "up (↑)" key 70U of the directional keys 70 of the keyboard 39 or placing the cursor 71 somewhere on the display area group 58 and dragging the cursor 71 to the left on the display area group 58 while pressing the right button of the mouse 38.

At this time, the CPU 30 obtains display condition changing information corresponding to the display control input made with the keyboard 39 or the mouse 38, via the first interface 36A, and increases the playback intervals ΔT with remaining the playback speed v the same, based on the obtained information.

In this case, although the continuousness of images being displayed on the display areas 57 deteriorates, a longer part of the clip can be displayed on the display area group 58 as a whole.

Further, to decrease only playback intervals ΔT with remaining a playback speed v the same, the user performs the "decrease display speed of clip" operation while pressing the "shift" key of the keyboard 39, the "decrease display speed of clip" operation made by pressing the "down (↓)" key 70D of the directional keys 70 of the keyboard 39 or placing the cursor 71 somewhere on the display area group 58 and drags the cursor 71 to the right on the display area group 58 while pressing the right button of the mouse 38.

At this time, the CPU 30 obtains display condition changing information corresponding to the display control input made with the keyboard 39 or the mouse 38, via the first interface 36A, and decreases the playback intervals ΔT with remaining the playback speed v the same, based on the obtained information.

In this case, although a short part of the clip is displayed on the display area group 58 as a whole, high continuousness of images being displayed on the display areas 57 (57F-57A-57V) of the display area group 58 is realized, and the same image sequentially shifts on the display areas 57 (57F-57A-57V) at the short playback intervals ΔT, like it flows in the forward direction in the display area group 58. This flow becomes faster as the playback intervals ΔT decrease.

Furthermore, to increase a playback speed v with remaining playback intervals ΔT the same, the user performs the "increase display speed of clip" operation while pressing both the "shift" and "ALT" keys of the keyboard 39.

At this time, the CPU 30 obtains display condition changing information corresponding to the display control input made with the keyboard 39 or the mouse 38, via the first interface 36A, and increases the playback speed v with remaining the playback intervals ΔT the same.

As a result, while a part of the clip being displayed on the display area group 58 as a whole remains the same, only the playback speed of the clip on each display area 57 can be made faster. In this case, high continuousness of images being displayed on the display areas 57 (57F-57A-57V) is realized.

Furthermore, to decrease a playback speed v with remaining playback intervals ΔT the same, the user performs the "decrease display speed of clip" operation while pressing both the "Shift" and "ALT" keys of the keyboard 39.

At this time, the CPU 30 obtains display condition changing information corresponding to the display control input made with the keyboard 39 or the mouse 38, via the first interface 36A, and decreases the playback speed v with remaining the playback intervals ΔT the same.

As a result, while a part of the clip being displayed on the display area group 58 as a whole remains the same, only the playback speed of the clip on each display area 57 (57F-57A-57V) slows down. In this case, the continuousness of images being displayed on the display areas 57 (57F-57A-57V) deteriorates.

(1-2-2-2-2) Instant-Forwarding and Rewinding Operation of Clip

Figure 14A:
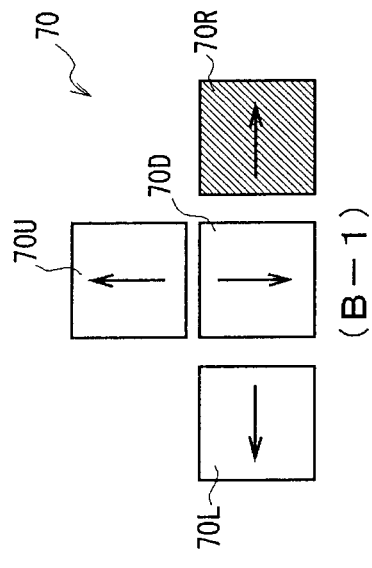
FIGS. 14A and 14B are schematic views for explaining special operations on the Workspace window.
Figure 14A:
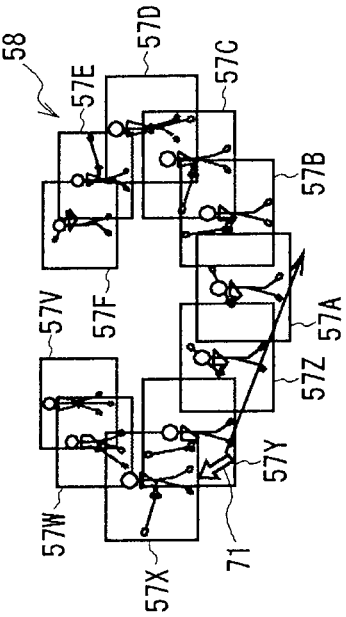
Figure 15:
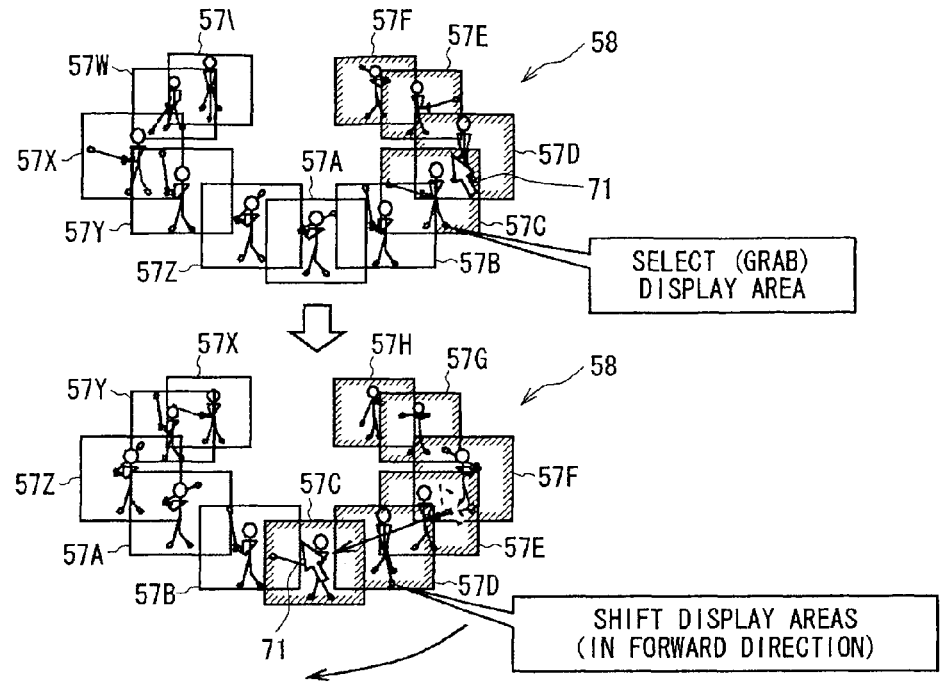
FIGS. 15 and 16 are a conceptual view and a timing chart showing how the display areas move by a special operation.

To shift the positions of the display areas 57 in the forward direction in the display area group 58 as shown in FIG. 15, the user presses a "left (←)" 70L of the directional keys 70 of the keyboard 39 (FIG. 14A (A-1)), or performs a display-area selecting operation by selecting (grabbing) a certain display area (57C) of the display area group 58 with the cursor 71 by pressing the left button of the mouse 38 and then performs a display-area shifting operation by dragging the cursor 71 to a desired destination position in the left on the display area group 58 (FIG. 14A (A-2)).

At this time, the CPU 30 obtains display condition changing information corresponding to the display-area shifting operation input made with the keyboard 39 or the mouse 38, via the first interface 36A, and shifts the positions of the display areas 57 in the forward direction together with the movement of the cursor 71 (FIG. 15). In this case, the playback speed v and the playback intervals ΔT remain the same.

Figure 16:
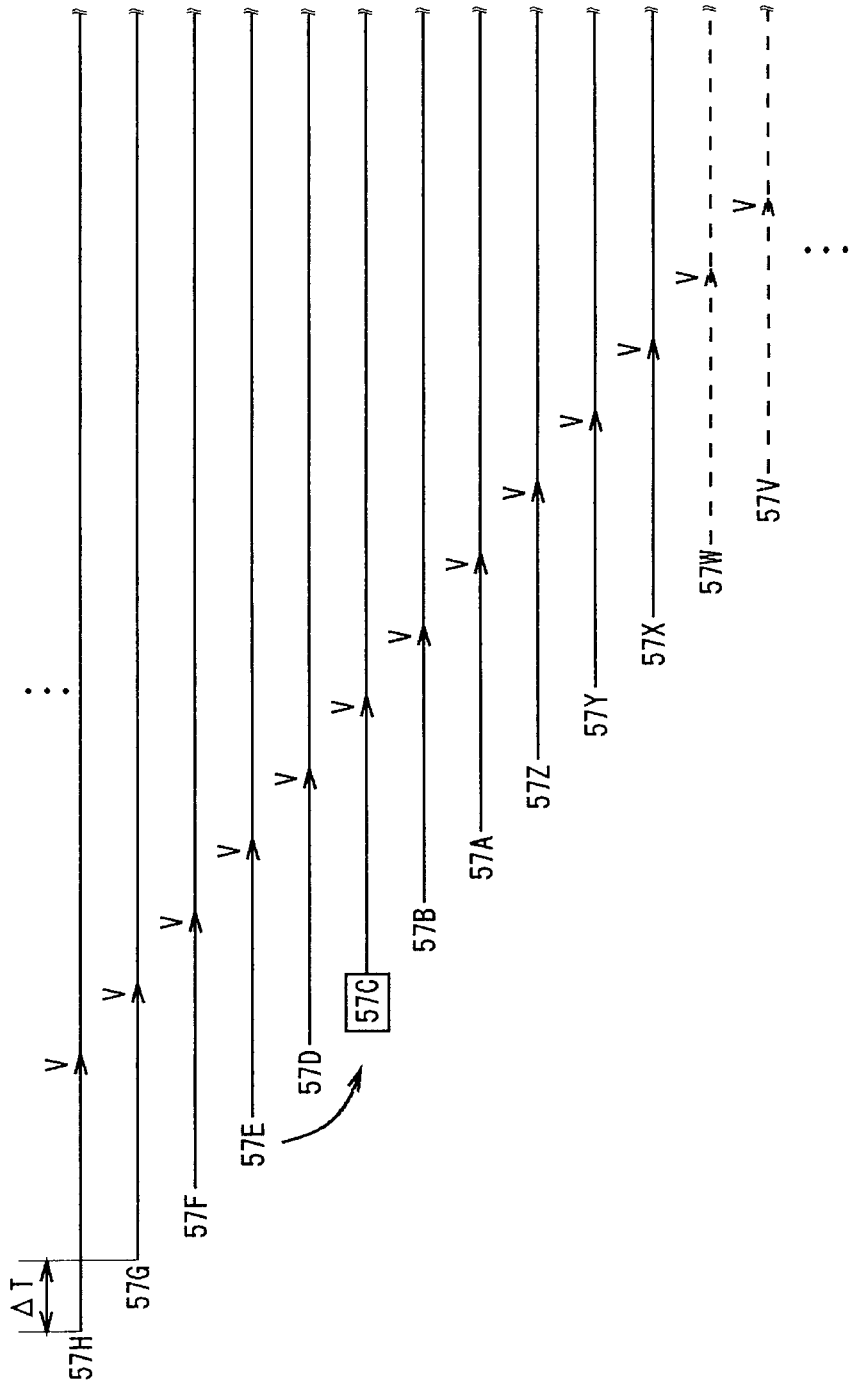

Specifically, the grabbed display areas 57 (57C) are moved to the destination position in the display area group 58 and the other display areas 57 are also moved together. In addition, with the image of the main display area 57A as a basis, some of display areas 57V, 57W, . . . displaying past images disappear and some display areas 57G, 57H, . . . displaying future images newly appear in the display area group 58 so that the same number of display areas exist on the both sides of a new main display area 57C as shown in FIGS. 15 and 16. The display areas 57G, 57H, . . . displaying future images are shown by dotted lines in FIG. 6.

In this connection, in response to the display-area selecting operation for the display area 57C (FIG. 15), the CPU 30 highlights the display area 57C (surrounded by dotted line), and then sequentially highlights the display areas 57D, 57E, . . . displaying future images in the display order. This allows the user to intuitively recognize the continuation of the image of a time when the display area 57C is selected and shifted.

In addition, when the user performs the display-area selecting operation, the CPU 30 temporarily stops (keeps) the images on the display area 57C or all the display areas 57 so that the user can visually confirm the images.

When the user performs a display-area selection canceling operation for canceling the selection of the display area 57C, the CPU 30 resumes the playback on the display area 57C or all the display areas 57, resulting in playing back the clip on the display areas 57 of the display area group 58 at the playback intervals again.

It should be noted that the sizes of the display areas 57 ( . . . , 57F-57A-57V, . . . ) after shift vary depending on their positions. As described before, the relationship between position and size is specified by display information. Therefore, the user can feel as if the image of each display area 57 (57F-57A-58V) of the display area group 58 jumps to a future image at moment.

At this time, in a case where the main sound output mode is set as a sound output mode, only sound for the current main display area 57 (57C in FIG. 14A (A-2)) is output. In a case of the all sound output mode, sounds for all the display areas 57 ( . . . , 57F-57A-57V, . . . ) are adjusted and output so that smaller sounds are output as the display areas 57 (57D-57F, . . . , 57B, 57A, 57Z-57W, . . . ) are away from the main display area 57 (57C).

Figure 14B:
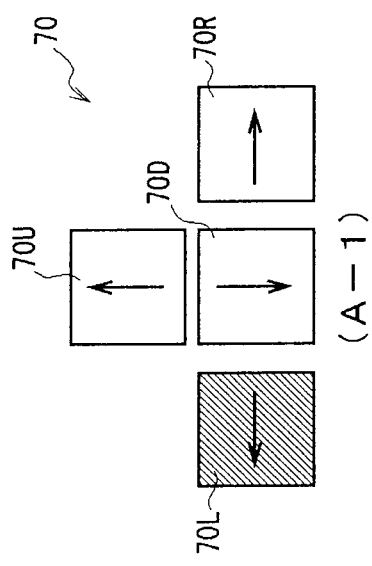
Figure 14B:
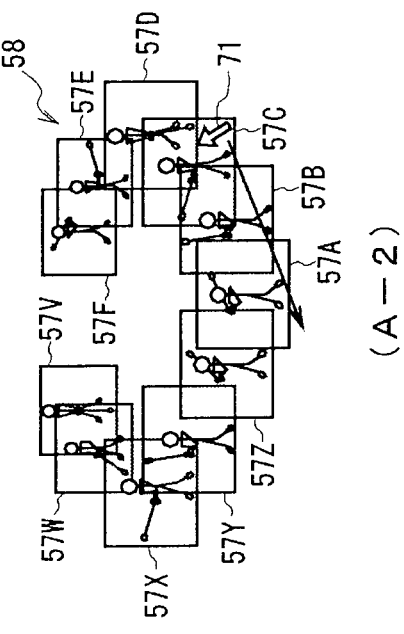
Figure 17:
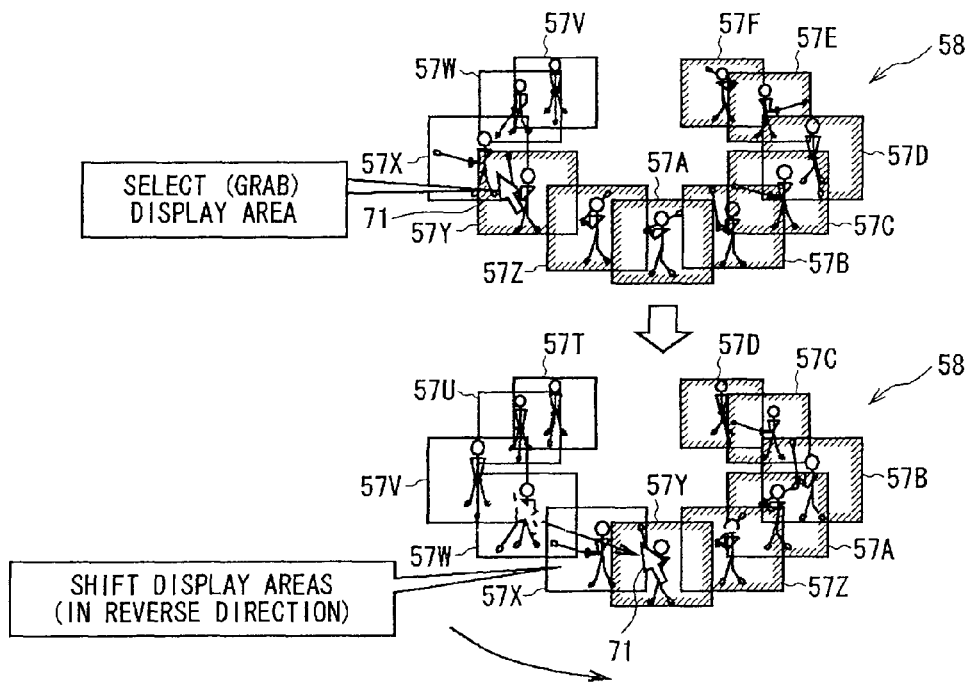
FIGS. 17 and 18 are a conceptual view and a timing chart showing how the display areas move by a special operation.

Further, to shift the positions of the display areas 57 of the display area group 58 in the reverse direction as shown in FIG. 17, the user pressing the "right (→)" key 70R of the directional keys 70 of the keyboard 39 (FIG. 14B (B-1), or performs a display-area selecting operation by selecting (grabbing) a certain display area (display area 57Y) of the display area group 58 with the cursor 71 by pressing the left button of the mouse 38 and then performs a display-area shifting operation by dragging the cursor 71 to a desired destination position in the right (FIG. 14B (B-2)).

At this time, the CPU 30 obtains display condition changing information corresponding to the display-area shifting operation input made with the keyboard 39 or the mouse 38, via the first interface 36A, and shifts the positions of the display areas 57 of the display area group 58 in the reverse direction together with the movement of the cursor 71 as shown in FIG. 17. In this case, both a playback speed v and playback intervals ΔT remain the same.

Figure 18:
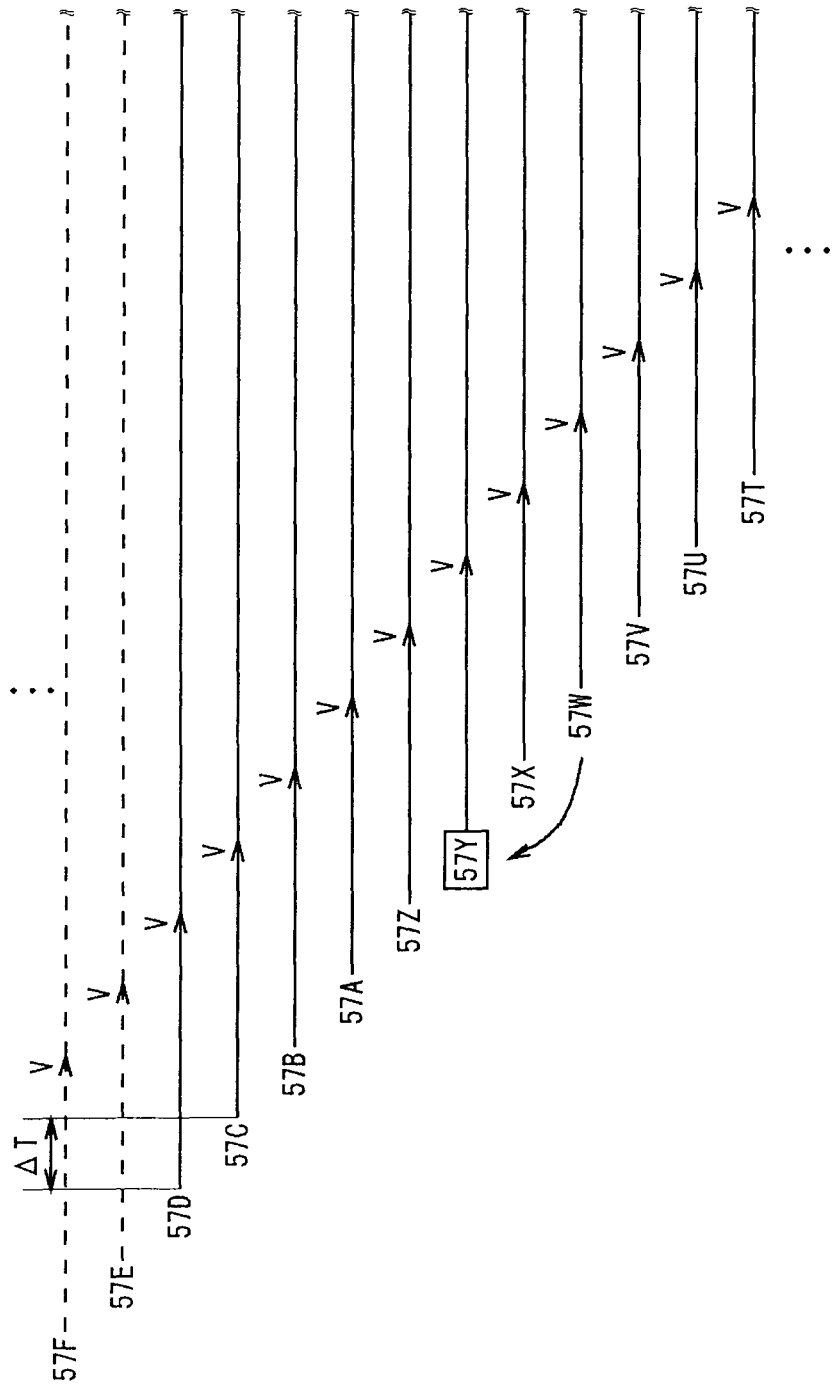

Specifically, the grabbed display area 57Y is moved to the destination position in the display area group 58 and the other display areas 57 are also moved together. By this display-area shifting operation, with the image of the main display area 57A as a basis, some of display areas 57F, 57E, . . . displaying future images disappear and some display areas 57U, 57T, . . . displaying past images newly appear in the display area group 58 so that the same number of display areas exist on the both sides of a new main display area 57Y as shown in FIGS. 17 and 18. The display areas 57U, 57T, . . . displaying the future images are shown by dotted lines in FIG. 6.

In short, this display-area shifting operation can shift the positions of the display areas 57 in the reverse direction at moment while the flowing playback is performed in the forward direction on the display areas 57 (57F-57A-57V). Therefore, unlike the rewinding of long-GOP MPEG data, response property for display does not deteriorate, resulting in immediately displaying past images.

In response to the display-area selecting operation (FIG. 17) for the display area 57Y, the CPU 30 highlights the display area 57Y (surrounded by dotted lines), and then sequentially highlights the display areas 57Z, 57A, . . . displaying future images in the display order. This allows the user to intuitively recognize the continuation of the image of a time when the display area 57Y is selected and shifted.

When the user performs the display-area shifting operation, the CPU 30 temporarily stops (keeps) the images on the display area 57C or all the display areas 57, which allows the user to visually confirm them.

When the user performs a selection canceling operation for canceling the selection of the display area 57Y, the CPU 30 resumes the playback on the display area 57C or all the display areas 57, resulting in playing back the clip on the display areas 57 of the display area group 58 at the playback intervals again.

It should be noted that the sizes of the display areas 57 ( . . . , 57F-57A-57V, . . . ) after shift vary depending on their positions. As described before, the relationship between position and size is specified by display information. Therefore, the user can feel as if the image of each display area 57 of the display area group 58 jumps to a past image at moment.

At this time, in a case where the main sound output mode is set as a sound output mode, only sound for the current main display area 57 (57Y in FIG. 14B (B-2)) is output. In a case of the all sound output mode, sounds for all the display areas 57 are adjusted and output so that smaller sounds are output as the display areas (57X, 57W, . . . , 57Z, 57A-57F, . . . ) are away from the main display area 57 (57Y).

(1-2-2-2-3) How to Change Display Configuration of Display Area Group 58

Figure 19A:
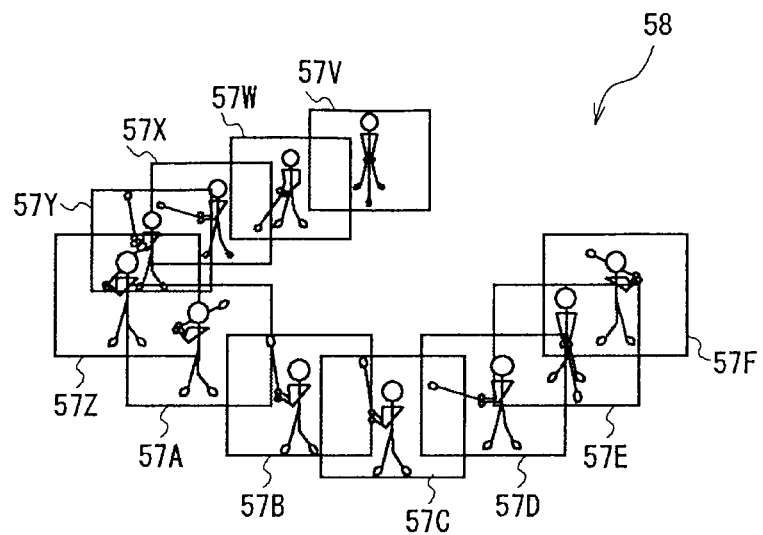
FIGS. 19A and 19B are schematic views for explaining special operations on the Workspace window.

To change the display configuration of the display area group 58 on the Workspace window 55 as shown in FIG. 19A, the user performs the "increase display speed of clip" operation, as described above, while pressing, for example, the "Ctrl" key of the keyboard 39 after pausing the playback on the display areas 57 (57F-57A-58V) of the display area group 58. Thereby, the display areas 57 (57F-57A-58V) shift in the forward direction as they are as a whole, resulting in changing the display configuration of the display areas 57 (57F-57A-58V) of the display area group 58.

At this time, the sizes of the display areas 57 after shift vary depending on their positions that are specified by the display information. With the current front central main display area 57 (57C in this figure) as a basis, more display areas display past images while fewer display areas display future images in the display area group 58.

When the playback is resumed in this configuration and in a case where the main sound output mode is set as a sound output mode, only sound for the current main display area 57 (57C) is output. In a case of the all sound output mode, sounds for all the display areas 57 (57F-57A-58V) are adjusted and output so that smaller sounds are output as the display areas (57D-57F, 57B, 57A, 57Z-57V) are away from the main display area 57 (57C).

Figure 19B:
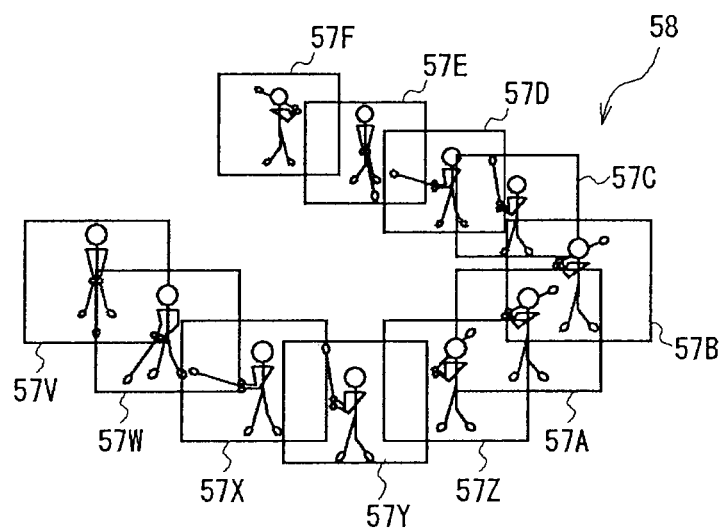

Further, to change the display configuration of the display area group 58 on the Workspace window 55 as shown in FIG. 19B, the user performs the "decrease display speed of clip" operation, as described above, while pressing, for example, the "Ctrl" key of the keyboard 39 after pausing the playback on the display areas 57 (57F-57A-58V) of the display area group 58. Thereby, the display areas 57 (57F-57A-58V) shift in the reverse direction as they are as a whole, resulting in changing the configuration of the display areas 57 of the display area group 58.

At this time, the sizes of the display areas 57 (57F-57A-58V) after shift vary depending on their positions that are specified by the display information. With the current front central display area 57 (57Y in this figure) as a basis, more display areas display future images while fewer display areas display past images in the display area group 58.

When the playback is resumed in this configuration and in a case where the main sound output mode is set as a sound output mode, only sound for the current main display area 57 (57Y) is output. In a case of the all sound output mode, sounds for all the display areas 57 (57F-57A-58V) are adjusted and output so that smaller sounds are output as the display areas 57 (57Z, 57A-57F, 57X-57V) are away from the main display area 57 (57Y).

(1-2-2-2-4) How to Enlarge or Reduce Display Area Group 58

To reduce the entire display area group 58, the user selects a target display area group 58 with the mouse 38 and presses the "down (↓)" key 70D of the directional keys 70 of the keyboard 39 while pressing the left button of the mouse 38. To enlarge the entire display area group 58, on the contrary, the user selects a target display area group 58 with the mouse 38 and presses the "up (↑)" key 70U of the directional keys 70 of the keyboard 39 while pressing the left button of the mouse 38.

This function makes such insert editing easy as to clip a desired video/audio part of a second clip during editing of a first clip and insert this clipped part into the first clip. Specifically, the user can reduce the display area group 58 for the first clip and enlarge the display area group 58 for the second clip to easily clip the desired video/audio part, and then can restore the size of the display area group 58 for the first clip to easily insert the clipped part of the second clip into a desired position of the first clip.

(1-2-2-3) CPU Processing for Basic or Special Operations

In response to the above-described basic or special operations, the CPU 30 executes a display changing procedure RT1 of FIG. 10 based on the control program being stored in the ROM 31 (FIG. 2).

In a case where the "increase display speed of clip" operation is detected at step SP3 of FIG. 10, the CPU 30 controls the memory unit 22 so as to select and create images to be displayed on the display areas 57 according to the playback speed v for displaying the images on the display areas 57 (57F-57A-58V) of the display area group 58. At this time, the CPU 30 expands space between the images to be displayed on neighboring display areas and speeds up the playback on each display area, resulting in increasing the playback speed v and playback intervals ΔT.

In a case where the "decrease display speed of clip" operation is detected at step SP3, the CPU 30 controls the memory unit 22 so as to select and create images to be displayed on the display areas 57 according to the playback speed v for displaying the images on the display areas 57 (57F-57A-58V) of the display area group 58. At this time, the CPU 30 narrows space between the images to be displayed on neighboring display areas and slows the playback on each display area, resulting in decreasing the playback speed v and playback intervals ΔT.

In a case where the "pause playback" operation is detected at step SP3, the CPU 30 controls the memory unit 22 so as to stop the playback on the display areas 57 (57F-57A-58V) of the display area group 58 but controls the signal processor 34 so as to keep on displaying the images of the last frames immediately before the playback is paused, on the display areas 57 (57F-57A-58V) of the display area group 58. As a result, the display areas 57 display the still images having the playback interval ΔT between them.

When another special operation such as "the "pause playback" operation while pressing the "Shift" key of the keyboard 39" is detected at step SP3, the CPU 30 controls the memory unit 22 and the signal processor 34 so as to appropriately change the images on a corresponding display area group 58 or the display configuration of the display area group 58 on the Workspace window 55 at step SP5 and SP6.

(1-2-3) Editing Operations on Workspace Window 55

(1-2-3-1) Editing Operations on Workspace Window 55

Specific editing operations on the Workspace window 55 will be now described one by one.

Figure 20A:
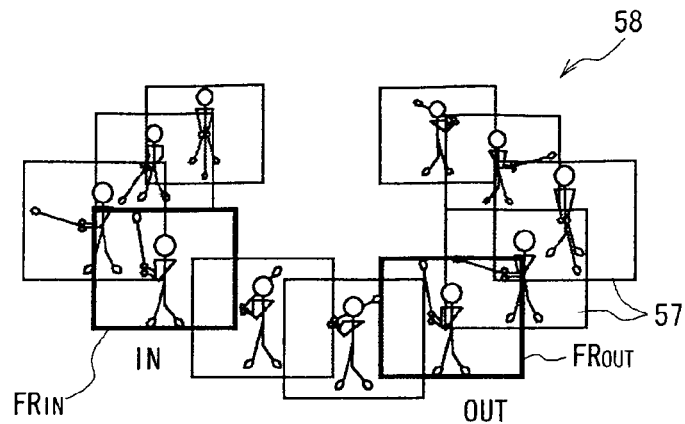
FIGS. 20A to 20C and 21A to 21C are schematic views for explaining cut editing of one clip on the Workspace window.

First cut editing of a clip will be described. To trim an unwanted part of a clip dragged and dropped onto the Workspace window 55, the user plays back the clip and then searches for the first frame $FR_{IN}$ of the trim part while desirably changing the playback speed v and the playback intervals ΔT, as shown in FIG. 20A. After finding the frame $FR_{IN}$, the user pauses the playback on all the display areas 57 (57F-57A-58V) and then clicks on the display area 57 (57F-57A-58V) displaying this frame $FR_{IN}$. As a result of this editing operation, the IN-point of the trim part is set at this frame $FR_{IN}$ and the frame of this display area 57 (57F-57A-58V) is colored (for example, in yellow).

Similarly, the user searches for the last frame $FR_{OUT}$ of the trim part. After finding the frame $FR_{OUT}$, the user pauses the playback on all the display areas 57 (57F-57A-58V) and then clicks on the display area 57 (57F-57A-58V) displaying this frame $FR_{OUT}$. As a result of this editing operation, the OUT-point of the trim part is set at this frame $FR_{OUT}$ and the frame of the display area 57 (57F-57A-58V) is colored (for example, in white).

Figure 20B:
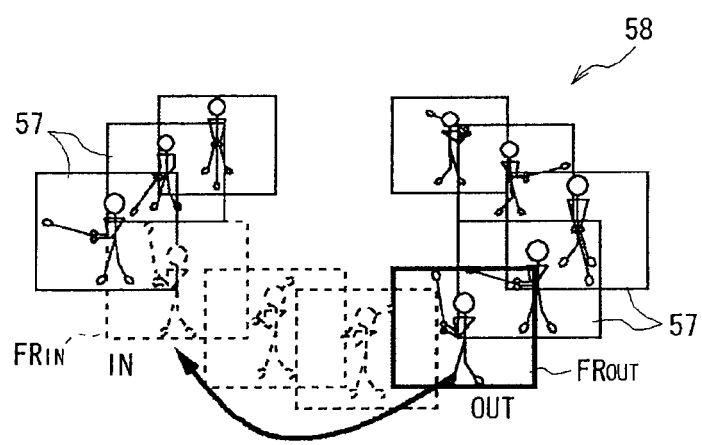

After specifying the IN-point and OUT-point of the trim part as the edit positions, the user changes the playback intervals ΔT so as to display the IN-point frame image $FR_{IN}$ and the OUT-point frame image $FR_{OUT}$ together in the display area group 58. Then the user performs an editing operation by dragging and dropping the OUT-point frame image $FR_{OUT}$ onto the IN-point frame image $FR_{IN}$, resulting in connecting the IN-point and the OUT-point as shown in FIG. 20B.

Figure 20C:
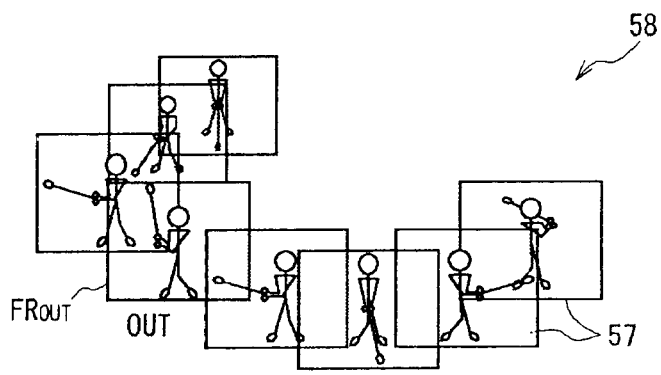

Thereby edit data is created and the edited video created according to this edit data is displayed in the same display configuration as the clip on the Workspace window 55 as shown in FIG. 20C, the edit data specifying that a video/audio part from the IN-point frame $FR_{IN}$ to a frame one before the OUT-point frame $FR_{OUT}$ of the clip is trimmed and a frame one before the IN-point frame $FR_{IN}$ is combined to the OUT-point frame $FR_{OUT}$. That is, the clip after the trimming is played back on the display areas 57 (57F-57A-58V) at the prescribed playback intervals ΔT as the display area group 58 on the Workspace window 55.

Figure 21A:
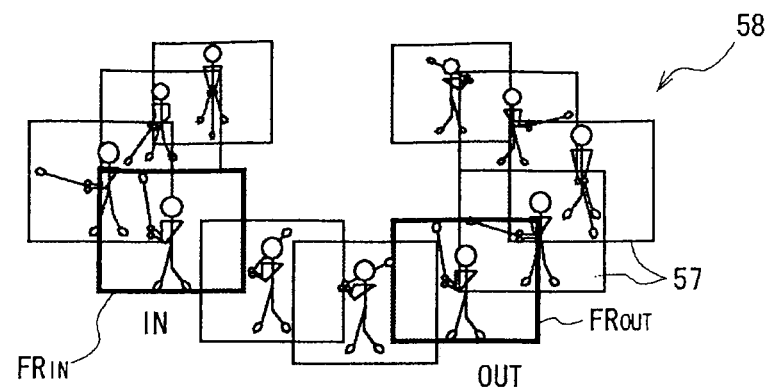
Figure 21B:
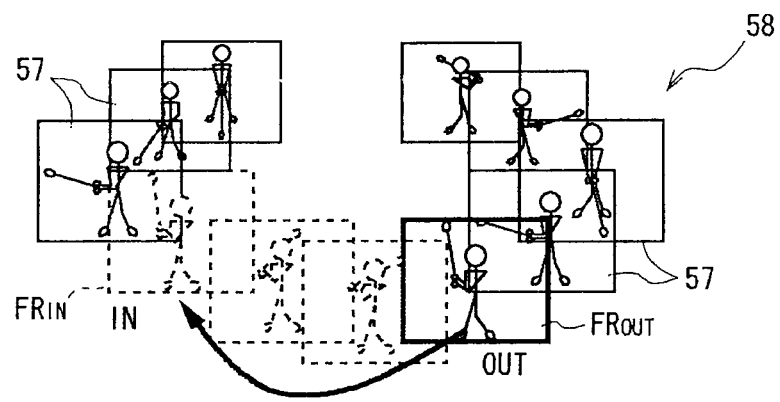

If the user wants to save the trimmed part as another clip, he/she clicks "setting" on the Toolbar 59 of the Workspace window 55 and chooses "split mode" in the appearing context menu. Then, similarly to the cut editing described with reference to FIGS. 20A and 20B, the user performs editing operations by setting an IN-point frame $FR_{IN}$ and an OUT-point frame $FR_{OUT}$, and dragging and dropping the OUT-point frame image $FR_{OUT}$ onto the IN-point frame image $FR_{IN}$ as shown in FIGS. 21A and 21B.

Figure 21C:
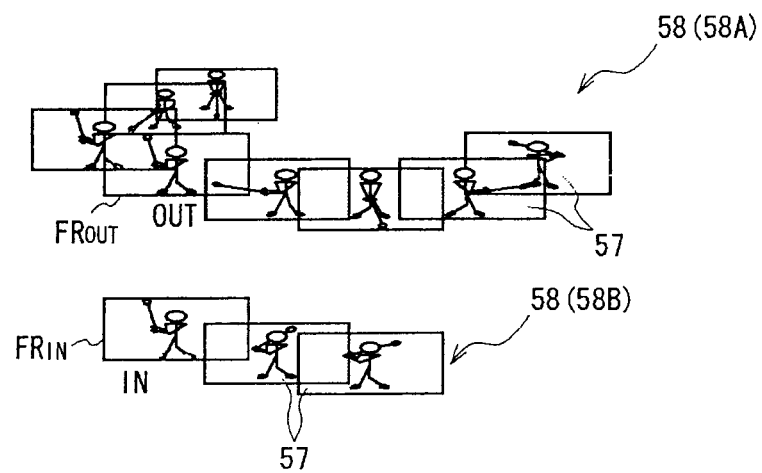

Thereby edit data is created, that specifies that a frame one before the IN-point frame $FR_{IN}$ is combined to the OUT-point frame $FR_{OUT}$ and further a video/audio part from the IN-point frame $FR_{IN}$ to a frame one before the OUT-point frame $FR_{OUT}$ is set as another clip as shown in FIG. 21C.

At this time, the Workspace window 55 displays the original clip, which was edited by the cut editing, with the display configuration changed and the new clip in the same display configuration. That is, the Workspace window 55 has a display area group 58A for the original clip after the cut editing and a display area group 58B for the new clip, the display area group 58A displaying the original clip on display areas 57 (57F-57A-58V) at prescribed playback intervals ΔT, the display area group 58B displaying the new clip on display areas 57 (57F-57A-58V) at the prescribed playback intervals ΔT.

At this time, based on display information (including display size and position) for each of the display area groups 58A and 58B, the CPU 30 deforms the display area groups 58A and 58B by slightly compressing them in a vertical direction so that they all can appear within the Workspace window 55.

When such an editing operation input is entered with the keyboard 39 or the mouse 38, the CPU 30 obtains edit information corresponding to the editing operation input via the first interface 36 and changes the display configuration of the display areas 57 accordingly.

When an edit position setting canceling operation for canceling setting of an edit position is entered, the CPU 30 resumes the playback on all the display areas 57. As a result, the clip is played back again as a motion picture on the display areas 57 at the time intervals as the display area group 58 having the display areas 57 linking up in a display order.

Figure 22A:
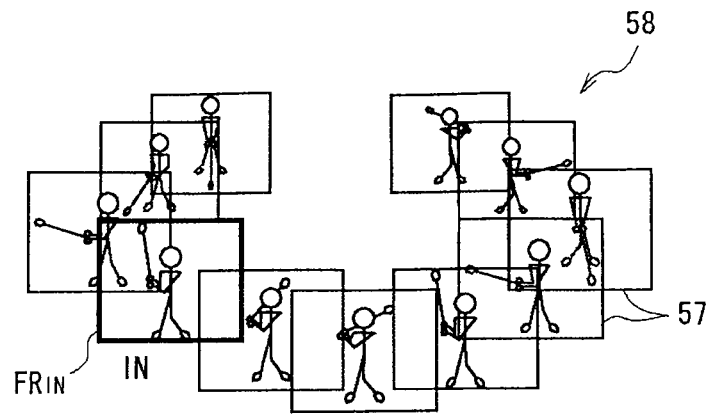
FIGS. 22A and 22B are schematic views for explaining how to split a clip.

Further, to split one clip into two, the user sets "split mode" as described above and then sets an IN-point at a desired frame $FR_{IN}$ as an edit position. Thereby the frame of the display area 57 (57F-57A-58V) displaying this IN-point frame image $FR_{IN}$ is colored (for example, in yellow) as shown in FIG. 22A. This means that this frame is set as a border frame for split. Then the user presses the "Alt" and "Space" keys of the keyboard 39 at the same time, for example.

Figure 22B:
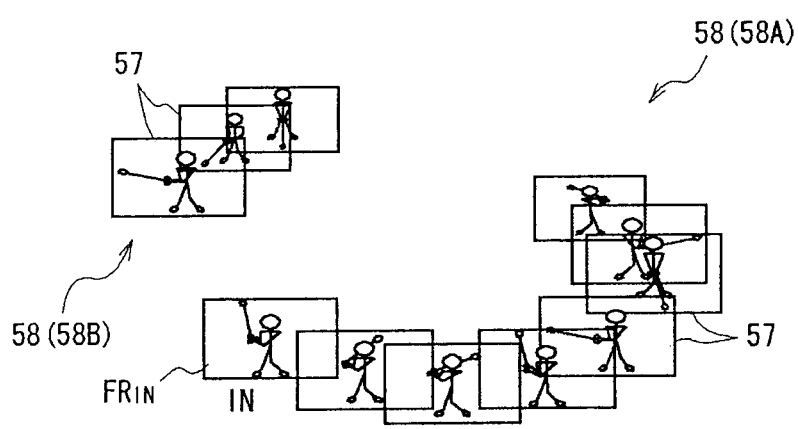

As a result, as shown in FIG. 22B, edit data specifying that the clip is split with the IN-point frame $FR_{IN}$ as a border is created, and the videos of the first half and second half of the clip created according to the edit data are played back in the same display configuration as the clip on the Workspace window 55. That is, display area groups 58A and 58B are displayed within the Workspace window 55, the display area group 58A displaying the first half video of the clip on the display areas 57 (57F-57A-58V) at the prescribed playback intervals ΔT, the display area group 58B displaying the second half video of the clip on the display areas 57 (57F-57A-58V) at the prescribed playback intervals ΔT.

At this time, based on display information (including display size and position) for each of the display area groups 58A and 58B, the CPU 30 deforms the display area groups 58A and 58B by slightly compressing them in a vertical direction so that all the display area groups 58A and 58B can appear within the Workspace window 55.

Furthermore, on the edit screen 50, by displaying two display area groups 58 for two clips on the Workspace window 55, the user can perform cut editing including assemble editing for combining the clips and insert editing for inserting part of one clip into a desired position of the other clip.

Figure 23A:
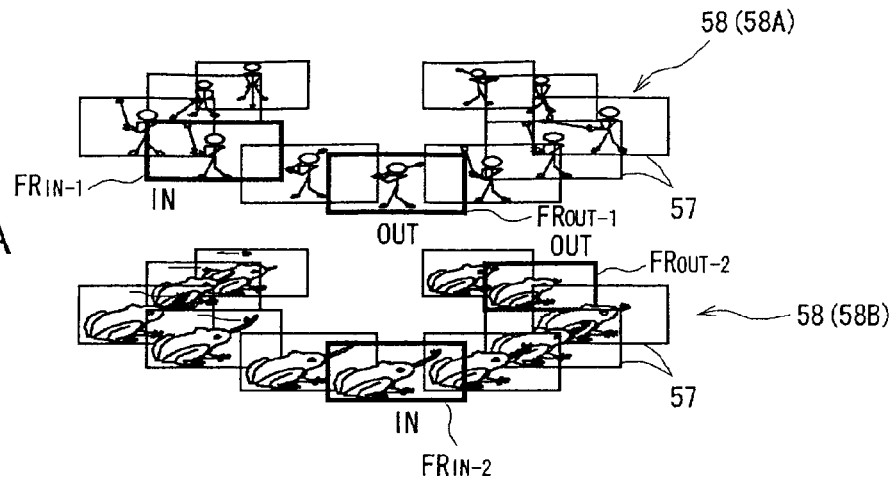
FIGS. 23A to 23C and 24A to 24C are schematic views for explaining cut editing of plural clips.

For the assemble editing, the user displays display area groups 58 (58A and 58B) for two target clips as shown in FIG. 23A as described before.

Then the user selects one display area group 58 (58A) of the first clip as a base with the mouse, and sets an IN-point as a first edit position in this first clip.

After that, the user selects the other display area group 58 (58B) of the other second clip as an insertion target, and then sets an IN-point and, if necessary, an OUT-point, as second edit positions in the second clip.

Figure 23B:
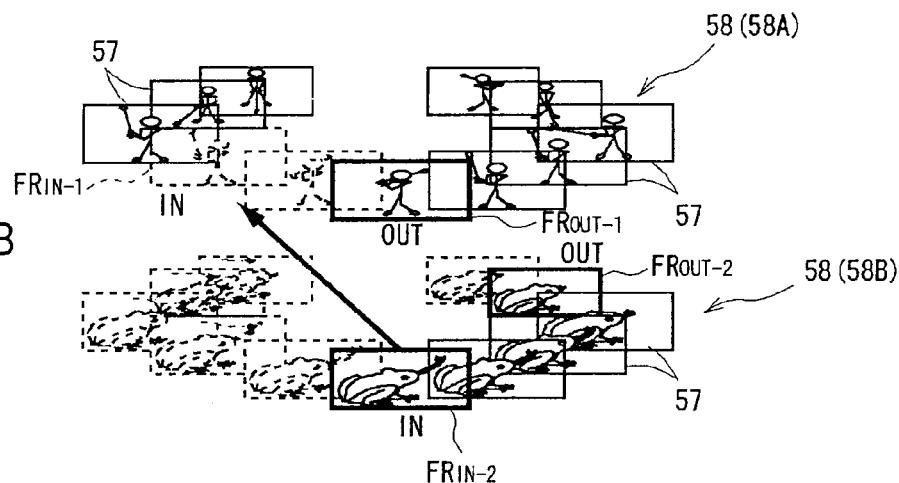

Then, as shown in FIG. 23B, the user performs a combine editing operation by dragging and dropping the IN-point frame image $FR_{IN-2}$ of the second clip in the display area group 58 (58B), onto the IN-point frame image $FR_{IN-1}$ of the first clip in the display area group 58 (58A), resulting in combining the IN-point of the first clip set as the first edit position to the IN-point of the second clip set as the second edit position.

Figure 23C:
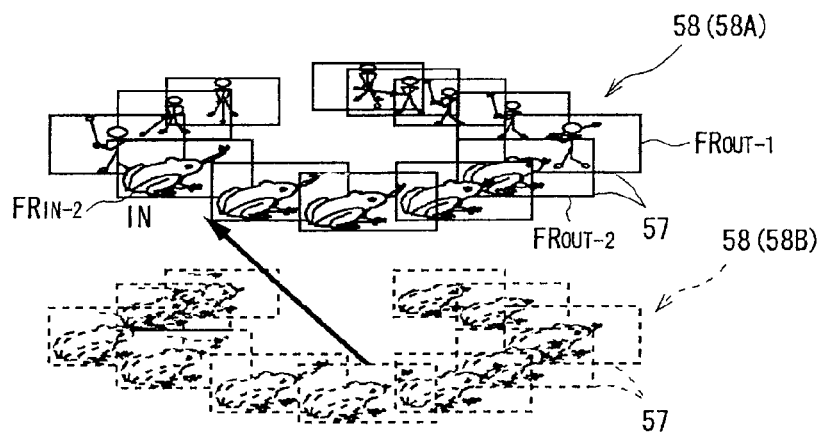

Thereby, such edit data is created that a video/audio part of the first clip from the first frame to a frame one before the IN-point frame $FR_{IN-1}$ is combined to a video/audio part of the second clip from the IN-point frame $FR_{IN-2}$ to the last frame (or to an OUT-point frame if the OUT-point is set in the second clip), and the video of the edited video/audio created according to the edit data is displayed in the same display configuration as the first and second clips on the Workspace window 55, as shown in FIG. 23C. That is, the edited video/audio is played back on the display areas 57 (57F-57A-58V) at the prescribed playback intervals ΔT as a display area group 58 (58C) on the Workspace window 55.

Figure 24A:
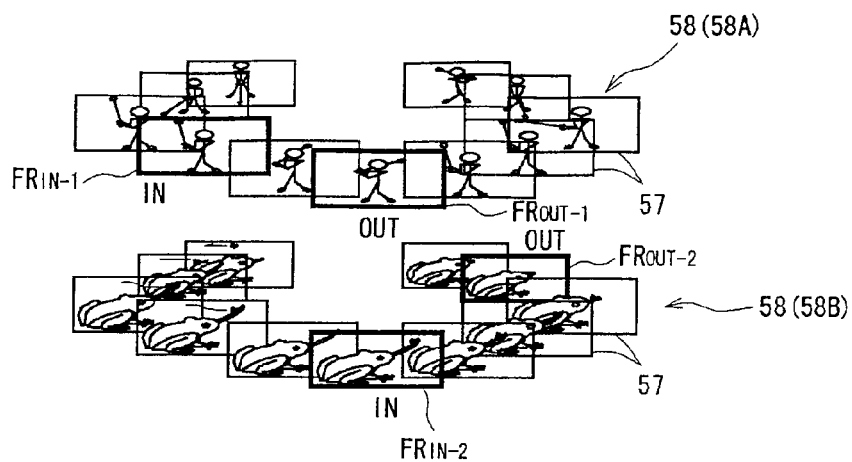

On the other hand, for the insert editing, similarly to the assemble editing, the user displays two display area groups 58 (58A and 58B) for two target clips on the Workspace window 55 as shown in FIG. 24A.

Then the user selects one display area group 58 (58A) of the first clip as a base out of the two display area groups 58 (58A and 58B) with the mouse. And then, similarly to the cut editing, the users sets an IN-point and an OUT-point in the first clip as first edit positions and also sets an IN-point and an OUT-point in the second clip as second edit positions.

Figure 24B:
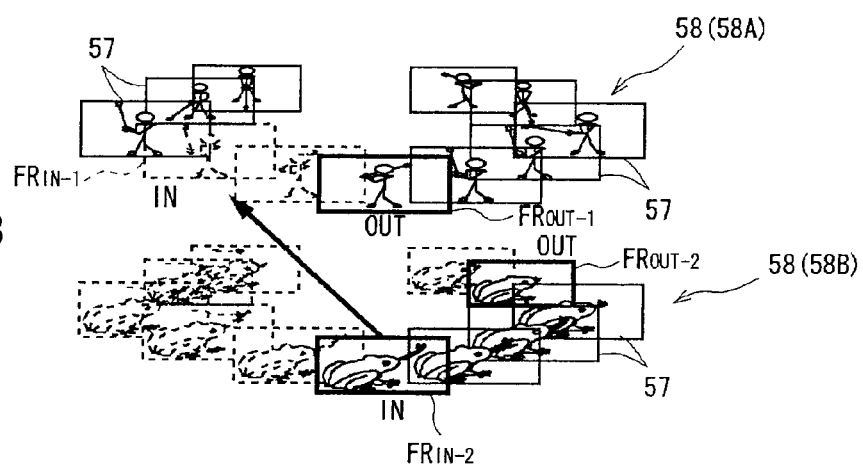

Then the user performs a combine editing operation by dragging and dropping the IN-point frame image $FR_{IN-2}$ of the second clip being displayed in the display area group 58 (58B) for the second clip, onto the IN-point frame image $FR_{IN-1}$ of the first clip being displayed in the display area group 58 (58A) for the first clip, resulting in combining the IN-point of the first clip and the IN-point of the second clip as shown in FIG. 24B.

Figure 24C:
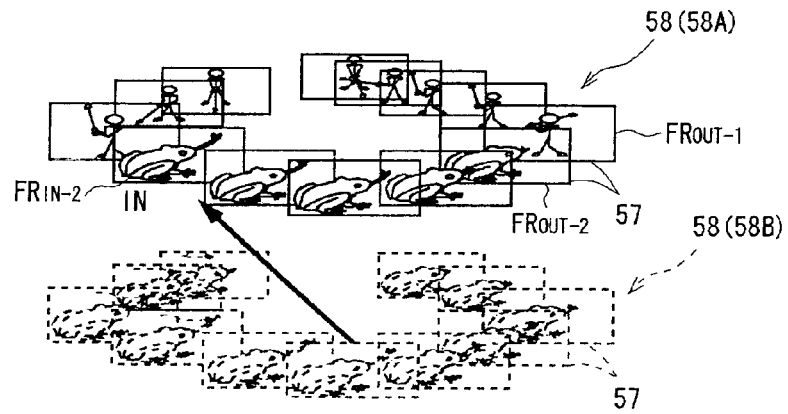

Thereby, such edit data is created that a video/audio part of the first clip from the first frame to a frame one before the IN-point frame $FR_{IN-1}$, a video/audio part of the second clip from the IN-point frame $FR_{IN-2}$ to a frame one before the OUT-point frame $FR_{OUT-2}$, and a video/audio part of the first clip from the OUT-point frame $FR_{OUT-1}$ to the last frame are combined in order. Then the video of the edited video/audio created according to the edit data is displayed in the same display configuration as the first and second clips on the Workspace window 55 as shown in FIG. 24C. That is, the edited video/audio is played back on the display areas 57 (57F-57A-58V) at the prescribed playback intervals ΔT as the display area group 58 on the Workspace window 55.

Figure 25A:
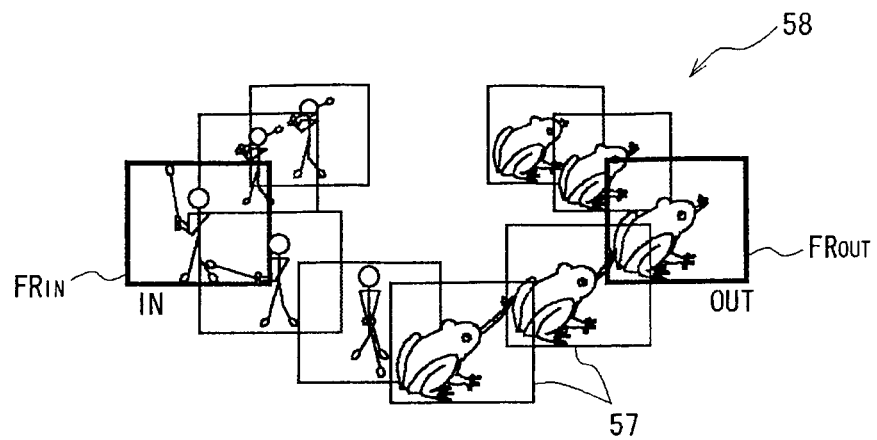
FIGS. 25A to 25C are schematic views for explaining how to set a video effect.

Furthermore, to apply a video effect to a switching part between the first and second clips in the edited video/audio created by the assemble editing or the insert editing, the user sets an IN-point at a frame close to the end of the first clip, as an edit point, and also sets an OUT-point at a frame close to the beginning of the second clip as shown in FIG. 25A.

Figure 25B:
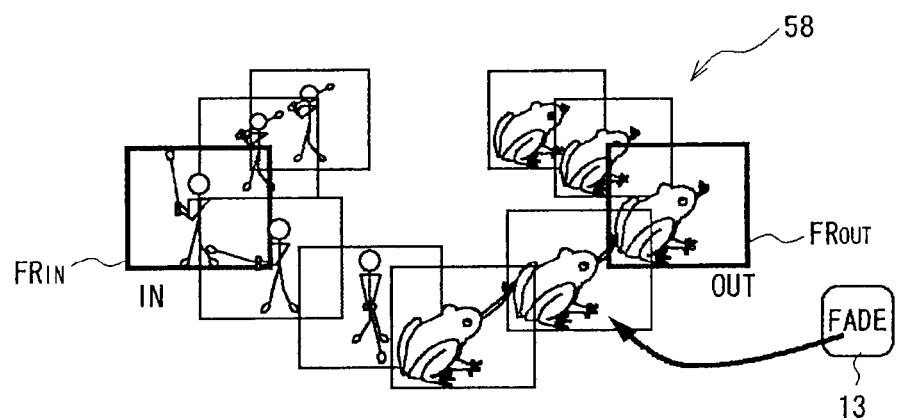

Then the user selects an effect icon 13 corresponding to a desired video effect out of an effect list in the effects view 54, and drags and drops this icon on a certain frame locating between the IN-point frame $FR_{IN}$ and the OUT-point frame $FR_{OUT}$ in the display area group 58 as shown in FIG. 25B.

Figure 25C:
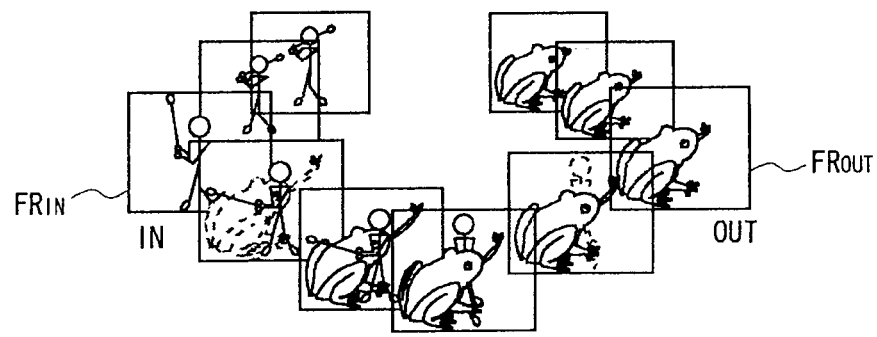

As a result, such edit data is created that the video effect corresponding to the pasted effect icon 13 is applied to the switching part of the first and second clips. Thereby the video of the edited video/audio created according to the edit data is displayed in the same display configuration as the original video/audio on the Workspace window 55 as shown in FIG. 25C. That is, the edited video/audio subjected to the video effect is played back on the display areas 57 (57F-57A-58V)

at the prescribed playback intervals ΔT as the display area group 58 on the Workspace window 55.

As described above, the user can create edit data on the Workspace window 55 of the edit screen 50, the edit data specifying which clips are combined and where desired video effects are applied to in order to create desired edited video/audio.

To save thus created edit data as an edit list, the user clicks on "file" on the Toolbar 59 of the Workspace window 55 and then chooses "Save edit list" in the appearing context menu, not shown. As a result, the created edit data is converted into an edit list file and registered in the edit list database of the hard disk drive 33 (FIG. 2).

(1-2-3-2) CPU Processing for Various Operations

Figure 26:
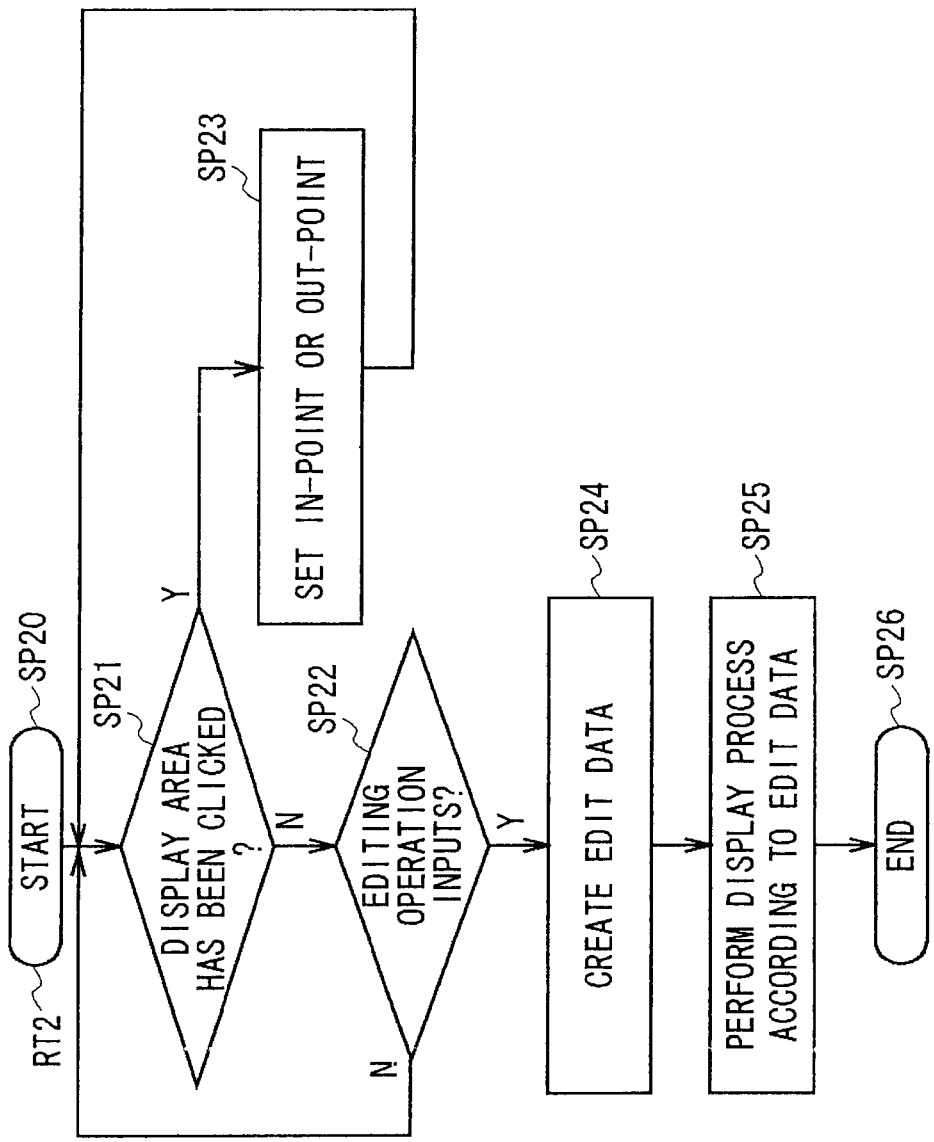
FIG. 26 is a flowchart of an editing operation response procedure.

For processing various editing operation inputs, the CPU 30 executes an editing operation response procedure RT2 of FIG. 26 based on the control program being stored in the ROM 31 (FIG. 2).

After the display area groups 58 for specified clips are displayed on the Workspace window 55 of the edit screen 50 according to the playback procedure RT1 of FIG. 10, the CPU 30 starts this editing operation response procedure RT2 at step SP20, in parallel to the display changing procedure RT1 of FIG. 10. At step SP21, the CPU 30 determines whether any display area of an active display area group 58 is clicked. When the determination is NO, the process goes on to step SP22 where the CPU 30 determines whether the user has entered a prescribed editing operation input.

The "prescribed editing operation inputs" include: an operation of setting an IN-point and an OUT-point in one clip and then dragging and dropping the OUT-point frame image $FR_{OUT}$ onto the IN-point frame image $FR_{IN}$ as shown in FIGS. 20 and 21; an operation of setting an IN-point of one clip in the "split mode" and then pressing both the "Alt" key and the "Space" key of the keyboard 39 as shown in FIG. 22; an operation of setting IN-points (and OUT-points) of first and second clips on the Workspace window 55 showing display area groups 58 for the first and second clips and then dragging and dropping the IN-point frame image $FR_{IN-2}$ of the second clip onto the IN-point frame image FRIN-1 of the first clip as shown in FIGS. 23 and 24; and an operation of dragging and dropping an effect icon 13 onto a desired position in a display area group 58 as shown in FIG. 25.

When the determination at step SP22 is NO, the process returns back to step SP21 and the CPU 30 repeats a processing loop of steps SP21-SP22-SP21 until one of the determinations SP21 and S22 is YES.

When the determination at step SP21 is YES since the user has clicked on a display area 57 of a display area group 58 on the Workspace window 55, the process goes on to step SP23 where the CPU 30 sets an IN-point or an OUT-point at the clicked frame, depending on a current situation, and also controls the signal processor 34 to color the frame of the display area 57 displaying the IN-point frame image $FR_{IN}$ or the OUT-point frame image $FR_{OUT}$ ($FR_{IN-1}$, $FR_{IN-2}$, $FR_{OUT-1}$, $FR_{OUT-2}$) in a prescribed color.

After the IN-point (and the OUT-point) are set in the clip, when the determination at step SP22 is YES since the user has entered a prescribed editing operation input, the process goes on to step SP24 where the CPU 30 creates edit data for creating the specified edited video/audio according to the editing operation input.

Then the process goes on to step SP25 where the CPU 30 controls the signal processor 34 so as to display the edited video/audio according to the created edit data. That is, the edited video/audio with the display configuration changed is played back on the Workspace window 55, as shown in FIG. 20C, 21C, 22B, 23C to 25C. Then the process goes on to step SP26 where the CPU 30 completes this editing operation response procedure RT2.

As described above, the CPU 30 can create edit data in response to user's editing operation inputs and display the video of the edited vide/audio with the display configuration changed on the Workspace window 55 in response to the editing operation inputs.

(1-3) Examples of Configuration of Editing System

FIG. 1 shows the configuration of an editing system 1 as an example. In actual, editing systems having other various kinds of configurations can be considered, and now two configurations will be described as first and second examples.

(1-3-1) First Configuration Example

Figure 27:
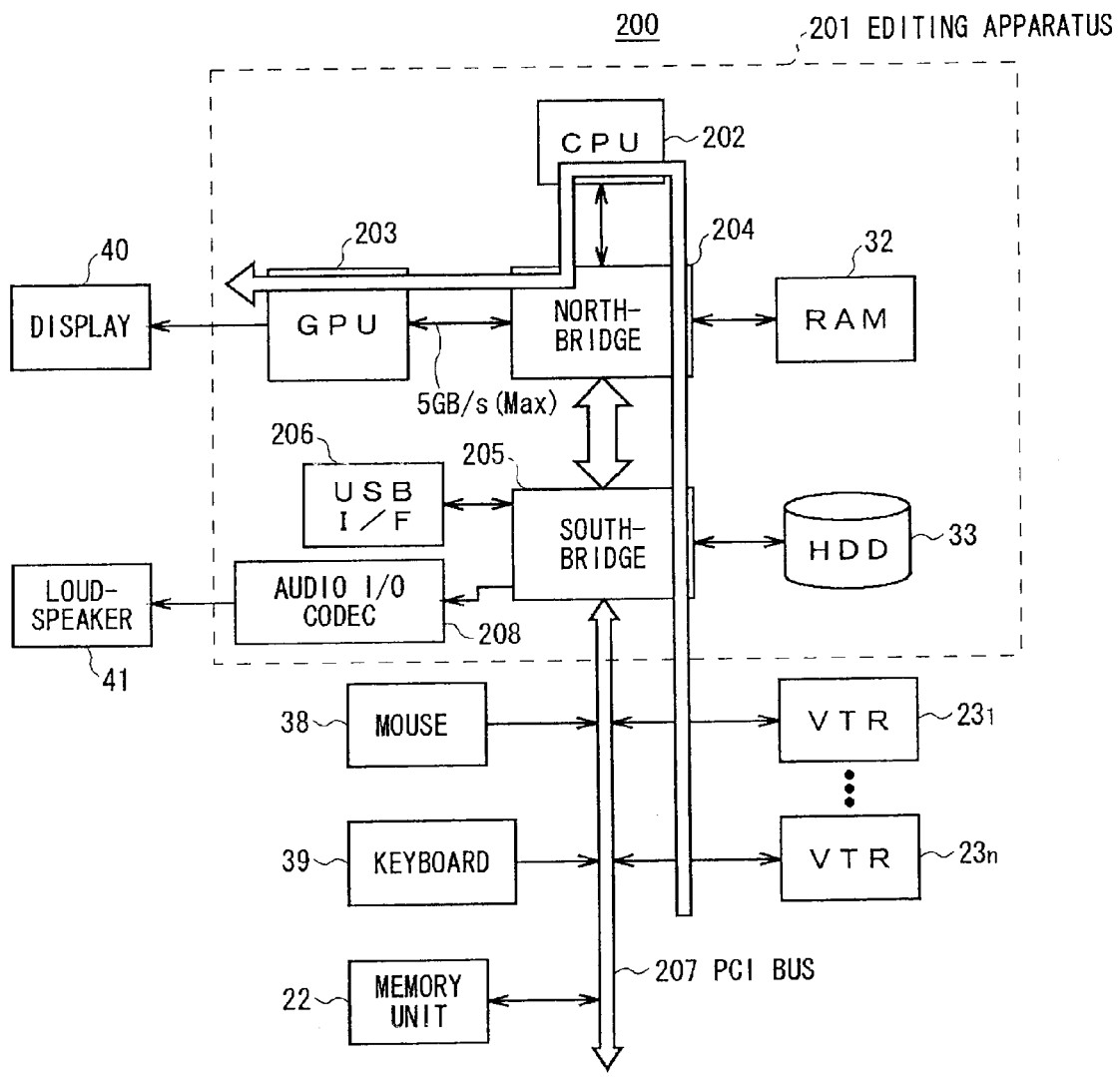
FIGS. 27 and 28 are schematic block diagrams of first and second configuration examples of the editing system.

Referring to FIG. 27 where the same reference numerals are applied to parts corresponding to those of FIG. 2, reference numeral 200 shows an editing system which has the first configuration and is a substantiation of the editing system 1 (FIG. 2). This editing system 200 has an editing apparatus 201, a memory unit 22, and plural videotape recorders $23_1$ to $23_n$.

Similarly to the editing system 1 (FIG. 2), this editing system 200 is designed to be capable of importing all or part of video and audio from a video tape into the large-capacity memory unit 22, such as a RAID unit, via the editing apparatus 201. In addition, the editing system 200 is designed to be capable of creating an edit list that specifies how to create desired edited video/audio from clips being stored in the memory unit 22, performing an editing process according to the created edit list, and saving or recording the created edited video/audio in the memory unit 22 or on a video tape.

Different from the editing apparatus 21 (FIG. 2), however, in the editing apparatus 201, a CPU 202, a RAM 32, an a Graphics Processing Unit (GPU) 203 and a southbridge 205 are connected to a northbridge 204, the GPU 203 serving as an image creation section and corresponding to the signal processor 34 (FIG. 2) of the editing apparatus 21. In addition, a hard disk drive 33, a USB interface 206, and an audio input/output (I/O) codec 208 are connected to the southbridge 205. Connected to this audio I/O codec 208 is a loudspeaker 41. Further, connected to the southbridge 205 via the Peripheral Component Interconnect (PCI) bus 207 are a mouse 38, a keyboard 39, videotape recorders $23_1$ to $23_n$, and the memory unit 22. Furthermore, a display 40 is connected to the GPU 203.

The CPU 202 of the editing apparatus 201 mainly operates like an MPEG decoder, a JPEG 2000 encoder, or an H.264/Advanced Video Coding (AVC) encoder, including transfer of decoded video to be displayed on display areas 57, to the GPU 203, change of playback intervals ΔT and a playback speed v, and execution of physical calculations.

The GPU 203, on the other hand, performs coordinate transformation and image size enlargement/reduction, in addition to rendering processes including texture insertion when images being displayed on the display areas 57 (57F-57A-58V) shift, which reduces processing loads of the CPU 202.

Actually, when the editing apparatus 201 starts, the CPU 202 takes and puts necessary software from the hard disk drive 33 into the RAM 32 based on a control program being stored in the hard disk drive 33, and then executes appropriate control according to the software and in response to user operations.

In actual, when a command for displaying a clip capture window to import video and audio into the memory unit 22 from a video tape is entered by operating the mouse 38 and the keyboard 39, the CPU 202 controls the hard disk drive 33 so as to read corresponding video data and also controls the GPU 203 so as to display the clip capture window based on the video data on the display 40.

When a command for playing a videotape recorder $23_1$ to $23_n$ is entered by operating the mouse 38 in this situation, the CPU 202 controls the videotape recorder $23_1$ to $23_n$ so as to reproduce a corresponding video/audio signal from the video tape. As a result, this videotape recorder $23_1$ to $23_n$ outputs the video/audio signal S1 reproduced from the video tape inserted therein, and a video signal S12 out of this signal S1 is given to the GPU 203 via the PCI bus 207, the southbridge 205, and the northbridge 204 in order.

In this connection, the traveling speed of a plurality of video data to be displayed on the display areas 57 (57F-57A-58V) based on the video signal S2 depends on a transfer rate (for example, 5 Gbytes/sec at maximum) between the northbridge 204 and the GPU 203.

Under the control of the CPU 202, the GPU 203 performs a prescribed signal process on the received video signal S2 and sends the obtained video signal to the display 40, resulting in displaying a video based on the video signal at a prescribed position on the clip capture window. In addition, the CPU 202 sends the audio signal S3 out of the video/audio signal S1 to the loudspeaker 41 via the audio I/O codec 208, resulting in outputting sound based on the audio signal S3 from the loudspeaker 41.

Therefore, the user can specify a desired video/audio part as a clip out of the displayed video and output sound with the mouse 38 and the keyboard 39, and can save clip management information including the time codes of the IN-point and OUT-point, the clip length, the clip ID, the clip name, the shooting time of the video/audio part, and the creation time of the clip. This clip management information is registered in a clip management database of the hard disk drive 33 under the control of the CPU 202.

When a command for importing the clip is entered by operating the mouse 38 or the keyboard 39, the CPU 202 controls the videotape recorder $23_1$ to $23_n$ so as to reproduce the specified clip.

As a result, the videotape recorder $23_1$ to $23_n$ outputs the video/audio signal S1 of the clip reproduced from the video tape, and the video signal S2 out of the signal S1 is given to the GPU 203 via the PCT bus 207, the southbridge 205, and the northbridge 204 in order. At this time, the CPU 202 also controls the GPU 203 and the memory unit 22 so as to store the video/audio S1 in the memory unit 22.

As described above, similarly to the editing system 1 (FIG. 2), the editing system 200 is designed to be capable of importing the specified clip into the memory unit 22 from the video tape.

On the other hand, the user displays an edit screen 50 (FIG. 3) for editing work with the mouse 38 and the keyboard 39 to create an edit list on this edit screen 50, the edit list specifying how to create desired edited video/audio from which clips. After or in the middle of creating the edit list, the user can confirm the edited video/audio based on the edit list.

When an edit list is created and then a command for saving this list is entered by operating the mouse 38, the CPU 202 creates edit data into a file and registers it in an edit list database of the hard disk drive 33, the edit data set by all user programs specified in the edit list.

When a command for playing back edited video/audio according to the edit list is entered by operating the mouse 38 or the keyboard 3 after or in the middle of creating the edit list, the CPU 202 controls the memory unit 22 to read a video/audio signal S4 for necessary clips therefrom.

The video signal out of the read video/audio signal S4 is given to the GPU 203 via the PCI bus 207, the southbridge 205, and the northbridge 204 in order. Then the GPU 203 or the CPU 203 applies video effects, as required, under the control of the CPU 202.

After applying the video effects, the GPU 203 performs a prescribed signal process on the obtained edited video signal and gives the resultant video signal to the display 40 under the control of the CPU 202. On the other hand, the CPU 202 applies audio mixing to the audio signal out of the video/audio signal S4, and sends the resultant edited audio signal to the loudspeaker 41 via the audio I/O codec 208. As a result, the edited video is displayed at a prescribed position on the edit screen 50 and the edited sound is output from the loudspeaker 41.

As described above, the user can do the editing work while confirming edited video/audio based on the edit list in this editing system 200.

When a command for recording the edited video/audio based on the edit list is entered by operating the mouse 38 or the keyboard 39 after the edit list is created, the CPU 202 controls the memory unit 22 so as to send the video signal out of the video/audio signal S4 of each necessary clip to the GPU 203 via the PCI bus 207, the southbridge 205, and the northbridge 204, the video/audio signal S4 read from the memory unit 22.

Similarly, the CPU 202 sends the audio signal out of the read video/audio signal S4 to the loudspeaker 41 via the PCI bus 207, the southbridge 205, and audio I/O codec 208.

Then under the control of the CPU 202, the GPU 203 applies video effects, as required, to the received video signal, as in the case of the above-described playback mode, and then sends the edited video signal to the memory unit 22 or a corresponding videotape recorder $23_1$ to $23_n$ via the northbridge 204, the southbridge 205, and PCI bus 207 in order.

Thus the memory unit 22 stores therein the received edited video signal at a specified address under the control of the CPU 202. The videotape recorder $23_1$ to $23_n$ records the received edited video signal at a prescribed position on a video tape under the control of the CPU 202.

As described above, similarly to the editing apparatus 1 (FIG. 2), in the editing system 200, specified clips are edited according to created edit data and stored in the memory unit 2 or recorded on a video tape.

Therefore, similarly to the editing system 1, with the CPU 202 and the GPU 203 of the editing apparatus 201 of the editing system 200, flowing image display (FIG. 5) with a prescribed playback speed v and at prescribed playback intervals ΔT, various special operations, and various editing processes can be done on display areas 57 (57F-57A-57V) on the Workspace window 55 of the edit screen 50.

(1-3-2) Second Configuration Example

Figure 28:
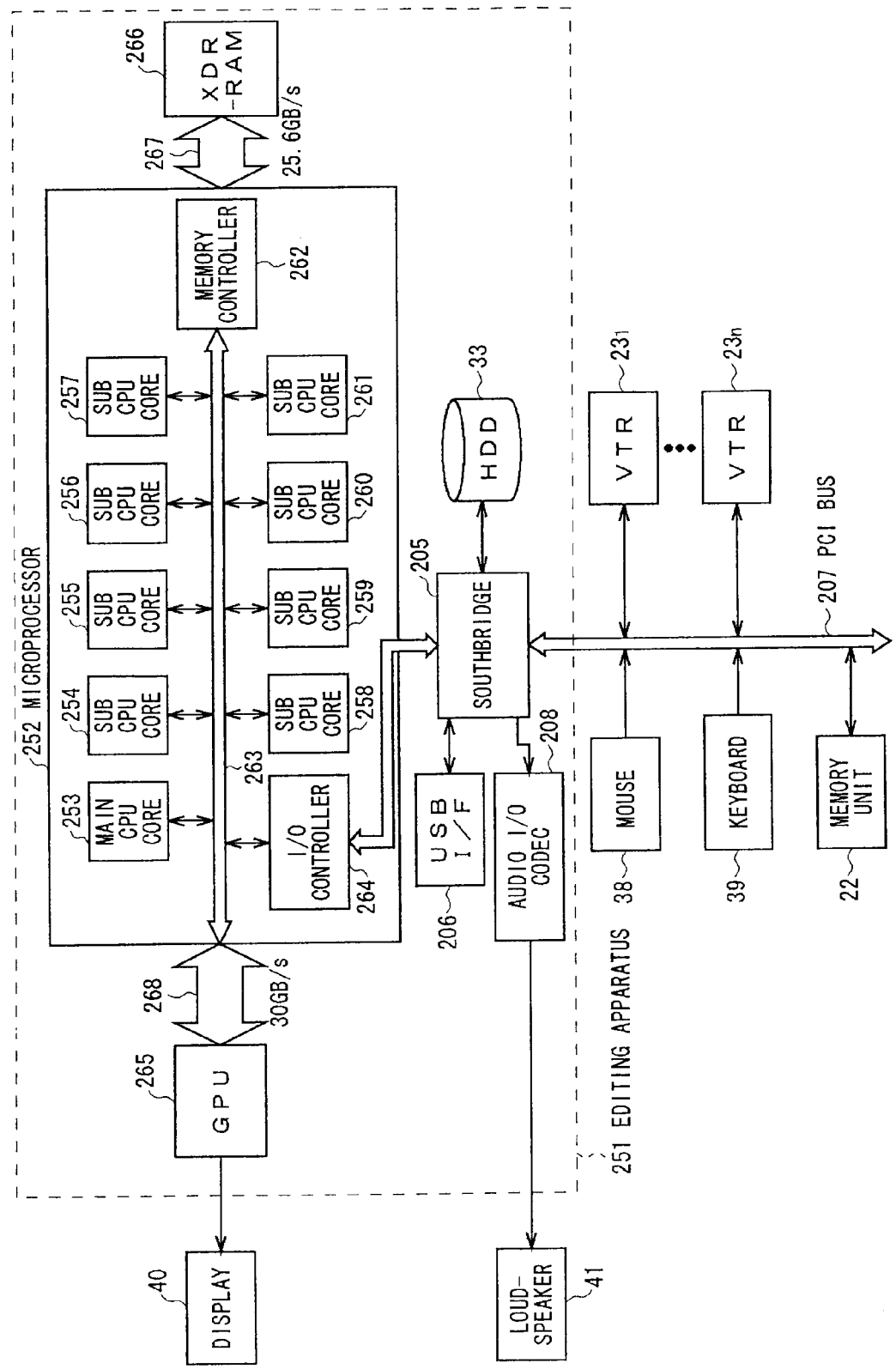

Referring to FIG. 28 where the same reference numerals are applied to parts corresponding to those of FIG. 27, reference numeral 250 shows an editing system which has the second configuration and is a substantiation of the editing system 1 (FIG. 2). This system 250 has an editing apparatus 251, a memory unit 22 and plural videotape recorders $23_1$ to $23_n$.

Similarly to the editing system 200 (FIG. 27), this editing system 250 is designed to be capable of importing all or part of video/audio from a video tape into a large-capacity memory unit 22, such as a RAID unit, via the editing apparatus 251. In addition, the editing system 250 is designed to be capable of creating an edit list specifying how to create desired edited video/audio from clips being stored in the memory unit 200 (FIG. 27), executing an editing process according to the created edit list, and saving or recording the created edited video/audio in the memory unit 22 or on a video tape.

In this case, different from the editing apparatus 201 (FIG. 27), the editing apparatus 251 has such a configuration that a GPU 265, an Extreme Data Rate (XDR)-RAM 266 and a southbridge 205 are connected to a microprocessor 252, a hard disk drive 33, a USB interface 206, and an audio I/O codec 208 are connected to the southbridge 205. A loudspeaker 41 is connected to the audio I/O codec 208. In addition, connected to the southbridge 205 via the PCI bus 207 are a mouse 38, a keyboard 39, videotape recorders $23_1$ to $23_n$, and the memory unit 22. Connected to the GPU 265 is a display 40.

The microprocessor 252 is a multicore processor in which a generalized main CPU core 253, plural (8 in this case) Reduced Instruction Set Computer (RISC) signal processors (hereinafter, referred to as sub CPU cores) 254 to 261, a memory controller 262, and an I/O (In/Out) controller 264 are mounted on one chip. The main CPU core 253 executes basic programs including the Operating System (OS) program. The sub CPU cores 254 to 261 are connected to the main CPU core 253 via an internal bus 263. The memory controller 262 controls a 256-Mbyte XDR-RAM 266, for example. The I/O controller 264 manages input/output of data from/to the southbridge 205. This microprocessor 252 realizes a clock frequency of 4 GHz.

The microprocessor 252 of this editing apparatus 251 operates like an MPEG decoder, JPEG 2000 encoder, or H.264/AVC encoder, including transfer of decoded video to be displayed on the display areas 57 to the GPU 265, change of playback intervals $\Delta T$ and a playback speed v, and execution of physical calculations.

Specifically, the eight sub CPU cores 254 to 261 of the microprocessor 252 operate like a decoder and are capable of decoding high definition (HD) video in parallel.

The main CPU core 253 performs operation and management that the eight sub CPU cores 254 to 261 do not execute, and receives commands via the southbridge 205 from the mouse 38 and the keyboard 39 and executes various processes in response to the commands.

Since the eight sub CPU cores 254 to 261 are capable of decoding images in parallel and data can travel through the bus 268 with a large bandwidth at a transfer rate of 30 Gbytes/sec at maximum between the microprocessor 252 and the GPU 265, a large number of high resolution images can be decoded and can be transferred in a short time.

It is noted that each of the eight sub CPU cores 254 to 261 can decode two HDD images at the same time. That is, sixteen high-resolution images are transferred from the microprocessor 252 to the GPU 265 at a high speed. The number of HD images that each of the eight sub CPU cores 254 to 261 can decode at the same time is not limited to two.

Similarly to the GPU 203 of the first configuration example, the GPU 265 performs coordinate transformation and image size enlargement/reduction, in addition to rendering processes including texture insertion when images being displayed on the display areas 57 shift, which reduces processing loads of the microprocessor 252.

Actually, when the editing apparatus 251 starts, the microprocessor 252 takes and puts necessary software from the hard disk drive 33 into the XDR-RAM 32 based on a control program being stored in the hard disk drive 33, and then executes appropriate control according to the software and in response to user operations.

When a command for displaying a clip capture window for importing video and audio from a video tape into the memory unit 22 is entered by operating the mouse 38 and the keyboard 39, the microprocessor 252 controls the hard disk drive 33 so as to read corresponding video data and controls the GPU 265 so as to display the clip capture window based on the video data on the display 40.

In this situation, when a command for playing a videotape recorder $23_1$ to $23_n$ is entered by operating the mouse 38, the microprocessor 252 controls the videotape recorder $23_1$ to $23_n$ so as to reproduce a corresponding video/audio signal from the video tape. As a result, this videotape recorder $23_1$ to $23_n$ outputs the video/audio signal S1 reproduced from the video tape inserted therein, and a video signal S2 out of this signal S1 is given to the GPU 265 via the PCI bus 207, the southbridge 205, and the microprocessor 252 in order.

Under the control of the microprocessor 252, the GPU 265 performs a prescribed signal process on the received video signal S2 and sends the obtained video signal to the display 40, resulting in displaying video based on the video signal at a prescribed position on the clip capture window. In addition, the CPU 265 sends an audio signal S3 out of the video/audio signal S1 to the loudspeaker 41 via the audio I/O codec 208, resulting in outputting sound based on the audio signal S3 from the loudspeaker 41.

Therefore, the user can specify a desired video/audio part as a clip out of the displayed video and output sound with the mouse 38 and the keyboard 39, and can save clip management information including the time codes of the IN-point and OUT-point, the clip length, the clip ID, the clip name, the shooting time of the video/audio part, and the creation time of the clip. This clip management information is registered in a clip management database of the hard disk drive 33 under the control of the microprocessor 252.

When a command for importing the clip is entered by operating the mouse 38 or the keyboard 39, the microprocessor 252 controls a corresponding videotape recorder $23_1$ to $23_n$ so as to reproduce a corresponding video/audio signal.

As a result, the videotape recorder $23_1$ to $23_n$ outputs the video/audio signal S1 of the clip reproduced from the video tape, and the video signal S2 out of the signal S1 is given to the GPU 265 via the PCI bus 207, the southbridge 205, the microprocessor 252, and the bus 268 in order. At this time, the microprocessor 252 also controls the GPU 265 and the memory unit 22 so as to store the video/audio signal S1 in the memory unit 22 via the GPU 265.

As described above, similarly to the editing system 1 (FIG. 2), the editing system 250 is designed to be capable of importing the specified clip from the video tape into the memory unit 22.

Then the user can display an edit screen 50 (FIG. 3) for editing work with the mouse 38 and the keyboard 39 to create an edit list on this edit screen 50, the edit list specifying how to create desired edited video/audio from which clips. After or in the middle of creating the edit list, the user can confirm the edited video and audio based on the edit list.

When a command for saving the edit list is entered by operating the mouse 38 after the edit list is created, the microprocessor 252 converts edit data into a file and registers it in an edit list database of the hard disk drive 33, the edit data set by all user programs specified in the edit list.

When a command for playing back the edited video/audio based on the edit list is entered by operating the mouse 38 or the keyboard 3 after or in the middle of creating the edit list, the microprocessor 252 controls the memory unit 22 to read the video/audio signal S4 of each necessary clip therefrom.

The video signal out of the read video/audio signal S4 is given to the GPU 265 via the PCI bus 207, the southbridge 205, the microprocessor 252, and the bus 268 in order. Then the GPU 265 applies video effects, as required, under the control of the microprocessor 252.

After applying the video effects, the GPU 265 performs a prescribed signal process on the obtained edited video signal and gives the resultant video signal to the display 40 under the control of the microprocessor 252. On the other hand, the microprocessor 252 applies audio mixing to the audio signal out of the video/audio signal S4, and sends the resultant edited audio signal to the loudspeaker 41 via the audio I/O codec 208. As a result, the edited video is displayed at a prescribed position on the edit screen 50 and the edited sound is output from the loudspeaker 41.

Thereby, the user can do the editing work while confirming edited video/audio based on the edit list in this editing system 250.

When a command for recording the edited video/audio based on the edit list is entered by operating the mouse 38 or the keyboard 39 after the edit list is created, the microprocessor 252 controls the memory unit 22 so as to read and send the video/audio signal S4 of each necessary clip therefrom to the GPU 265 via the PCI bus 207, the southbridge 205, and the bus 268.

At this time, under the control of the microprocessor 252, the GPU 265 applies video effects and the audio mixing, as required, to the received video signal of the clip as in the case of the above-described playback mode, and then sends the obtained edited video signal to the memory unit 22 or a specified videotape recorder $23_1$ to $23_n$ via the bus 268, the microprocessor 252, the southbridge 205, and PCI bus 207 in order.

Thus the memory unit 22 stores therein the received edited video signal at a specified address under the control of the microprocessor 252. The videotape recorder $23_1$ to $23_n$ records the received edited video signal at a prescribed position on a video tape under the control of the microprocessor 252.

As described above, similarly to the editing apparatus 1 (FIG. 2), the editing system 250 is designed to be capable of editing specified clips according to created edit data, and storing or recording the edited video/audio in the memory unit 2 or on a video tape.

Therefore, similarly to the editing system 1 (FIG. 2), with the microprocessor 252 and GPU 265 of the editing apparatus 251 of the editing system 250, flowing image display (FIG. 5) with a prescribed playback speed v and at prescribed playback intervals ΔT, and various special operations and editing processes can be done on the display areas 57 on the Workspace window 55 of the edit screen 50.

By the way, images which are obtained by parallel decoding of the eight sub CPU cores 254 to 261 of the microprocessor 252 and are to be displayed on the display areas 57 (57F-57A-57V) are transferred to the GPU 265 through the bus 268 at a transfer rate of 30 Gbytes/sec at maximum.

On the other hand, in the editing apparatus 201 (FIG. 27) having the first configuration, the transfer rate between the northbridge 204 and the GPU 203 is 5 Gbytes/sec at maximum. Therefore, a transfer rate from the microprocessor 252 to the GPU 265 is much faster than that from the CPU 202 to the GPU 203 via the northbridge 204.

Therefore, the editing system 250 having the second configuration can display images on the display areas 57 (57F-57A-57V) smoothly and fast, as compared with the editing system 200 having the first configuration.

A parallel decoding process by using the eight sub CPU cores 254 to 261 of the microprocessor 252 of the editing apparatus 251 in the editing system 250 will be now described.

Figure 29:
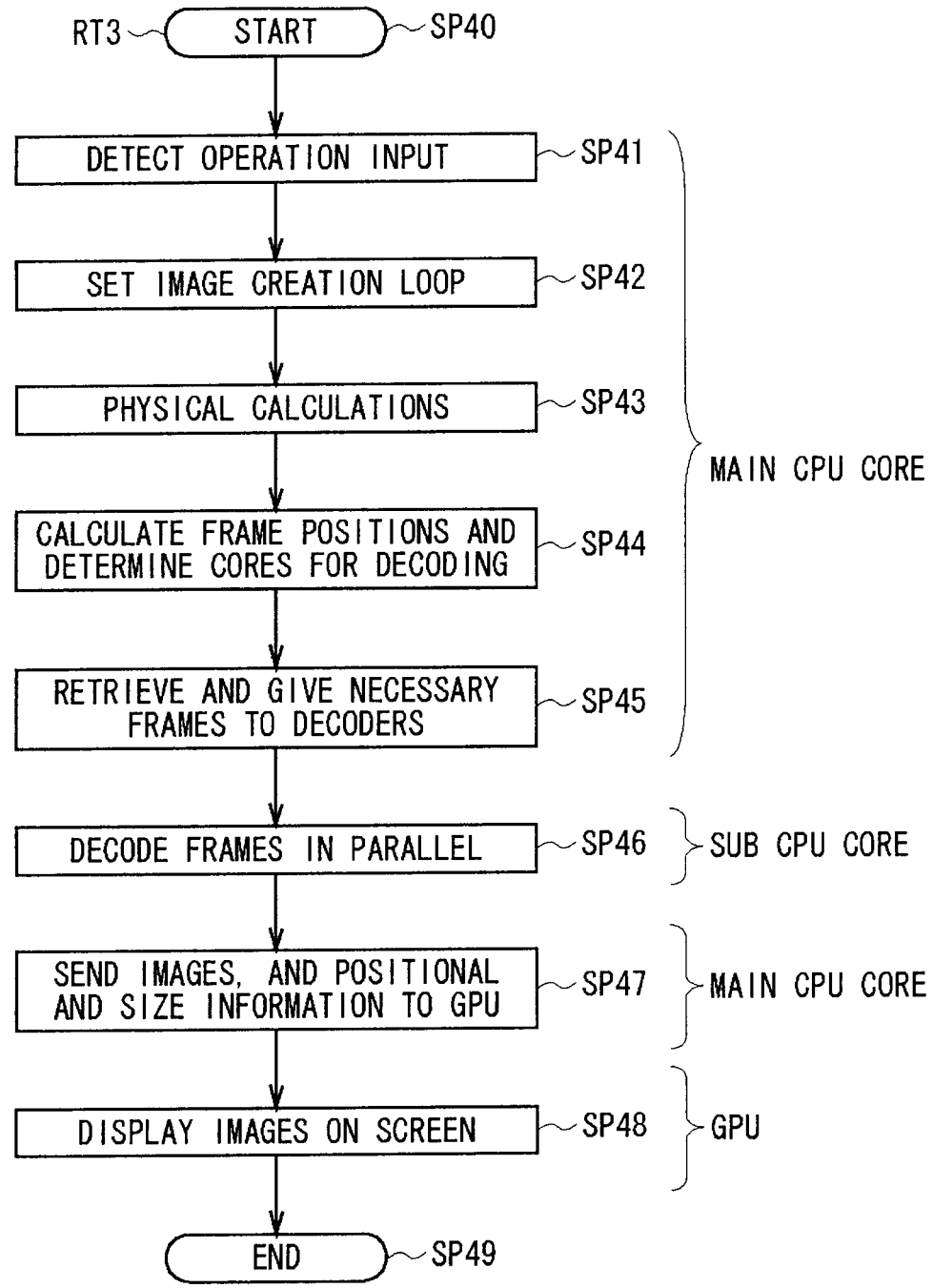
FIG. 29 is a flowchart of a parallel decoding procedure.

Referring to FIG. 29, the editing apparatus 251 starts this routine RT3 at step SP40. At step SP41, the editing apparatus 251 enters a control signal coming from the mouse 38 or the keyboard 39, into the microprocessor 252 via the south bride 205. When the main CPU core 253 recognizes the control signal, the process goes on to step SP42.

When the control signal recognized at step SP41 is a command of specifying a clip to be played back on the display areas 57 (57F-57A-57V), the main CPU core 253 of the editing apparatus 251 sets an image creation loop for the clip to be played back on the display areas 57 (57F-57A-57V) at step SP42.

At step SP43, the main CPU core 253 of the editing apparatus 251 performs physical calculations such as images, display positions and display sizes for the clip.

At step SP44, the main CPU core 253 of the editing apparatus 251 calculates frame positions for the images of the clip, which forms the image creation loop, and assigns a decoding process to sub CPU cores 254 to 261 for decoding the clip to create the images to be displayed on the display areas 57 (57F-57A-57V).

At step SP45, the editing apparatus 251 reads necessary frames for displaying the images, from the memory unit 22 and supplies the frames to the sub CPU cores 254 to 261 specified at step SP44.

At step SP46, the eight sub CPU cores 254 to 261 functioning as decoders in the editing apparatus 251 decode the frames given at step SP45, in parallel.

At step SP47, the main CPU core 253 of the editing apparatus 251 sends the images and display information (including display size and position) to the GPU 265 at a fast transfer rate, the images obtained at step SP46, the display information indicating positions and sizes on the Workspace window 55.

At step SP48, the GPU 265 of the editing apparatus 251 displays the images received from the main CPU core 253, based on the display information (including display sizes and display positions) at prescribed positions of the display areas 57 (57F-57A-57V). And then this routine ends at step SP49.

As described above, in the editing apparatus 251, the eight sub CPU cores 254 to 261 of the microprocessor 252 function as parallel decoders to create images to be displayed on the display areas 57 (57F-57A-57V), and send the obtained images to the GPU 265 at a fast transfer rate of 30 Gbytes/sec at maximum through the large-bandwidth bus 268. As a result, more number of high definition images can be obtained by decoding and sent to the GPU 265 in a short time. As a result, the clip can be played back as a motion picture on the display areas 57 at time intervals on the Workspace window 55 as a display area group having the display areas 57 linking up in a display order, with good response property.

(1-4) Operation and Effects of the First Embodiment

In the editing apparatuses 21, 201, 251 of this editing system 20 having above configurations, a desired clip is sequentially played back on display areas 57 (57F-57A-57V) of a display area group 58 at prescribed playback intervals by selecting the clip in the Collections area 51 of the edit screen 50 being displayed on the display 40, dragging and dropping the clip onto the Workspace window 55, selecting the display area group 58 corresponding to the clip, and clicking on the play button 56.

With this playback method, images of the clip are like shifting clockwise from the right end display area to the left end display area at preset playback intervals ΔT. Thereby, the two-dimensional images can produce the illusion of temporal depth. Therefore, as compared with the edit screen 1 (FIG. 1) in related art causing a user to search for a desired image while watching only one two-dimensional video, the user can search for a desired image much easily.

Further, with the editing apparatuses 21, 201, and 251, the user can speed up a display speed of a desired clip in a display area group 58 by pressing the "up (↑)" key 70U of the directional keys 70 of the keyboard 39 or by placing the cursor 71 somewhere on the display area group 58 and dragging the cursor 71 to the left on the display area group 58 while pressing the right button of the mouse 38. Further, the user can slow a display speed of a desired clip on a display area group 58 by pressing the "down (↓)" key 70D of the directional keys 70 of the keyboard 39 or by placing the cursor 71 somewhere on the display area group 58 and dragging the cursor 71 to the right on the display area group 58 while pressing the right button of the mouse 38. Furthermore, the user can pause the playback on each display area 57 of a desired display area group 58 by placing the cursor 71 somewhere on the display area group 58 and pressing the left button of the mouse 38 for longer than one second.

That is, with this playback method, a clip is played back as a motion picture on the display areas 57 (57F-57A-57V) of the display area group 58 at prescribed time intervals as a display area group having the display areas 57 (57F-57A-57V) linking up in a display order. Therefore, the images are like flowing from the right end to the left end of the display area group 58. In addition, the display conditions of the display area group 58 can be changed in response to display control inputs for changing the display conditions. This allows the user to make the edit screen easy-viewable, so that the user can easily do editing work with intuitive operations.

Further, with this playback method, since explicit operations are allotted to basic operations (increase/decrease of display speed and pause), the user can easily and intuitively perform these basic operations.

Still further, with the editing apparatuses 21, 201, 251, the user can desirably change playback intervals ΔT and a playback speed v for images being displayed on the display areas 57 of the display area group 58. Therefore, since the user can display a desired part of a clip as a display area group 58, he/she can search for a desired image easily. At this time, the playback intervals ΔT and the playback speed v can be changed together, the image searching work can be done much easily.

Still further, with the editing apparatuses 21, 201, 251, a display area group 58 is displayed so that a central main display area 57A is the largest and the other display areas 57 (57F-57A-57V) are smaller as they are away from the main display area 57A. This lets the user notice the image on the main display area 57A. Since the user watches the display area group 58 with the image of the main display area 57A as a basis, he/she can easily recognize past and future images with the image of the main display area 57A as a basis.

Still further, with the editing apparatuses 21, 201, 251, the user can do editing work, including clipping, editing of plural clips, and confirmation of edited video, on only one Workspace window 55. Therefore, such complicated work is not necessary that the monitor window 3 is used for clipping, the Storyboard 4 and Timeline 5 are used for editing, and the monitor window 3 is used for confirmation of edited video, like the editing apparatus in related art as shown in FIG. 1. Thus not only image searching work but also entire editing work can be done easily.

Still further, with the editing apparatuses 21, 201, 251, the user can select a sound output mode, "main audio output mode" or "all audio output mode", when playing back a clip on the display areas 57 (57F-57A-57V) of a display area group 58. Therefore, by switching this sound output mode depending on a target clip, the user can search for a desired video/audio part based on output sound.

In this case, with the editing apparatuses 21, 201, 251, when the "all audio output mode" is set as the sound output mode, sounds for all display areas 57 (57F-57A-57V) of an active display area group 58 are all output from the loudspeaker 41 in such a manner that smaller sounds are output as display areas 57 (57B, 57C, ..., 57Z, 57Y, ...) are away from the main display area 57A, so as to produce three-dimensional sound. Therefore, the user can search for a desired image based on the output sound much easily, depending on a clip. Not only easy editing, sound generation so that the user can feel sound depth that he/she has never felt, can be realized only by playback on a Workspace window.

According to the above configuration, a selected clip is sequentially displayed on plural display areas arranged in a line, at prescribed playback intervals, so that the clip can produce the illusion of temporal depth. As compared with the edit screen 1 in related art where a user searches for a desired image while watching one two-dimensional video, the user can search for a desired image much easily. Thus this embodiment can realize an editing system enabling easy editing work.

Further, according to the above configuration, a clip is sequentially displayed on plural display areas arranged in a line in a prescribed display configuration, at prescribed playback intervals ΔT. In addition, explicit and simple operations are allotted to basic operations for increasing and decreasing the playback intervals ΔT and a playback speed v. Therefore, the user can easily and intuitively perform these basic operations. Thus this embodiment can realize an editing system capable of significantly improving editing efficiency.

(2) Second Embodiment (2-1) Configuration of Editing System According to Second Embodiment Referring to FIG. 2, reference numeral 90 shows an editing system according to the second embodiment. This editing system 90 is identical to the editing system 20 (FIG. 2), except that the size of each display area 101 (FIG. 3) of a display area group 100 (FIG. 3) to be displayed on a Workspace window 55 of an edit screen 50 varies depending on a signal level of sound accompanying an image being displayed on the display area 101.

That is, in this editing system 90, a signal processor 92 of an editing apparatus 91 plays back the clip on each display area 101 of the display area group 100 based on a video/audio signal S4 as shown in FIG. 3, the signal S4 received from a memory unit 22 via a video effector/audio mixer section 35 as described before. In addition, the signal processor 92 sequentially informs a CPU 93 of the peak level of the audio level (signal level of an audio signal S3) for each audio frame accompanying the images to be displayed.

The CPU 93 determines based on the notification from the signal processor 92 whether the peak level of the audio level is greater than a preset threshold value Thd (FIG. 30B). When it is greater, the CPU 93 displays a corresponding display area 101 at a larger size than the original size, when displaying the image of the frame.

Consider now a case shown in FIGS. 30A to 30C. FIG. 30A shows images being displayed on the display areas 101 while FIG. 30B shows the audio level (signal level of the audio signal) of the sounds accompanying the images. As can be seen from these figures, the images with sounds having an audio level greater than the threshold value Thd are the second to fourth images to the right from the central main image and the second and fourth images to the left. Therefore, as shown by cross arrows in FIG. 30C, the second to fourth display areas to the right from the main display area 101A and the second and fourth display areas to the left are enlarged.

In addition, the CPU 93 controls the signal processor 92 so that a higher enlargement factor is applied to display areas 101C-101E, 101Y, 101W as the audio levels of sounds accompanying the images of the display areas 101C-101E, 101Y, 101W are higher.

Therefore, as shown in FIG. 30B, the second display area 101C to the right from the main display area 101A has the highest audio level and the other third and fourth display areas 101D and 101E to the right from the main display area 101A and second and fourth display areas 101Y and 101W to the left have almost equal audio levels that are little lower than the highest audio level. As a result, the display areas 101C is enlarged at the largest enlargement factor while the display areas 101D, 101E, 101Y, and 101W are enlarged at an enlargement factor that is little smaller than the largest enlargement factor.

As described above, in this editing system 90, the Workspace window 55 of the edit screen 50 allows the user to visually confirm the audio levels of the sounds accompanying the images being displayed on the display areas 101 (101F-101A-101V) of the display area group 100. Therefore, the user can edit a clip while more intuitively confirming the contents of the clip.

(2-2) Display Area Enlargement Procedure

Figure 31:
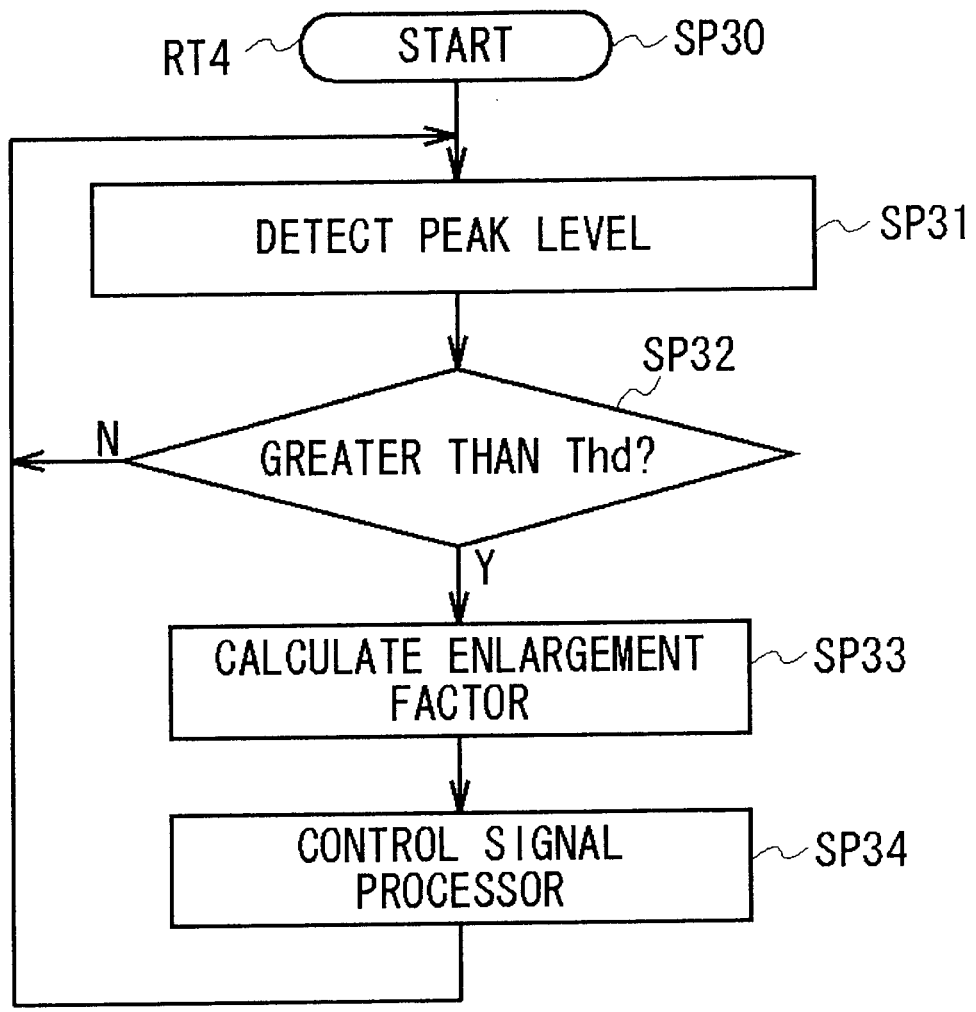
FIG. 31 is a flowchart of a display area enlargement procedure.

To enlarge display areas 101 (101F-101A-101V) depending on audio levels of sounds accompanying displayed images, the CPU 93 executes a display area enlargement procedure RT4 of FIG. 31 based on a control program being stored in a ROM 94 (FIG. 2).

When a clip is played back in the display area group 100 according to the playback procedure RT1 of FIG. 10, the CPU 93 starts this display area enlargement procedure RT4 at step SP30, in parallel to the display changing procedure RT1 of FIG. 10 and the editing operation response procedure RT2 of FIG. 26. At step SP31, the CPU 93 obtains the peak level of the sound accompanying displayed video frames (for example, one frame) for one display area 101 of the display area group 100, from the signal processor 92.

At step SP32, the CPU 93 determines whether the peak level is greater than a preset threshold value Thd. When it is smaller, the process returns back to step SP31. When it is greater, on the contrary, the CPU 32 calculates an enlargement factor for the display area 101 based on the peak level at step SP33. At step SP34, the CPU 32 controls the signal processor 92 based on this calculated factor. As a result, the corresponding display area 101 (101F-101A-101V) of the display area group 100 on the Workspace window 55 of the edit screen 50 is enlarged at the enlargement factor calculated at step SP33, as compared with the normal size (size of a case where a peak level is the threshold value Thd or smaller).

Then the process returns back to step SP31 where the CPU 30 selects a next display area 101 (101F-101A-101V), and repeats a processing loop of steps SP31 to SP34.

As described above, the CPU 93 displays the display areas 101 (101F-101A-101V) depending on their audio levels in such a way that display areas are enlarged as audio levels are higher.

(2-3) Operation and Effects of the Second Embodiment

With the editing apparatus 91 of the editing system 90 having the above configuration, larger display areas 101 (101F-101A-101V) are displayed as their audio levels are higher.

According to this playback method as described above, the user visually recognizes the audio levels of sounds accompanying the images being displayed on the display areas 101 (101F-101A-101V) of the display area group 100 based on the sizes of the display areas 101 (101F-101A-101V), so as to easily do video/audio synchronization editing. Thus as compared with the editing system of the first embodiment, this second embodiment realizes an editing system enabling much easier editing work.

(3) Other Embodiments

In the first and second embodiments, this invention is applied to the editing apparatuses 21, 201, and 251 which are nonlinear editing apparatuses. This invention, however, is not limited to this and can be widely applied to various kinds of editing apparatuses and various kinds of video display control apparatuses other than the editing apparatuses.

Further, the first and second embodiments have described a case where the memory unit 22 is controlled so as to read the video/audio signal S4 of a specified clip every time when an image of the clip is displayed on each display area 57, 101 of a display area group 58, 100. This invention, however, is not limited to this and a buffer memory can be provided in the signal processor 34. When an image of a clip is displayed on each display area 57, 101 of a display area group 58, 100, the video/audio signal S4 of the clip is read and stored from the memory unit 22 into the buffer memory once and then the image is displayed on each display area 57, 101 of the display area group 58, 100 based on the video/audio signal S4 being stored in the buffer memory. In this case, the memory unit 22 or the buffer memory stores one or plural video materials as a memory means. In addition, although the first and second embodiments have described a case where the memory unit 2 stores video/audio signals, all or part of them can be stored in the hard disk drive 33.

Figure 32:
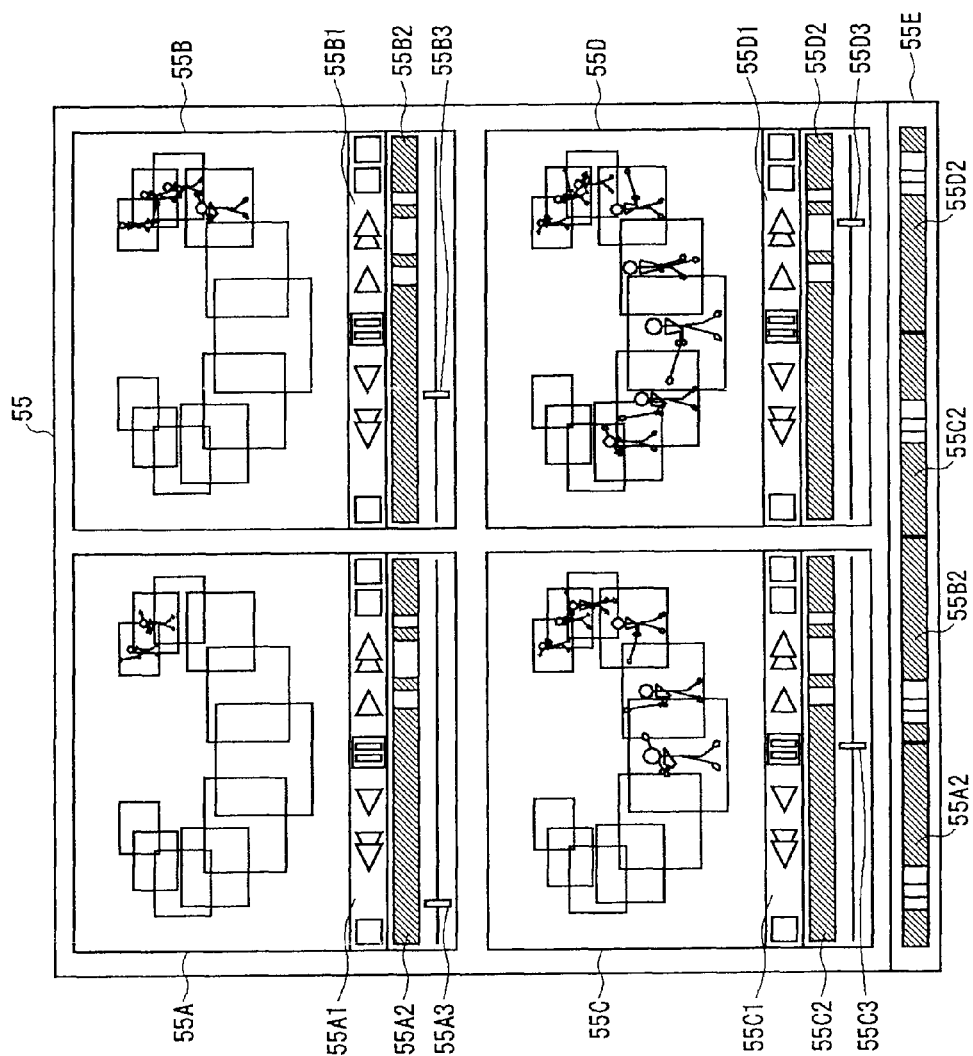
FIGS. 32, 33, and 34A and 34B are schematic views showing arrangements of display areas according to other embodiments.
Figure 33:
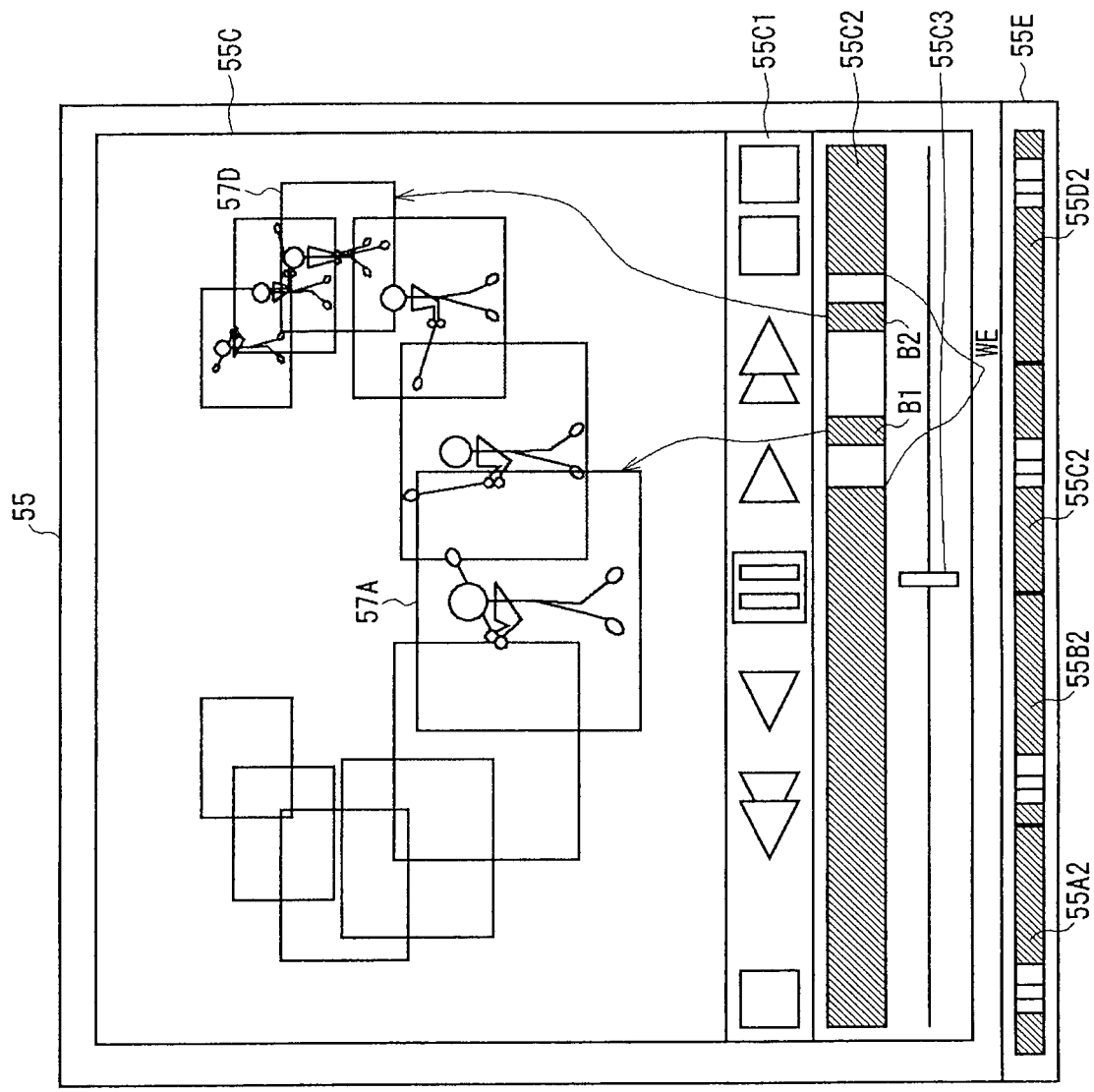

Still further, the first and second embodiments have described a case where the edit screen 50 has one Workspace window 55 in which a plurality of continuous display areas 57 (57F-57A-57V) are three-dimensionally curved in an elliptic form. This invention, however, is not limited to this and, as shown in FIG. 32, the edit screen 50 can be provided with a Workspace window 55 having some (four in this figure) sub-Workspace windows 55A to 55D, which are display regions showing display areas 57 (57F-57A-57V) and a display area group 58. Then a clip is split on a temporal axis by the number (four) of display regions and the split parts are played back on the sub-Workspace windows 55A to 55D. In this case, the CPU 30 individually controls a set of display areas 57 appearing on each sub-Workspace window 55A to 55D.

This Workspace window 55A has various operation buttons 55A1 including play, stop, pause, fast-forwarding, fast-rewinding, at the bottom. Under the buttons 55A1, a playback timing bar 55A2 equivalent to one-fourth of the length of an entire clip and a timeline with a slider 55A3 are provided. Each of the other sub-Workspace windows 55B to 55D has identical various operation buttons 55B1, 55C1, 55D1, playback timing bar 55B2, 55C2, 55D2, and slider 55B3, 55C3, 55D3.

A display region 55E existing at the bottom of the screen is one which is a unification of the playback timing bars 55A2, 55B2, 55C2, and 55D2 in time series. For example, when the playback timing bar 55C2 is selected, the sub-Workspace window 55C is enlarged and displayed above the display region 55E.

In the playback timing bars 55A2, 55B2, 55C2, and 55D2, a white area WE represents a temporal position of images being displayed on the display areas 57 (57F-57A-57V) in a corresponding one-fourth length of the clip while a colored area B1, B2 corresponds to a display area 57A, 57D highlighted by user selection. Therefore, in the editing systems 20, 90, the user can recognize the four parts of the clip from the four sub-Workspace windows 55A to 55D at once, thereby improving efficiency of editing work.

Figure 34A:
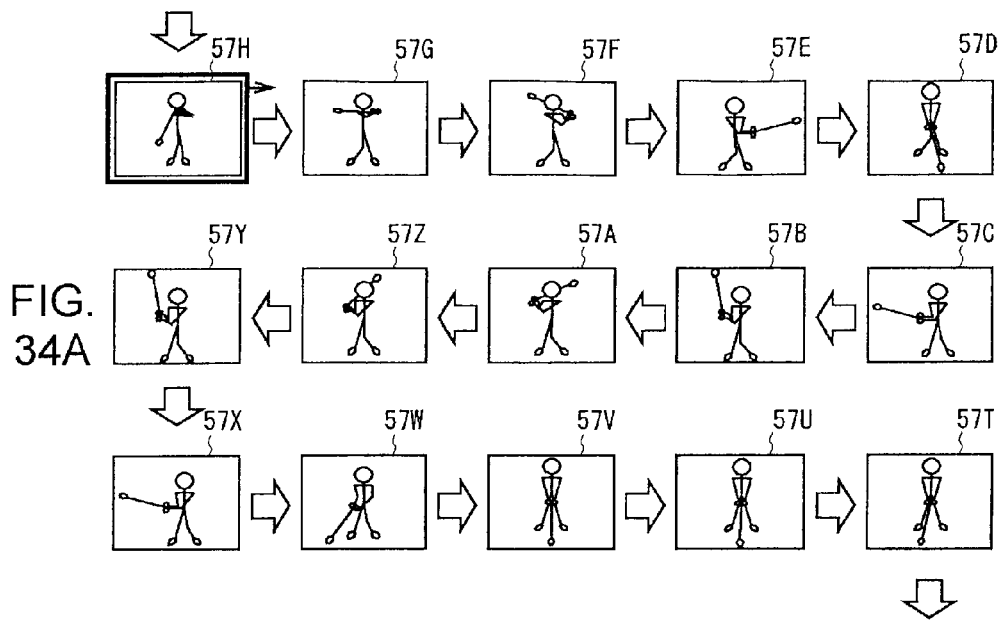

Still further, the first and second embodiments have described a case where plural continuous display areas 57 (57F-57A-57V) are three-dimensionally curved in an elliptic form. This invention, however, is not limited to this and the plural display areas 57 (57H-57A-57T) can be sequentially arranged in a matrix in an order shown by a thick arrow as shown in FIG. 34A.

In this case, in the editing systems 20, 90, the images of a clip can be displayed at the same size, although it may depend on a screen size. Therefore, the user can visually confirm all the images in the same conditions and does not feel that some images are not easy viewable.

Figure 34B:
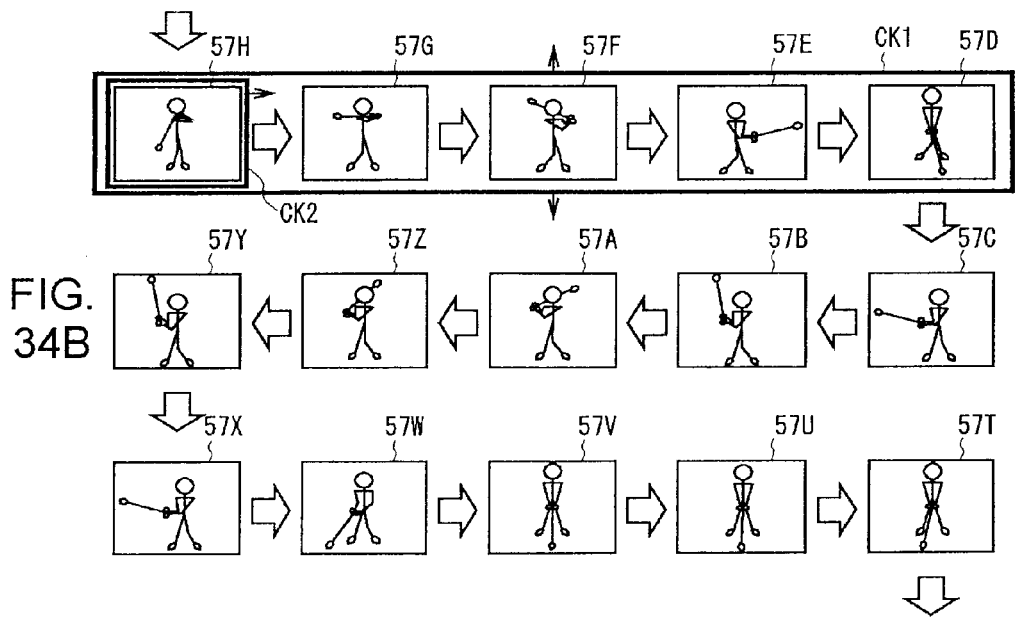

In the editing systems 20, 90, as shown in FIG. 34B, the user can select a desired image with cursors CK1 and CK2, the cursor CK1 selecting a row of the display areas 57H to 57D, the cursor CK2 selecting one display area (57H-17A-17T). This allows the user to equally view the five display areas 57H to 57D being selected by the cursor CK1.

Figure 35:
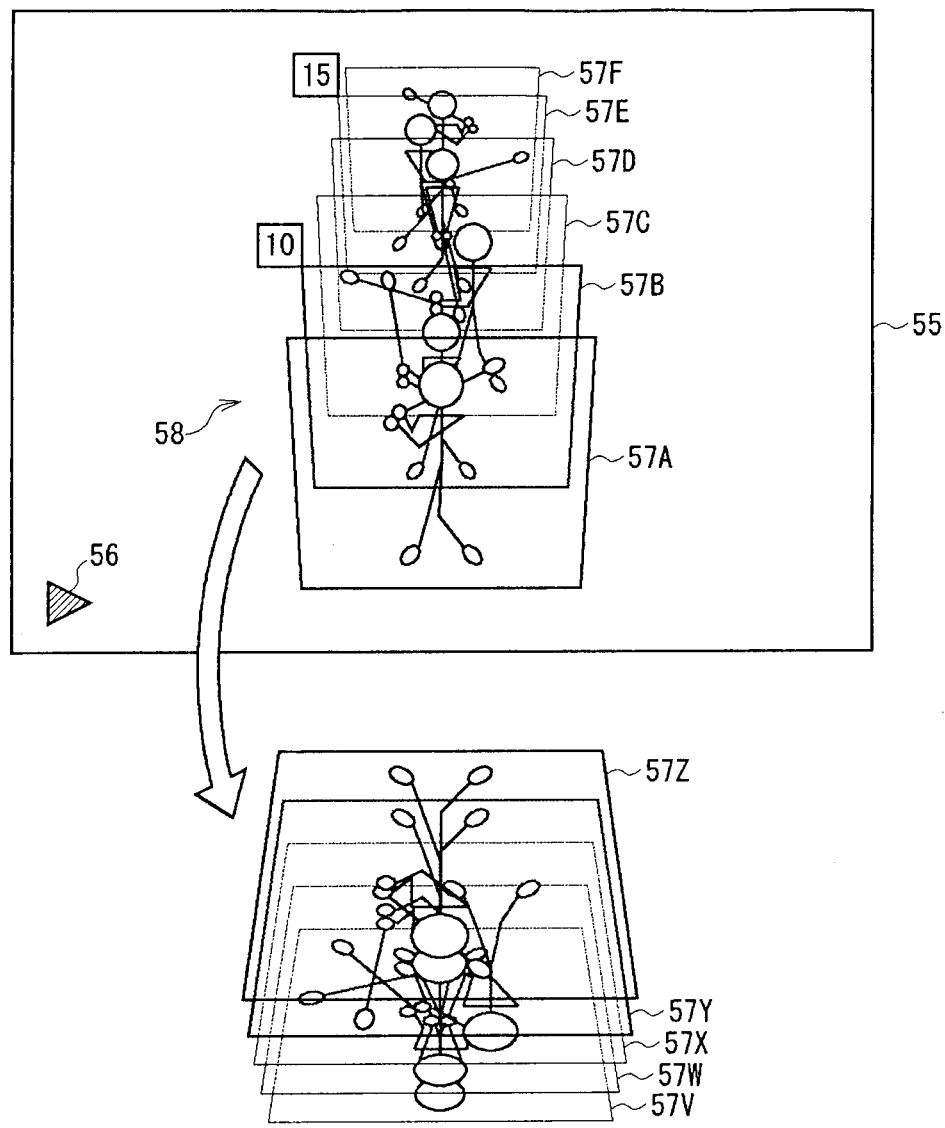
FIGS. 35 to 39, and 40A and 40B are schematic views showing how to display images on a Workspace window according to other embodiments.
Figure 36:
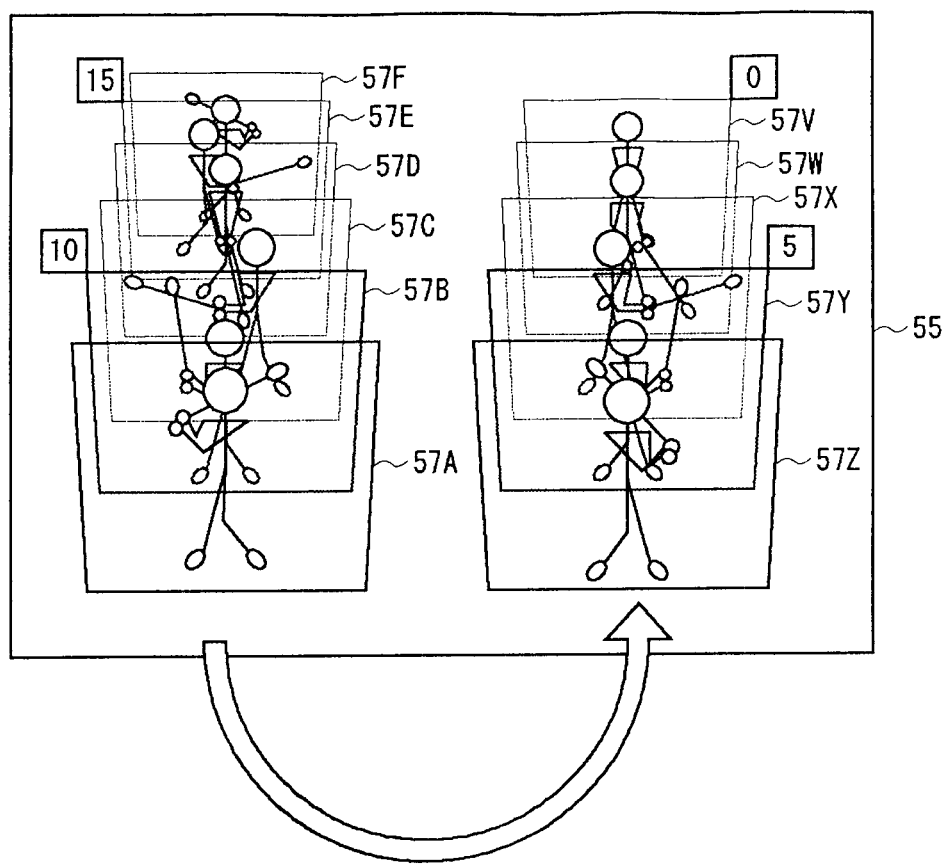

Still further, the first and second embodiments have described a case where plural continuous display areas 57 (57F-57A-57V) are three-dimensionally curved in an elliptic form on the Workspace window 55. This invention, however, is not limited to this and as shown in FIG. 35, a Workspace window 55 can have such a configuration that plural display areas 57 (57F-57A-57V) are sequentially arranged from behind to the front and then the image of the front display area 57A lies forward and then disappears in the end. Alternatively, as shown in FIG. 36, a Workspace window 55 can have such a configuration that plural display areas 57 (57F-57A-57V) are sequentially arranged from behind to the front and the image of the front display area 57A turns over and goes back to the behind.

In these cases, in the editing apparatuses 21, 201, 251, by providing numerical playback lapse times ("10", "15" meaning a lapse of 10, 15 minutes in FIG. 35, and "0", "5", "10", "15" meaning a lapse of 0, 5, 10, 15 minutes in FIG. 36) to display areas 57 (57B and 57E in FIG. 35, and 57V, 57Y, 57B and 57E in FIG. 36), the user can intuitively recognize the temporal passage of the clip. Since a playback speed v and playback intervals ΔT can be desirably set, the user can do editing work easily on the Workspace window 55.

Figure 37:
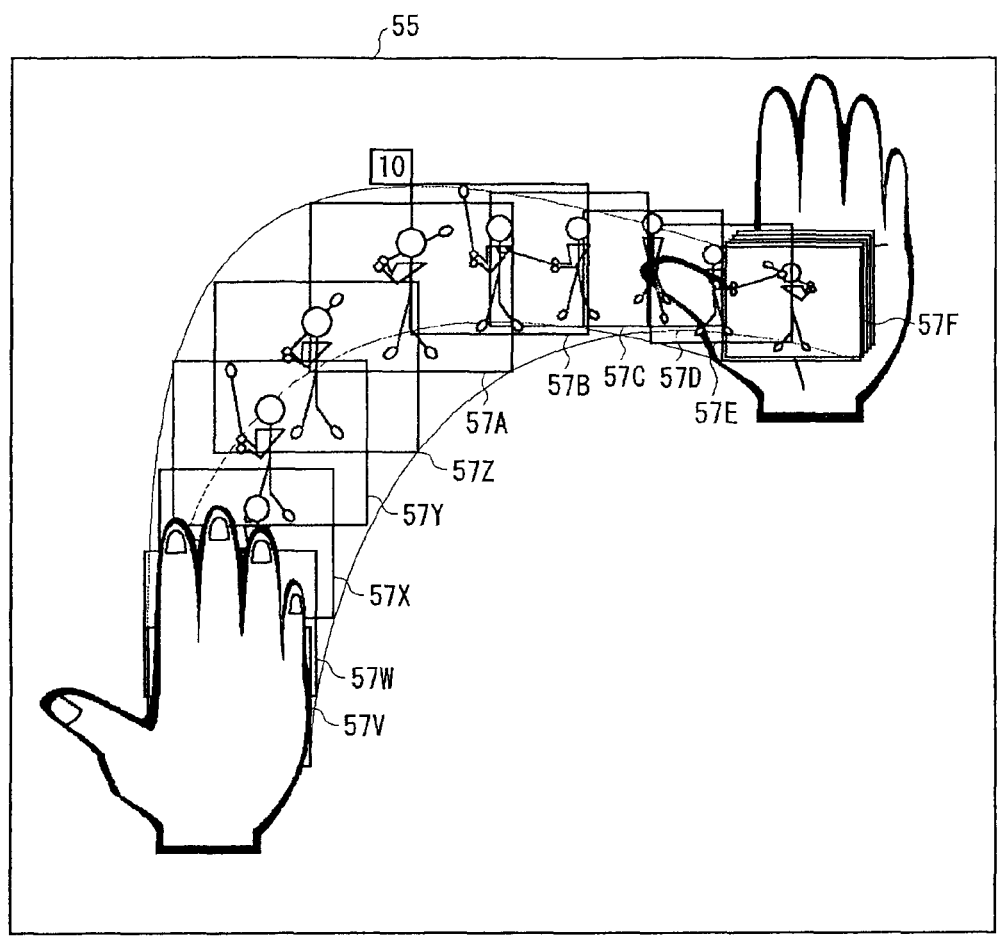

Alternatively, as shown in FIG. 37, a Workspace window 55 can show the images of the display areas 57 (57F-57A-57V) between both hands as if they are thrown from the left hand to the right hand in time series.

Figure 38:
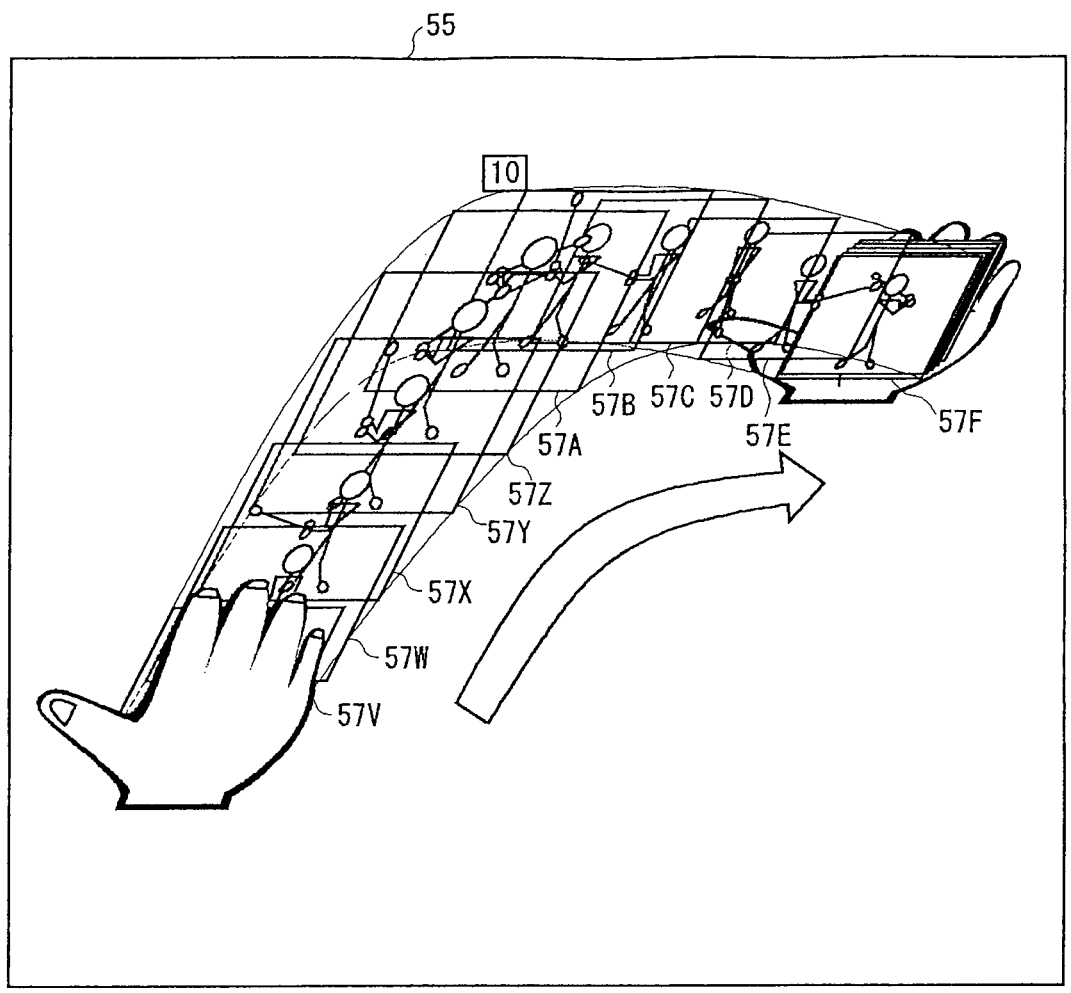
Figure 39:
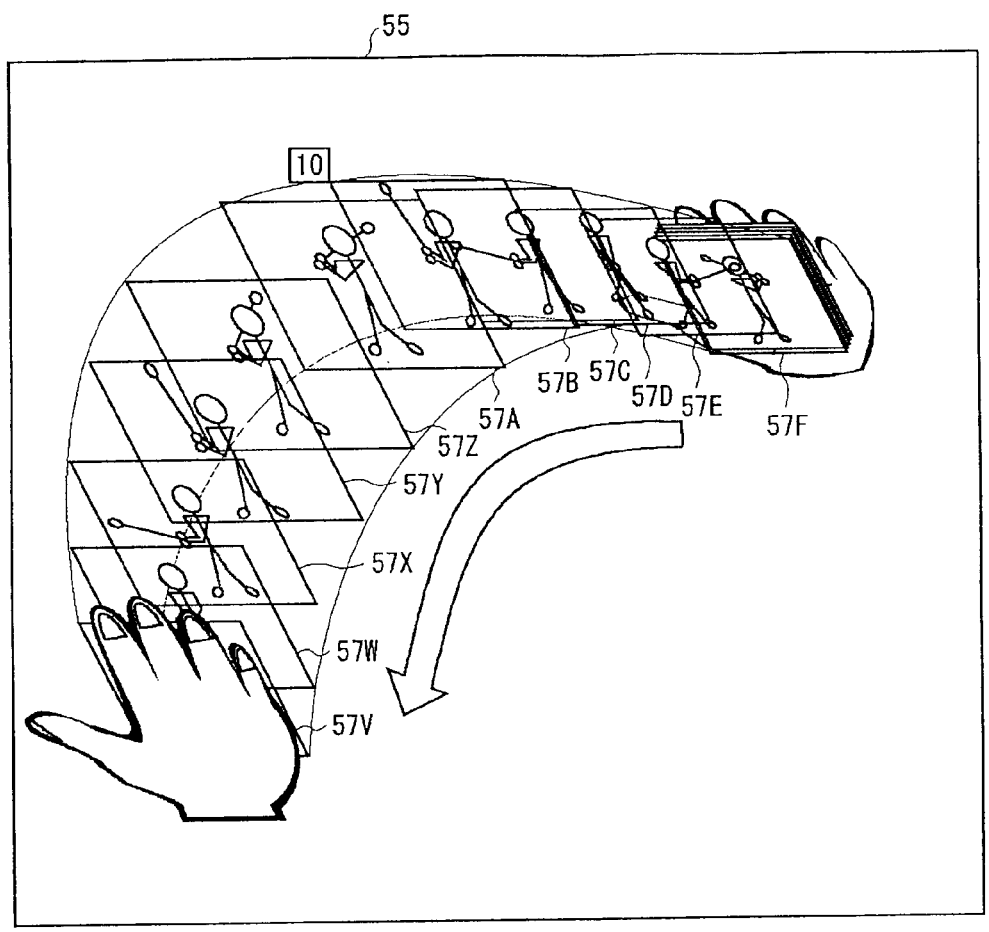

At this time, in the editing apparatuses 21, 201, 251, as shown in FIG. 38, when a command for inclining the left hand backward is entered, the angles of the images of the plural display areas 57 (57F-57A-57V) are sequentially changed so as to tilt backward, from the front display area to the back display area according to a speed of flowing the images in time series, as if the images are sequentially thrown. As shown in FIG. 39, when a command for inclining the left hand forward is entered, on the contrary, the angles of the images of the plural display areas 57 are sequentially changed so as to tilt forward, from the back display area to the front display area, as if the images are thrown.

In this case, similarly, by providing a numerical playback lapse time ("10" meaning a lapse of 10 minutes) to the display area 57B as speed indication data, the user can intuitively recognize the temporal flow of the clip. Since a playback speed v and playback intervals ΔT can be desirably set, the user can do the editing work easily on the Workspace window 55.

Figure 40A:
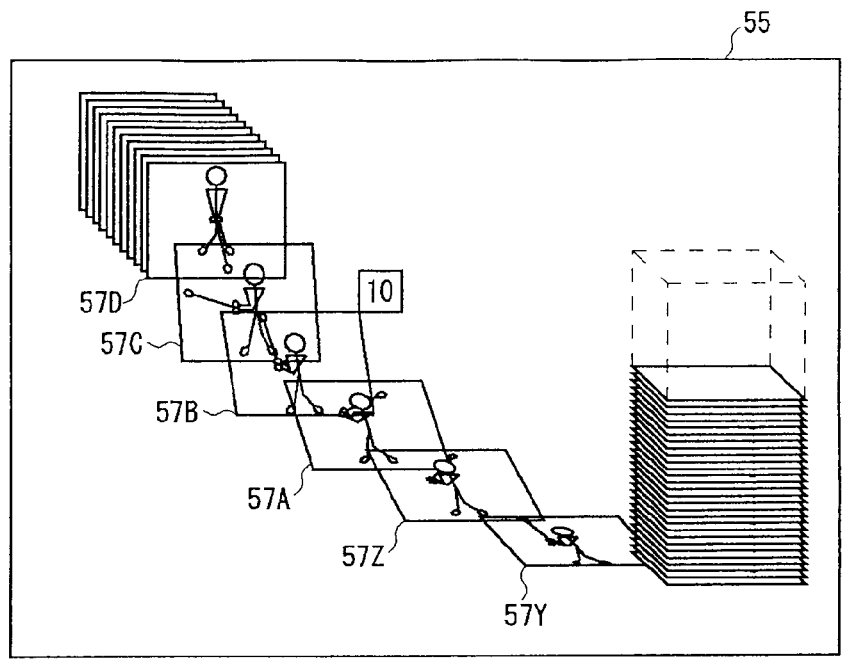
Figure 40B:
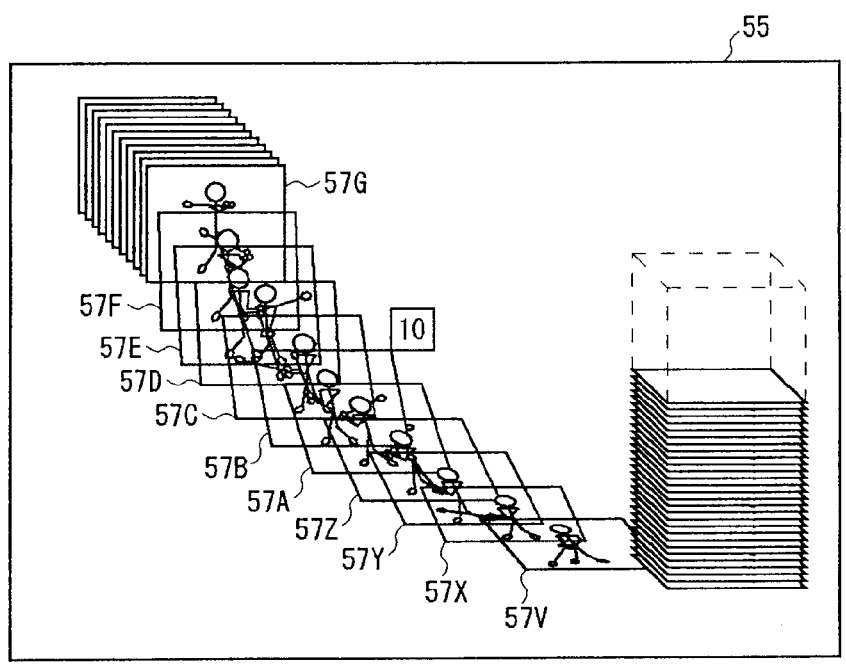

Alternatively, as shown in FIGS. 40A and 40B, a Workspace window 55 has such a configuration that plural display areas 57 (57F-57A-57V) are like sequentially going down a slider from behind to the front.

In this case, in the editing apparatuses 21, 201, 251, the images of display areas 57 (57F-57A-57V) that have been already displayed are piled up while the images of display areas 57 (57F-57A-57V) to be displayed are also piled up. Therefore, the user can intuitively recognize where the currently displayed image is in the entire clip.

In this connection, in the editing apparatuses 21, 201, 251, a Workspace window 55 has such an alternative configuration that the display areas piled up on the right side are like sequentially going up a slider.

Still further, the above embodiments have described a case where, as shown in FIG. 11, a display area 57 (57F-57A-57V) displaying a desired image is highlighted in a prescribed color as an edit position by clicking on the display area 57 (57D in this figure) displaying the desired image out of the images of the display areas 57 (57F-57A-57V) on the display area group 58. This invention, however, is not limited to this and only display areas 57 (57F-57A-57V) displaying the video data corresponding a scene change can be highlighted when the video data is displayed on the display areas 57 (57F-57A-57V).

Still further, the above embodiments have described a case where the keyboard 38 and the mouse 39 are used for setting and editing operation inputs. This invention, however, is not limited to this and game controllers can be used for various kinds of operation inputs.

Still further, the first and second embodiments have described a case where the front central display area 57A, 101A of a display area group 58, 100 is displayed at the largest size while smaller display areas 57, 101 are displayed as they are away from the front central display area 57A, 101A, so that the user is more likely to notice the display areas 57, 100 as they are close to the front central display area 57A, 101A of the display area group 58. This invention, however, is not limited to this and, in addition to the size difference, the display areas 57, 101 can have lower resolutions and have narrower space between each other or blur images as they are away from the front central display area 57A, 101A. Thereby the user is more likely to notice display areas 57, 101 as the display areas 57, 101 are close to the front central display area 57A, 101A. In this connections, various techniques can be adopted to let the user notice the display areas 57, 101 as the display areas 57, 101 are close to the front central display area 57A, 101A.

Still further, the first and second embodiments have described a case where, in overlapped parts of the display areas 57, 101, the images of front display areas 57, 101 are transparent to make the images of the back display areas viewable. This invention, however, is not limited to this and the images of the front display areas can hide the images of the back display areas from view.

Still further, the first and second embodiments have described a case where the same playback intervals ΔT and the same playback speed v are applied for all images being displayed on the display areas 57, 101 of a display area group 58, 100. This invention, however, is not limited to this and a playback interval and a playback speed can be set for each interval between images and for each image, respectively.

In this case, the playback speed v and the playback interval ΔT for images being displayed on the display areas 57, 101 of a display area group 58, 100 may be controlled based on the coordinate position (absolute coordinate position) of each display area 57, 101 on the display screen. Specifically, the CPU 30, 93 detects the coordinate value of each display area 57, 101 on the display screen and controls the memory unit 22 so as to set the playback interval ΔT and playback speed v based on the detected results. As a method of changing the playback interval ΔT based on a coordinate position, a longer playback interval ΔT is set as a display area is away from the front central display area 57A on the Workspace window 58, 100. Thereby, the user can feel as if the image flies fast from the right behind, slows down at the front and flies back fast to the left back and disappears.

If the user enters a command for changing (moving) the positions of the display areas 57, 101 or the display area group 58, 100, the CPU 30, 93 changes the positions accordingly and at the same time sequentially detects the coordinate positions of the changed display areas 57, 101 or display area group 58, 100 to control the playback speed v and playback interval ΔT according to the detected change of the coordinate positions. The CPU 30, 93 can be additionally provided with a playback condition detecting function for detecting playback conditions. The playback conditions include a collection of parameters including playback speed and playback time (relative time in entire clip).

Still further, the first and second embodiments have described a case where the user can change a playback speed v and playback intervals ΔT for images being displayed on the display areas 57, 101 of a display area group 58, 100. This invention, however, is not limited to this and, when images subjected to compression encoding at a variable bit rate are displayed, a playback speed v and/or playback intervals ΔT are decreased for images subjected to compression encoding at a high bit rate, causing a large amount of generated codes, so that the user can surely confirm the images because these images have fast motions while a playback speed v and/or playback intervals ΔT are increased for images subjected to the compression encoding at a low bit rate, causing a few amount of generated codes, so as to display the images somehow fast because these images have relatively little motions. This offers the images that the user can easily confirm and edit. This playback and display control can be automatically performed by previously setting a threshold value for the amount of generated codes or by an editing system.

Still further, the first and second embodiments have described a case where the Workspace window 55 has display area group 58, 100 only. This invention, however, is not limited to this and a time scale can be displayed along with the display area group 58, 100 on the Workspace window 55. Thereby the user can easily confirm time information of an edited video/audio.

Still further, the first and second embodiments have described a case where the Timeline view 53 is supplementary provided. This invention, however, is not limited to this and the Timeline view can be used for a time indicator. In this case, the Timeline view 53 can have a function to indicate where the image being displayed on the main display area 57A of the display area group 58, 100 is in the entire clip.

Still further, the first and second embodiments have described a case where the result of a process in response to each editing operation input shown in FIGS. 20 to 25 is displayed on the Workspace window 55 of the edit screen 50 with the display configuration unchanged. In this case, the display conditions before editing can be automatically backed up so as to restore the conditions after the editing.

Still further, the first and second embodiments have described a case where a playback speed v and playback intervals ΔT for images being displayed on the display areas 57, 101 of the display area group 58, 100 are increased together by pressing the "up (↑)" key 70U of the directional keys 70 of the keyboard 39, or by placing the cursor 71 somewhere on a display area group 58 and dragging the cursor 71 to the left on the display area group 58 while pressing the right button of the mouse 38. This invention, however, is not limited to this and the editing apparatus 21 can be designed to increase only one of the playback speed v and the playback intervals ΔT.

Still further, the first and second embodiments have described a case where a playback speed v and playback intervals ΔT for images being displayed on the display areas 57, 101 of the display area group 58, 100 are decreased together by pressing the "down (↓)" key 70D of the directional keys 70 of the keyboard 39, or by placing the cursor 71 somewhere on a display area group 58 and dragging the cursor 71 to the right on the display area group 58 while pressing the right button of the mouse 38. This invention, however, is not limited to this and the editing apparatus 21 can be designed to decrease only one of the playback speed v and the playback intervals ΔT.

Still further, the first and second embodiments have described a case where visual effects of images in the display area group 58, 100 can be changed by desirably setting a playback speed v and playback intervals ΔT for the images being displayed on the display areas 57, 101 of the display area group 58, 100. This invention, however, is not limited to this and the visual effects of the images in the display area group 58, 100 can be changed by numerically setting space between frames/fields in addition to the playback speed v and the playback intervals ΔT. Alternatively, another parameter can be set for changing the visual effects of the images.

Still further, the first embodiment has described a case where the positions of the display areas 57 of the display area group 58 shift together with the movement of the cursor 71 in the instant forwarding or rewinding operation as shown in FIG. 14A or 14B, so that the user can feel as if the images of the display areas 57 of the display area group 58 jump to future images or past images. This invention, however, is not limited to this and, without changing the positions of the display areas 57, only the images on the display areas 57 can be moved so that the user can feel as if the images on the display areas 57 jump to future images or past images at moment.

Still further, the second embodiment has described a case where a display area 101 is enlarged and displayed when it displays the image of a frame of which sound has a peak audio level greater than a threshold value Thd. This invention, however, is not limited to this and the threshold value Thd is not set and the display areas 101 are enlarged or reduced depending on audio levels of corresponding sounds. Alternatively, by comparing the average of audio level with a threshold value Thd, a display area 101 can be enlarged and displayed when the average is greater than the threshold value Thd while the display area 101 can be reduced and displayed when the average is smaller than the threshold value Thd.

Still further, the first and second embodiments have described a case where the images on the display areas 57 are displayed as if they flow from the right to the left in the forward direction as shown in FIG. 7. This invention, however, is not limited to this and the user can desirably switch the flow direction. For example, by taking a direction from the left to the right as a forward direction, the images on the display areas 57 can be displayed as if they flow from the left to the right.

Still further, the first and second embodiments have described a case where the display areas 57 (57F-57A-57V) are displayed at the same positions. This invention, however, is not limited to this and, when a very slow playback speed and playback intervals ΔT shorter than one frame are set, the display areas 57 (57F-57A-57V) do not update images but can sequentially shift in the forward direction. This allows the user to watch images with smoother motion in the slow playback.

Figure 41A:
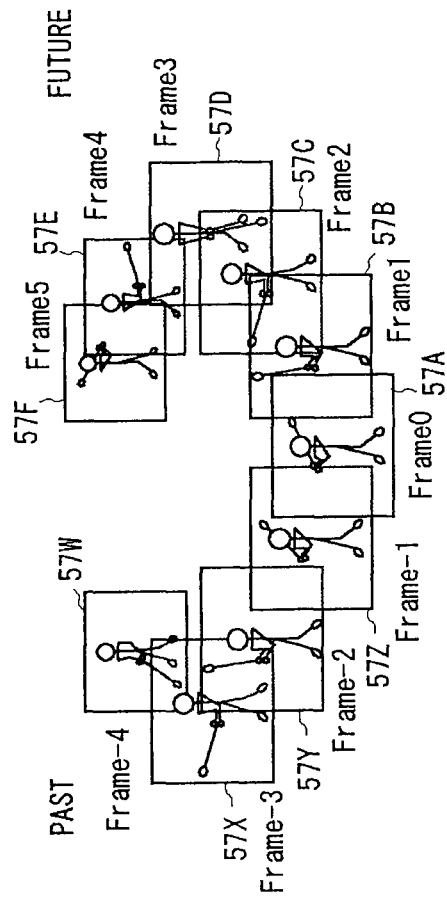
FIGS. 41A and 41B are schematic views for explaining how display areas move in slow playback according to another embodiment.
Figure 41B:
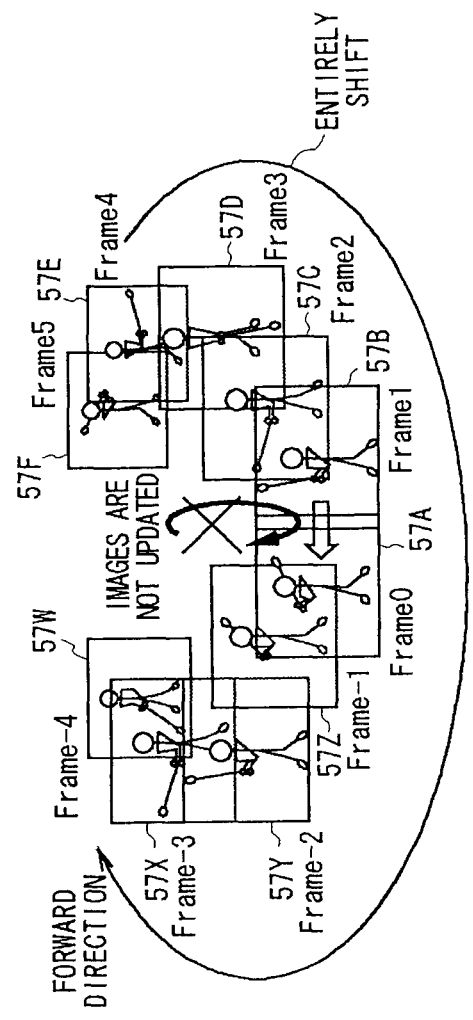

For example, in the editing apparatus 21, 201, 251, as shown in FIGS. 41A and 41B, the display areas 57 (57F-57A-57W) do not update their images but shift to the next positions. Thereby a slow motion can be expressed by shifting the display areas 57 (57F-57A-57W) at the same time one by one from the right to the left.

Still further, the first and second embodiments have described a case of applying a video effect to an IN-point and an OUT-point at the same time as shown in FIG. 25. This invention, however, is not limited to this and different effects can be applied to an IN-point and an OUT-point. Specifically, as shown in FIG. 25B, the user selects an effect icon 13 and then drags and drops the icon 13 around the IN-point, and similarly, selects, drags and drops a different effect icon 13 around the OUT-point.

At this time, the video effect can be applied to several frames or several seconds around a frame with the corresponding icon pasted as well as the frame. The user can set how much the video effect is applied around a specified frame, before or after the effect setting. In a case where the user can adjust the video effect after the effect setting, the user clicks on an effect frame, which is an edit position, while pressing the "Shift" key and then extends a duration of the effect by keeping pressing the "Shift" key or shortens the duration by clicking on a desired frame.

Still further, the first and second embodiments have described a case where a Workspace window 55, a display area group 58, 100, and a plurality of display areas 57, 101 are displayed on one display. This invention, however, is not limited to this and a Workspace window, a display area group, and a plurality of display areas can be divided and displayed on some displays.

Still further, the first and second embodiments have described a case where this invention is applied to the editing apparatuses 21, 201, 251 of FIGS. 2, 27, 28. This invention, however, is not limited to this and this invention can be widely applied to various kinds of image processing apparatuses, provided that they have an editing function. Such image processing apparatuses include computers, video cameras, digital cameras, game devices, portable information terminals (portable computers, mobile telephones, portable game devices), storage devices, (including optical disc drives, home serves), and processing boards and processing cards having the functions of this invention. Each of these image processing apparatuses has a body case, a signal processor, and an external device interface as common units, and also has other peripheral units according to the usage of the apparatus. For example, a video camera or a digital camera has a camera unit and a recording circuit for storing captured video data in a memory unit, in addition to the above three common components. A mobile telephone or another electronic device with a communication function has a communication circuit and an antenna in addition to the above three common components.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   circuitry configured to
   create from video data a plurality of video data to be displayed on a plurality of transparent display areas on a display screen, and
   display the plurality of video data created by the image creation unit, each as a motion picture, on the plurality of transparent display areas on the display screen in a display order,
   wherein the circuitry is operable to sequentially play back the plurality of video data on the display screen as a display area group having the plurality of transparent display areas arranged along a three-dimensional curve according to the display order, and
   playback of the video data in each of the respective transparent display areas is started at staggered intervals to cause the playback of the video data to flow along the three-dimensional curve from a first of the transparent display areas to a last of the transparent display areas.

2. The image processing apparatus according to claim 1, wherein the circuitry creates the plurality of video data by decoding an encoded stream.

3. The image processing apparatus according to claim 2, wherein the circuitry stores the encoded stream in a memory, reads the encoded stream from the memory, and creates the plurality of video data by decoding the encoded stream.

4. The image processing apparatus according to claim 1, wherein the circuitry obtains display information including display sizes and display positions for displaying the plurality of video data on the plurality of transparent display areas and displays the plurality of video data on the display screen.

5. The image processing apparatus according to claim 1, wherein the circuitry plays back the plurality of video data on the display screen at a variable playback speed.

6. The image processing apparatus according to claim 1, wherein the circuitry plays back the plurality of video data on the display screen at a constant playback speed.

7. The image processing apparatus according to claim 3, wherein the staggered interval is constant for all display areas.

8. The image processing apparatus according to claim 1, wherein the circuitry displays main video data to be displayed on a main transparent display area, at a largest display size among the plurality of video data, the main transparent display area serving as a display basis out of the plurality of transparent display areas.

9. The image processing apparatus according to claim 8, wherein the circuitry displays the plurality of video data excluding the main video data at smaller display sizes as the plurality of video data are farther from the main transparent display area.

10. The image processing apparatus according to claim 8, wherein the circuitry displays the main transparent display area at a center of the display area group.

11. The image processing apparatus according to claim 8, wherein the circuitry displays the plurality of video data other than the main video data at lower resolutions as the plurality of video data are farther from the main transparent display area.

12. The image processing apparatus according to claim 4, wherein the circuitry displays the plurality of video data so as to overlap on adjacent transparent display areas.

13. The image processing apparatus according to claim 8, wherein the circuitry displays the plurality of video data other than the main video data on the plurality of transparent display areas spaced closer as the plurality of video data are farther from the main display area.

14. The image processing apparatus according to claim 4, wherein the circuitry displays the plurality of video data on the plurality of transparent display areas with displaying angles of the plurality of transparent display areas changed according to a speed of flowing the plurality of video data in time series in the display area group.

15. The image processing apparatus according to claim 4, wherein the circuitry further creates speed indication data indicating a speed of flowing the plurality of video data in time series in the display area group, and displays the speed indication data as an icon on the display screen.

16. The image processing apparatus according to claim 1, wherein when specified video data corresponding to an edit position is displayed on one transparent display area of the plurality of transparent display areas, the circuitry highlights the one transparent display area or the specified video data corresponding to the edit position.

17. The image processing apparatus according to claim 1, wherein when video data corresponding to a scene change is displayed on one transparent display area of the plurality of transparent display areas, the circuitry highlights the one transparent display area or the video data corresponding to the scene change.

18. The image processing apparatus according to claim 2, wherein:
the circuitry creates a plurality of split encoded streams by splitting the encoded stream on a temporal axis by a number of display regions showing the plurality of transparent display areas and the display area group, and decodes the plurality of split encoded streams to create the plurality of video data for each of the display regions.

19. The image processing apparatus according to claim 2, wherein:
the circuitry is further configure to
decode the encoded stream, and
assign a decoding process of the encoded stream to the plurality of decoders, depending on a number of the plurality of transparent display areas.

20. An image processing method comprising:
creating from video data a plurality of video data to be displayed on a plurality of transparent display areas on a display screen; and
displaying the plurality of video data created, each as a motion picture, on the plurality of transparent display areas on the display screen in a display order,
wherein the plurality of video data is sequentially played back on the display screen as a display area group having the plurality of transparent display areas arranged along a three-dimensional curve according to the display order, and
playback of the video data in each of the respective transparent display areas is started at staggered intervals to cause the playback of the video data to flow along the three-dimensional curve from a first of the transparent display areas to a last of the transparent display areas.

\* \* \* \* \*